United States Patent
Beatty

(10) Patent No.: US 6,336,053 B1
(45) Date of Patent: Jan. 1, 2002

(54) GRAPHICAL USER INTERFACE SHOP FLOOR CONTROL SYSTEM

(75) Inventor: Robert A. Beatty, Lapeer, MI (US)

(73) Assignee: Plexus Systems, LLC, Oxford, MI (US)

(*) Notice: Subject to any disclaimer, the term of this patent is extended or adjusted under 35 U.S.C. 154(b) by 0 days.

(21) Appl. No.: 09/086,718

(22) Filed: May 29, 1998

(51) Int. Cl.$^7$ ............................................... G06F 19/00
(52) U.S. Cl. ........................ 700/108; 345/736; 345/967
(58) Field of Search .......................... 700/97, 108, 109, 700/111, 174; 345/733, 734, 736, 965, 967; 702/182, 184

(56) References Cited

U.S. PATENT DOCUMENTS

| | | |
|---|---|---|
| 4,827,439 A | 5/1989 | Licht |
| 4,831,582 A | 5/1989 | Miller et al. |
| 5,089,970 A | 2/1992 | Lee et al. |
| 5,295,242 A | 3/1994 | Mashruwala et al. |
| 5,311,438 A | 5/1994 | Sellers et al. |
| 5,398,336 A | 3/1995 | Tantry et al. |
| 5,432,887 A | 7/1995 | Khaw |
| 5,530,857 A | 6/1996 | Gimza |
| 5,548,756 A | 8/1996 | Tantry et al. |
| 5,576,946 A | 11/1996 | Bender et al. |
| 5,631,825 A | 5/1997 | van Weele et al. |
| 5,684,970 A | 11/1997 | Asuma et al. |
| 5,768,133 A * | 6/1998 | Chen et al. ............ 364/468.01 |
| 5,777,876 A | 7/1998 | Beauchesne |
| 5,835,898 A | 11/1998 | Borg et al. .................... 705/8 |
| 5,848,399 A | 12/1998 | Burke |
| 5,953,229 A * | 9/1999 | Clark et al. ............ 364/468.06 |

OTHER PUBLICATIONS

Tanju Yurtsever, Matt Comerford; *Equipment Management System (EMS)*; 1995 IEEE/SEMI Advanced Semiconductor Manufacturing Conference pp. 248–254.

William E. Biles, Susan T. Wilso; *Animated Graphics and Computer Simulation*; Proceedings of the 1987 Winter Simulation Conference pp. 472–477.

R. Armacost, M. Mullens, W. Swart; *Structuring a Simulation Modeling Environment Using a Commercial Manufacturing Simulator*; Proceedings of the 1994 Winter Simulation Conference pp. 935–940.

* cited by examiner

Primary Examiner—Paul P. Gordon
(74) Attorney, Agent, or Firm—Oliff & Berridge, PLC

(57) ABSTRACT

A graphical user interface shop floor control system includes one or more of factory screens, shop floor screens, machine status screens, a material/parts container screens, machine login screens, new production screens, and machine maintenance screens. The factory screen graphically represents a factory. The shop floor screens represent different shop floors or other areas of the factory. These areas of the factory are represented by selectable icons, positioned within the factory screen at locations corresponding to the locations of the represented areas within the factory. Each shop floor screen depicts the general appearance of one of the areas of the factory and the factory elements of that area of the factory. Icons representing factory elements are positioned within the shop floor screens at locations corresponding to the locations of the represented factory elements within the corresponding shop floor. Icons representing machines and storage locations include graphics depicting the appearance of the represented machine or storage location. The shop floor screens include status buttons. Selecting a status button and a machine icon assigns the selected status to the machine represented by the selected machine icon, and color codes that icon. Containers of parts are associated with the various machines. Their movement around the shop floors is controlled by scanning bar code labels associated with the containers. Animations of the movement of the containers is displayed to indicate that the movement of the container has been recorded. Animations can also be provided for the machine icons based upon their status.

62 Claims, 27 Drawing Sheets

GRAPHICAL USER INTERFACE SHOP FLOOR CONTROL SYSTEM

BACKGROUND OF THE INVENTION

1. Field of Invention

This invention generally relates to a shop floor control system that tracks, controls and reports information relating to the operation of a factory. In particular, this invention is directed to a graphical user interface for a shop floor control system. Specifically, this invention is directed to a graphical user interface that represents the physical layout of the factory.

2. Description of Related Art

A shop floor control system is an industry standard term describing a computer-based system that tracks, controls and reports information related to the operation of a factory. Shop floor control systems typically track inventory, production and labor hours. Traditionally, the conventional shop floor control systems have been accessed by employees through a set of menus, including pull down menus, data entry forms, including dialog boxes, and browsers.

For example, U.S. Pat. Nos. 5,398,336 and 5,548,756 to Tantry et al. (which share the same specification) describe an object-oriented architecture for a factory floor management system that models factory floor entities as factory objects within a relational database. Workers on the factory floor interact with the factory floor management system through X-terminal or bar code devices. The workers+ interactions with these devices generate database service requests that are used to retrieve, manipulate and update data stored within the relational database. U.S. Pat. No. 5,530,857 to Gimza describes a shop floor control method and system having a menu-based user interface employed by the interface units of the system.

SUMMARY OF THE INVENTION

This invention provides a graphical user interface shop floor control system.

This invention further provides a graphical user interface shop floor control system that graphically represents the factory, including individual production machines, storage locations, offices and other pertinent areas.

This invention additionally provides a graphical user interface shop floor control system that uses selectable icons to represent the individual factory entities or elements, such as the production machines, storage locations, offices and other pertinent areas and elements of the factory.

This invention additionally provides a graphical user interface shop floor control system that displays areas of the factory, where the selectable icons are positioned within the interface at relative locations corresponding to the locations on the factory floor occupied by the represented element.

This invention further provides a graphical user interface shop floor control system where the selectable icons, when selected, allow information relating to the represented factory element within the shop floor control system to be displayed and/or updated.

This invention also provides a graphical user interface shop floor control system where the selectable icons are color-encoded according to the status of the represented factory element.

In the graphical user interface shop floor control system of this invention, a company, and particularly a factory, are represented at different levels of detail. A main menu screen of the graphical user interface shop floor control system provides buttons for accessing subscreens for particular portions of the factory, or more generally, the company. A manufacturing menu screen accessible through a manufacturing button of the main menu provides manufacturing-specific buttons providing access to different schedules, statistical analyses, supplies and inventories and the like. Most importantly, the manufacturing menu provides a shop layout button that provides access to factory screens that represent the actual physical layout of a factory at different levels of detail. Thus, the main menu screen and the various menus immediately under the main menu, such as the manufacturing menu screen, provide differing levels of details of the organizational structure of the company, while the shop layout screens provide differing levels of detail of the physical structure of the factory. A first shop layout screen of the shop floor graphical user interface depicts a factory at a first level of detail. Additional shop layout screens of the shop floor graphical user interface depict portions of the factory shown in the first level at increasing levels of detail, until a shop floor screen of the shop floor graphical user interface control system is reached.

At each level of detail, the displayed shop layout screen of the graphical user interface shop floor control system contains a scale representation of the corresponding portion of the factory. Displayed entities or elements of the factory having corresponding screens in the graphical user interface shop floor control system are represented by selectable icons. The selectable icons have shapes or graphics that correspond to the actual shapes or appearances, respectively, of the represented entities or elements. Thus, on the first shop layout screen, the entire factory site is represented, in scale, with each area of the factory having its own screen in the graphical user interface shop floor control system represented by either a correspondingly-shaped icon or an icon containing a graphic corresponding to an appearance of the represented area. In a small factory, it is likely the next level of detail contains the shop floor screens for the actual shop floors of the factory, and the selectable icons on the first level screen represent those shop floors. In a very large factory, there may be intermediate level screens between the first level screen and the shop floor screens.

Each shop floor screen depicts the actual shop floor of the factory and includes icons representing the various machines, storage locations, offices and other factory elements of the shop floor. These icons are positioned at locations within the shop floor screen corresponding to the actual locations on the shop floor occupied by the represented factory elements. Each of the icons representing the various factory elements of the depicted shop floor either is shaped according to the actual shape of the represented factory element, or includes a graphic modeled after the represented factory element, or both. Each icon can be shown using a color coding that represents the actual status of the represented element. Most icons on the shop floor screen are selectable. The shop floor screen also includes a number of global function buttons that control the user's interaction with the selectable icons representing the factory elements of the depicted shop floor.

Depending on the function button selected, different control events or dialogue boxes are immediately displayed, or are displayed once one of the selectable icons is selected. These dialogue boxes include a machine status screen that allows the user to view and update the status of a machine element of the factory; a containers screen that allows the user to view and update data regarding containers stored within a storage area of the factory; a machine log-in screen that allows a user to determine which employees are logged into the various machines or onto other elements of the factory; a production screen that allows a user to assign new production jobs to various machine elements of the factory floor; and a machine log screen that allows maintenance on the machine elements of the factory floor to be scheduled and recorded.

Depending on the size and nature of the factory, additional shop layout screens for other functions can also be implemented. Such screens can include materials receiving and shipping docks, materials transport systems and the like. Similarly, other organizational portions of the company, such as sales, shipping and receiving, materials, supplies, purchasing, personnel, accounting and the like can have subsidiary screens allowing particular data to be viewed and/or entered into the graphical user interface shop floor control system of this invention, and providing physical layouts of the offices of the company corresponding to these organizational structures.

Additionally, the various layout screens do not have to be static. That is, various animations can be provided for these layout screens to represent movement of materials both on the shop floor and acceptance of movement information corresponding to the moved materials by the graphical user interface shop floor control system. Furthermore, such movement information is not limited to materials but could include purchase orders and the like. Such animations also can include status-dependent animations of the various factory element icons of the various layout screens. Similarly, the data entry screens do not need to be static, but can import and display information on the various data entry screens from bar code scanners, keyboards, scales, and the like, and from the database of the graphical user interface shop floor control system. Moreover, one or more of the various selectable icons of the graphical user interface shop floor control system of this invention can be color encoded based on an assigned status of the underlying factory element represented by a particular selectable icon.

The shop floor screen also allows the status of machines to be changed, employees to be logged onto various machines; and data concerning the location of materials on the shop floor to be updated.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

The graphical user interface shop floor control system of this invention represents a factory and its various departments, production areas, shop floors and other factory elements. Such factory elements can include machines, storage locations, shop floor offices, work centers, loading docks, material transport systems and the like. In general, in the following detailed description and claims, the term "shop floor" means any area or portion of the factory, or more generally, the manufacturing operation, that generates information about the manufacturing operation to be stored in the manufacturing information database described below.

Figure 1:
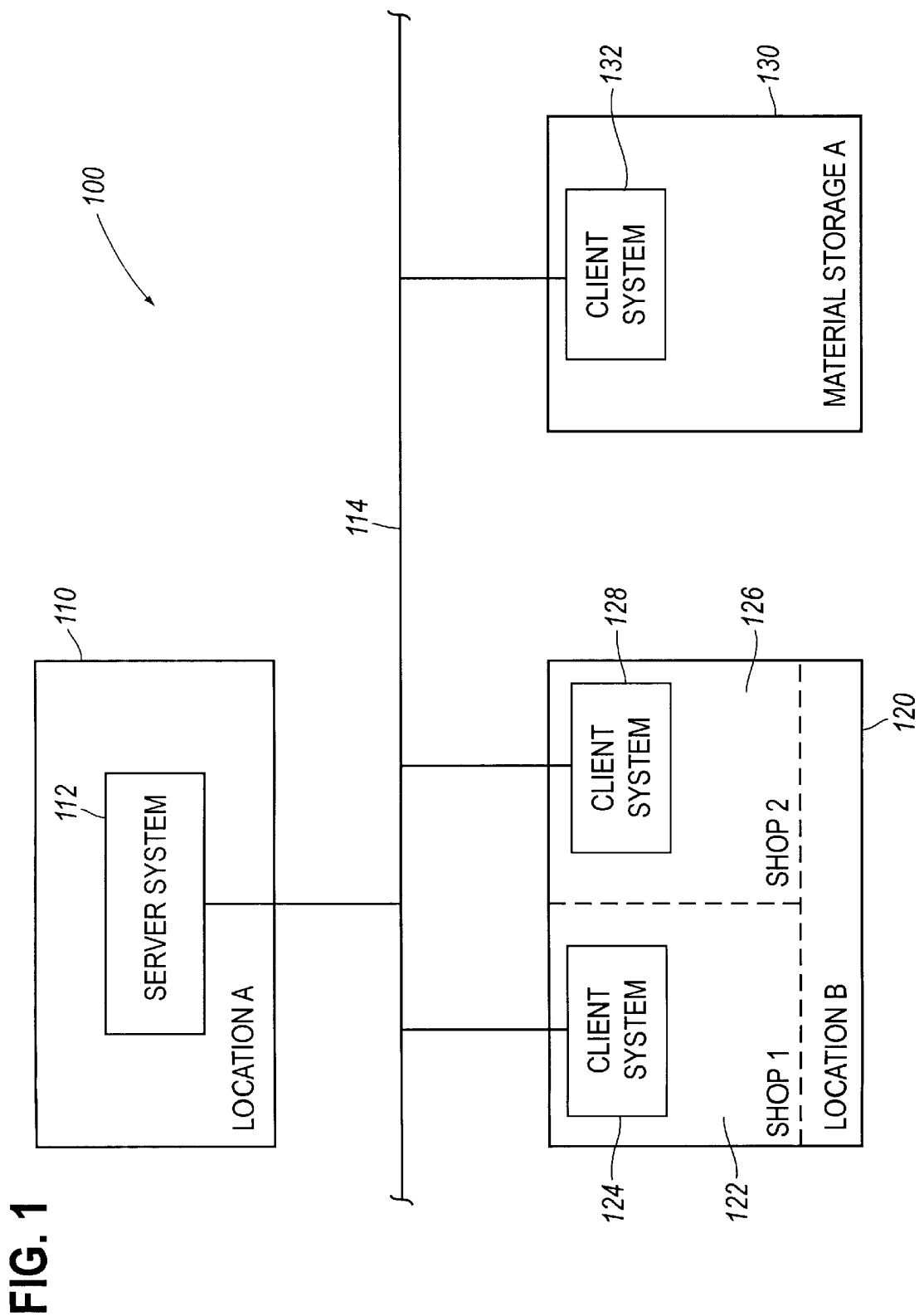
FIG. 1 is a functional block diagram of a networked computer system on which the graphical user interface shop floor control system of this invention can be implemented.

As shown in FIG. 1, the graphical user interface shop floor control system of this invention is preferably implemented using a local area network 100. In particular, the local area network 100 comprises a server system 112 positioned in a location A 110 of the factory. In general, the location A 110 will usually be in the administrative offices of the factory. The server system 112 is connected by the communications network 114 to a number of client systems. While only three client systems 124, 128 and 132 are shown in FIG. 1, it should be appreciated that any number of client systems can be connected to the server system 112 by the communications network 114.

As shown in FIG. 1, the client system 124 is located on the shop floor of a shop 122 of a location B 120 of the factory. The location B 120 of the factory also includes a second shop 126 in which the second client system 128 is located. Similarly, the client system 132 is located in a material storage location A 130 of the factory. It should also be appreciated that, if the shop floors of the shops 122 and 126 are sufficiently large, any number of client systems can be located on such shop floors. Likewise, if the material storage location A 130 is sufficiently large, additional client systems can also be located in the material storage location A 130. It should further be appreciated that the typical factory will have additional material storage locations and other material storage areas, and each of these will have at least one client system.

Figure 2:
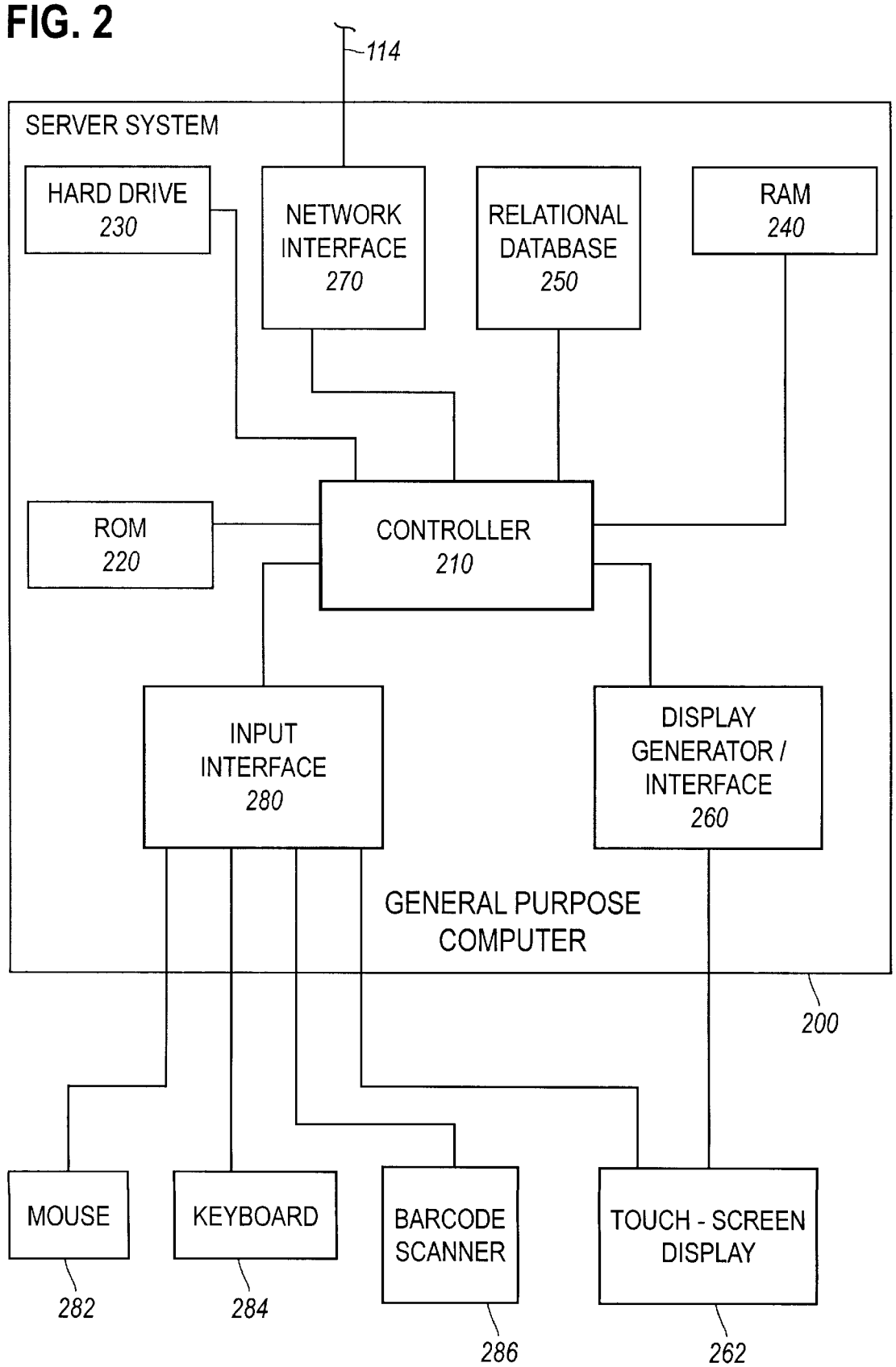
FIG. 2 is a functional block diagram showing in greater detail the elements of the server system of FIG. 1.

FIG. 2 shows in greater detail the server system 112 of FIG. 1. As shown in FIG. 2, the server system 112 is preferably implemented on a general purpose computer 200 comprising, in part, a controller 210, a ROM 220, a hard drive 230, a RAM 240, a relational database 250 that stores the information described below, a display generator/interface 260, a network interface 270, and an input interface 280. A touch-screen display 262 is connected to the output of the display generator-interface 260. Connected to the general purpose computer 200 through the input interface 280 are one or more of a mouse 282, a keyboard 284, a bar code scanner 286 and the touch-screen display 262.

It should be appreciated that, in FIG. 2, the various elements of the general purpose computer 200 are represented on a functional basis, rather than a structural basis. Thus, the input interface 280 and the display generator/interface 260 may actually be implemented by a number of different hardware structures, by a single hardware structure, or by two or more hardware structures that combine different ones of the functional features provided by the input interface 280 and the display generator/interface 260. Similarly, the data structures represented by the relational database 250 may be stored, at various times, on the hard drive 230, the RAM 240, and/or an internal cache memory of the controller 210.

Finally, it should be appreciated that, while FIG. 1 shows the graphical user interface shop floor control system of this invention implemented as a client/server local area network, any known system for interconnecting the server system 112 and the various client systems 124, 128 and 132 can instead be used. In particular, a wide area network, an intranet, the Internet, or any other type of distributed network can be used to implement the graphical user interface shop floor control system of this invention.

Additionally, while FIG. 2 shows the server system 112 implemented using a general purpose computer 200, it should be appreciated that the server system 112 can also be implemented on a special purpose computer, a programmed microprocessor or microcontroller and peripheral integrated circuit elements, and ASIC or other integrated circuit, a digital signal processor, a hard wired electronic or a logic circuit such as a discrete element circuit, a programmable logic device such as a PLD, PLA, FPGA or PAL, or the like. In general, any device capable of implementing the relational database 250 and generating the various screens and other elements of the graphical user interface described below can be used to implement the server system 112.

Similarly, the RAM 240 is preferably implemented using static or dynamic RAM. However, the RAM 240 can be implemented using any alterable randomly accessed memory, such as a floppy disk and disk drive, a writable optical disk and disk drive, a hard drive, flash memory or the like. Similarly, the hard drive 230 can be alternately implemented using a floppy disk and disk drive, a writable optical disk and disk drive, flash memory or the like. In general, the RAM 240 is used to provide operating memory to the controller 210, while the hard drive is used to provide long-term non-volatile storage for the server system 112. Accordingly, it may not be necessary to implement both the RAM 240 and the hard drive 230.

The ROM 220 is preferably implemented using a standard ROM. However, the ROM 230 can also be implemented using a PROM, an EPROM, an EEPROM, or a CD-ROM and disk drive, or the like. In general, the ROM 220 is used to store boot programs and other operating system programs for the controller 210. However, depending on the implementation of the server system 112, the RAM 240 and/or the hard drive 230, it may not be necessary to include the ROM 220.

Finally, while FIG. 2 shows the mouse 282, the keyboard 284, the bar code scanner 286 and the touch-screen display 262 connected to the input interface 280, it may not be necessary to implement all of these elements. Thus, any one or more of these elements can be omitted from the server system 112. It should be appreciated that it is not necessary to provide a touch-screen display 262 or 362. Rather, the mouse 282 or 382 can instead be provided to allow the various buttons and selectable icons on the various screens of the graphical user interface shop floor control system to be selected. In addition, rather than a mouse 282 or 382, another controllable selection device, such as a joystick, a track ball, a touch pad, light pen or the like, can be used. However, due to the usually environmentally unfriendly conditions of the shop floor relative to mice, the touch-screen displays 262 and 362 are preferred. However, a touch pad can be used in place of the touch-screen display without generating the environmental contamination concerns present when using a mouse, a joystick or a track ball.

In operation, the server system 112 is connected to the communications network 114 via the network interface 270. The server system 112 receives, from the various client systems distributed throughout the factory, data concerning the various factory elements and workers and uses this data to update the information about the manufacturing operation stored in the relational database 250.

Each factory element of the factory and each worker has a corresponding record in the relational database 250. As the operational status and jobs assigned to the various factory elements change, this information is updated using the graphical user interface shop floor control system of this invention, and the updated information is stored in the corresponding records of the relational database. Similarly, as workers log onto and out of various factory elements of the factory and alter the jobs performed by such factory elements, the factory element records and workers records are correspondingly updated in the relational database. The relational database also includes records concerning the various jobs or orders the factory elements are to perform, so that material usage and labor hours associated with those jobs can be tracked. Thus, as information concerning material usage and labor hours by workers logged onto various factory elements performing the work necessary to complete various jobs are input to the relational database 250 using the graphical user interface shop floor control system of this invention, the labor hours and materials consumed for such jobs are updated on the records in the relational database 250 for such jobs.

The relational database 250 is preferably any commercially available relational database capable of implementing manufacturing information functions, including, but not limited to, inventory tracking, production tracking and labor hours tracking, of the graphical user interface shop floor control system of this invention. In particular, the relational database 250 is preferably implemented using the PROGRESS RDBMS®, available from the Progress Software Corp., Bedford, Mass.

Similarly, any graphical user interface operating system or shell program can be used to implement the graphical user interface of the graphical user interface shop floor control system of this invention. In particular, Microsoft Windows 95® graphical user interface operating system is preferably used as the graphical user interface operating system for implementing this invention. Likewise, any graphical programming language, or integrated application program and graphical programming language, can be used to implement the graphical user interface screens of the graphical user interface shop floor control system of this invention. In particular, the PROGRESS 4GL® and the PROGRESS ADE®, available from the Progress Software Corp., Bedford, Mass., are preferably used to compliment the graphical user interface shop floor control system of this invention.

Figure 3:
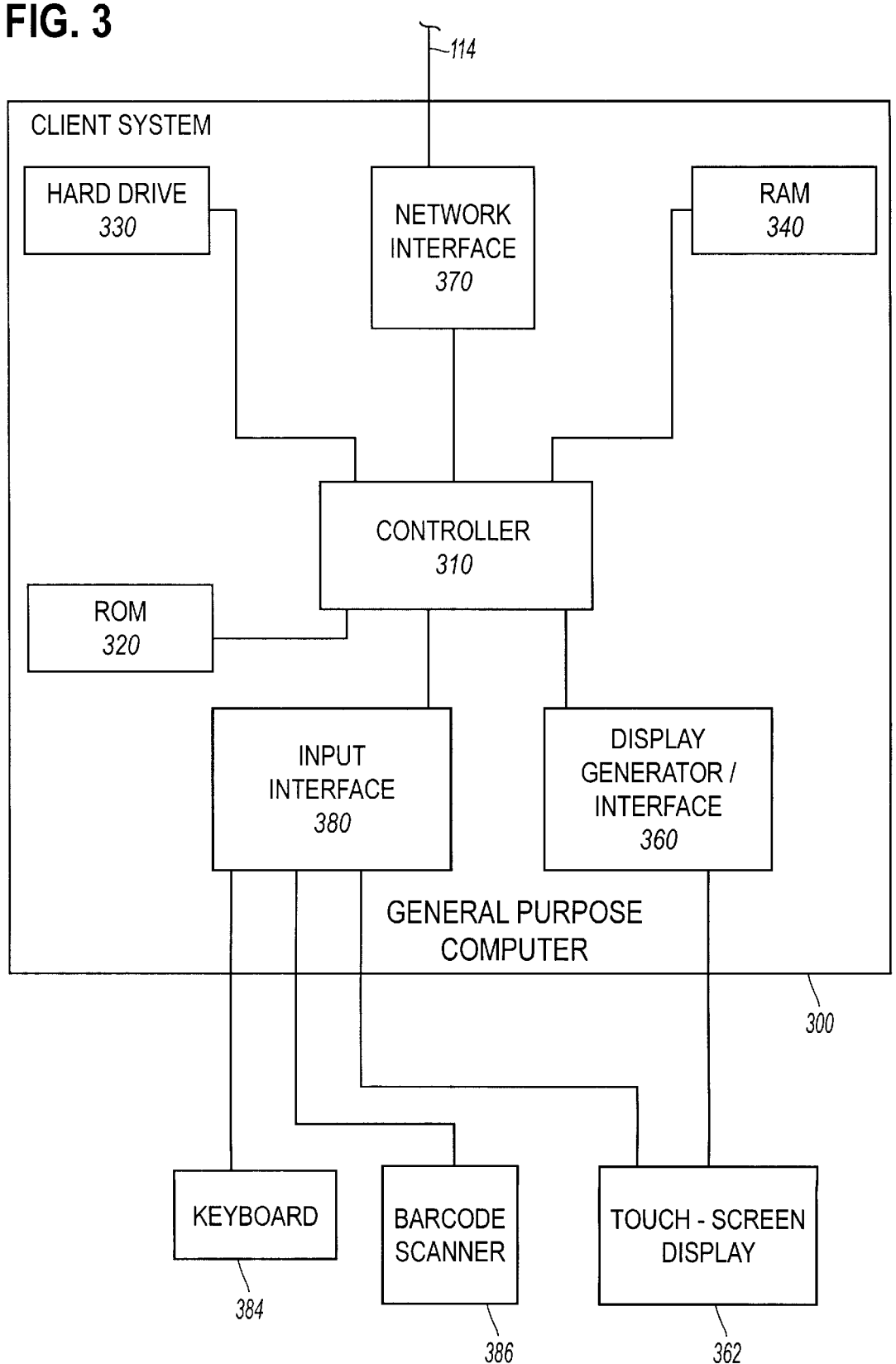
FIG. 3 is a functional block diagram showing in greater detail the elements of the client systems of FIG. 1.

FIG. 3 shows in greater detail the client systems 124, 128 and 132 of FIG. 1. As shown in FIG. 3, the client system is implemented on a general purpose computer 300, comprising, in part, a controller 310, a ROM 320, a hard drive 330, a RAM 340, a display generator/interface 360, a network interface 370 and an input interface 380. A touch-screen display 362 is connected to an output of the display generator/interface 360. One or more of a mouse 382, a keyboard 384, a bar code scanner 386, and the touch screen display 362 are connected to the input interface 380.

In operation, the graphical user interface shop floor control system of this invention is controlled primarily by the touch-screens display 262 and 362. The user moves between the various screens of the graphical user interface and selects factory elements preferably using the touch-screen display 262 or 362. The information from the touch screen display 262 or 362 is entered via the input interface 260 or 360 and processed by the controller 210 or 310, which is executing the graphical user interface shop floor control system of this invention. From the controller 310, the processed information is then transmitted through the network interface 370, over the communication network 114, the network interface 270 and the controller 210, to the relational database 250. Other information not directly related to a factory element, such as employee information or container information can be entered via the keyboard 284 or 384 or the bar code scanner 286 or 386.

For example, rather than creating separate icons for each material container, each material container is provided with a bar code label. When that container is moved about the factory floor, for example from a storage location to a machine tool, a particular container can be identified by scanning the bar code and then associating it with a particular factory element, such as a storage location or machine tool, by selecting that factory element. Alternately, a separate icon can be created for each container and accessed by selecting a storage location. This icon can then be moved about the graphical user interface from the storage location to another storage location or a production machine for converting the materials stored in that container into work-in-progress or finished goods.

Figure 4:
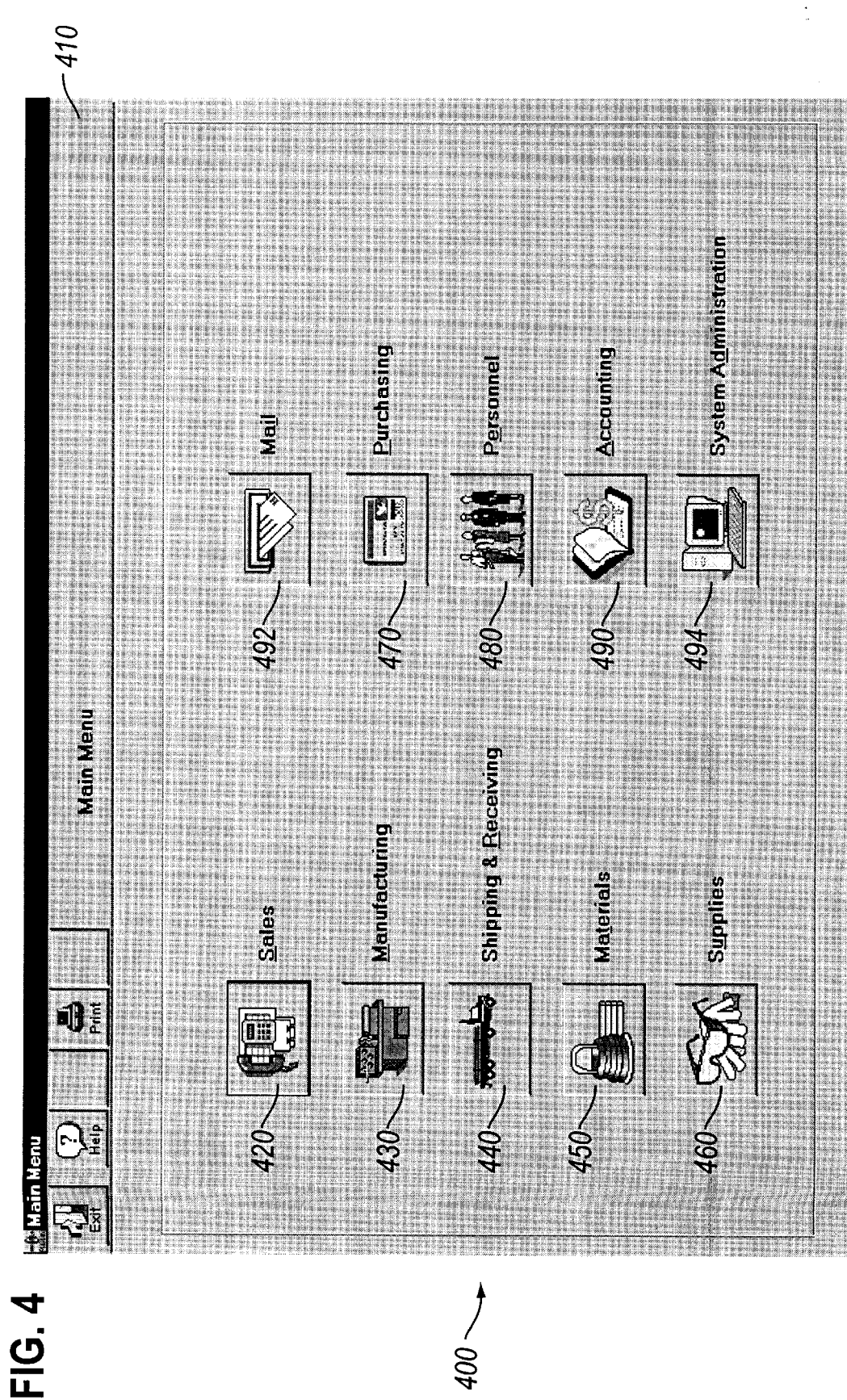
FIG. 4 is a main menu screen of the graphical user interface shop floor control system of this invention depicting the organizational structure of a company.

FIG. 4 shows an exemplary main menu screen 400 of the graphical user interface shop floor control system of this invention. The exemplary main menu screen 400 includes a menu bar 410 containing standard graphical user interface buttons, and therefore will not be further described herein. The exemplary main menu screen 400 further includes a number of buttons 420–494 that generally correspond to the organizational structure of the particular exemplary company implementing this example of the graphical user interface shop floor control system of this invention. Accordingly, while the exemplary main menu screen 400 shows particular buttons 420–494, any combination of one or more of these buttons, and/or other buttons, could be used.

For the particular exemplary company represented by the exemplary main menu screen 400, this company is organizationally divided into a sales department, represented by a SALES button 420, a manufacturing department, represented by a MANUFACTURING button 430, a shipping and receiving department, represented by a SHIPPING AND RECEIVING button 440, a materials department, represented by a MATERIALS button 450, a supplies department, represented by a SUPPLIES button 460, a purchasing department, represented by a PURCHASING button 470, a personnel department, represented by a PERSONNEL button 480, an accounting department, represented by an ACCOUNTING button 490, a mailroom, represented by a MAIL button 492, and a system administration department, represented by a SYSTEM ADMINISTRATION button 494.

Upon pressing any one of these buttons 420–494, the graphical user interface shop floor control system of this invention will display additional screens generally specific to that particular portion of the organizational structure of the exemplary company. For example, when the MANUFACTURING button 430 is selected, the graphical user interface shop floor control system of this invention displays an exemplary manufacturing menu screen 500 shown in FIG. 5.

Figure 5:
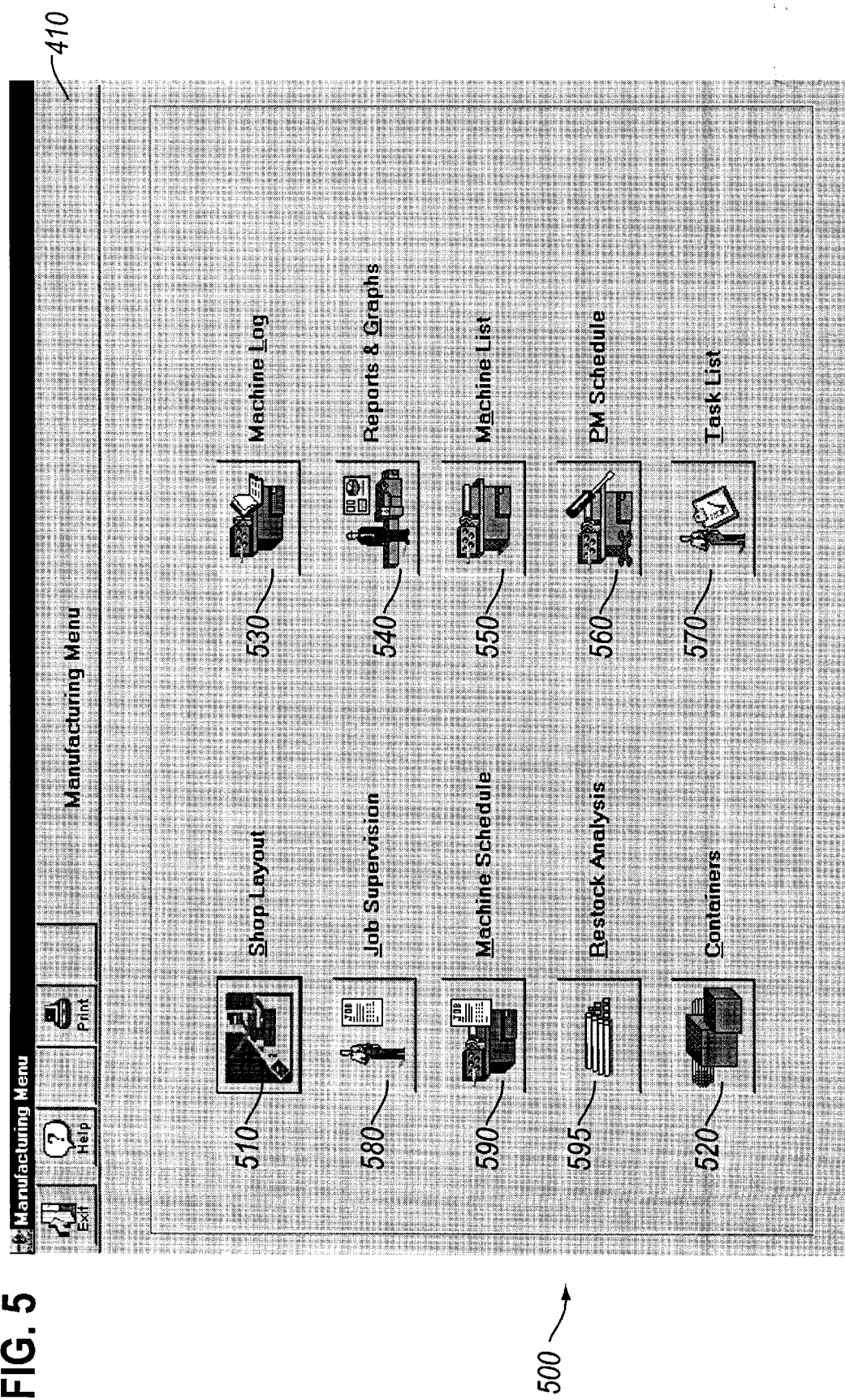
FIG. 5 is a menu factoring menu screen of the graphical user interface shop floor control system of this invention depicting the organizational and physical structures of the manufacturing structure shown in FIG. 4.
Figure 6:
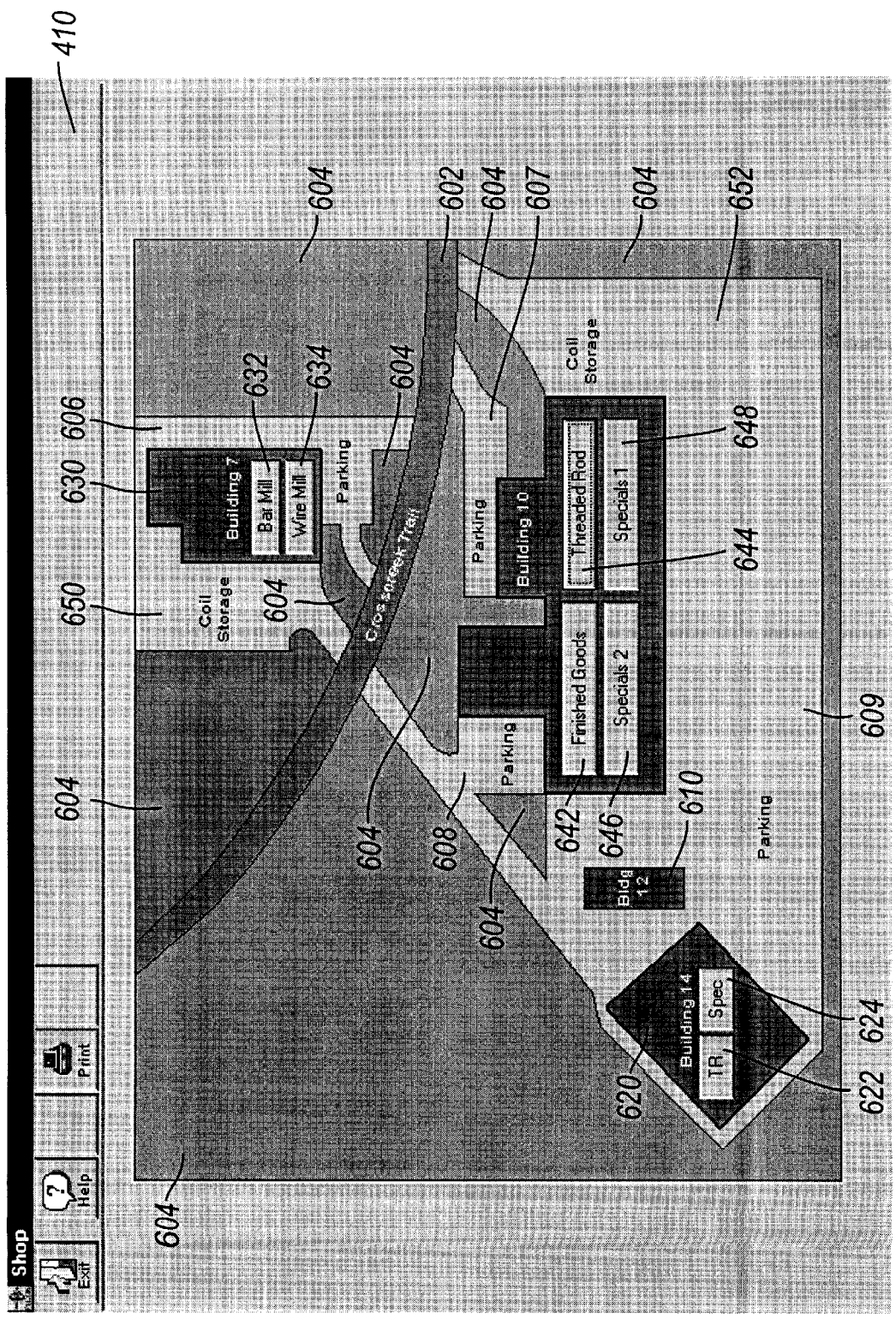
FIG. 6 is a factory layout screen of the graphical user interface shop floor control system of this invention.

As set forth above, FIG. 5 shows the exemplary manufacturing menu screen 500. The exemplary manufacturing menu 500 includes the menu bar 410 described above. The exemplary manufacturing menu screen 500 includes a number of buttons representing both the organizational structure of the manufacturing portion of the exemplary company, and the physical layout of the manufacturing portions of the exemplary company. The exemplary manufacturing menu screen 500 includes a SHOP LAYOUT button 510, a CON- TAINERS button 520, a MACHINE LOG button 530, a REPORTS AND GRAPHS button 540, a MACHINE LIST button 550, a PREVENTATIVE MAINTENANCE SCHEDULE button 560, a TASK LIST button 570, a JOB SUPERVISION button 580, a MACHINE SCHEDULE button 590, and a RESTOCK ANALYSIS button 595. When the SHOP LAYOUT button 510 is selected, the graphical user interface shop floor control system of this invention displays a first level, or factory, screen, such as the exemplary screen 600, of the graphical user interface shop floor control system of this invention, as shown in FIG. 6.

Figure 11:
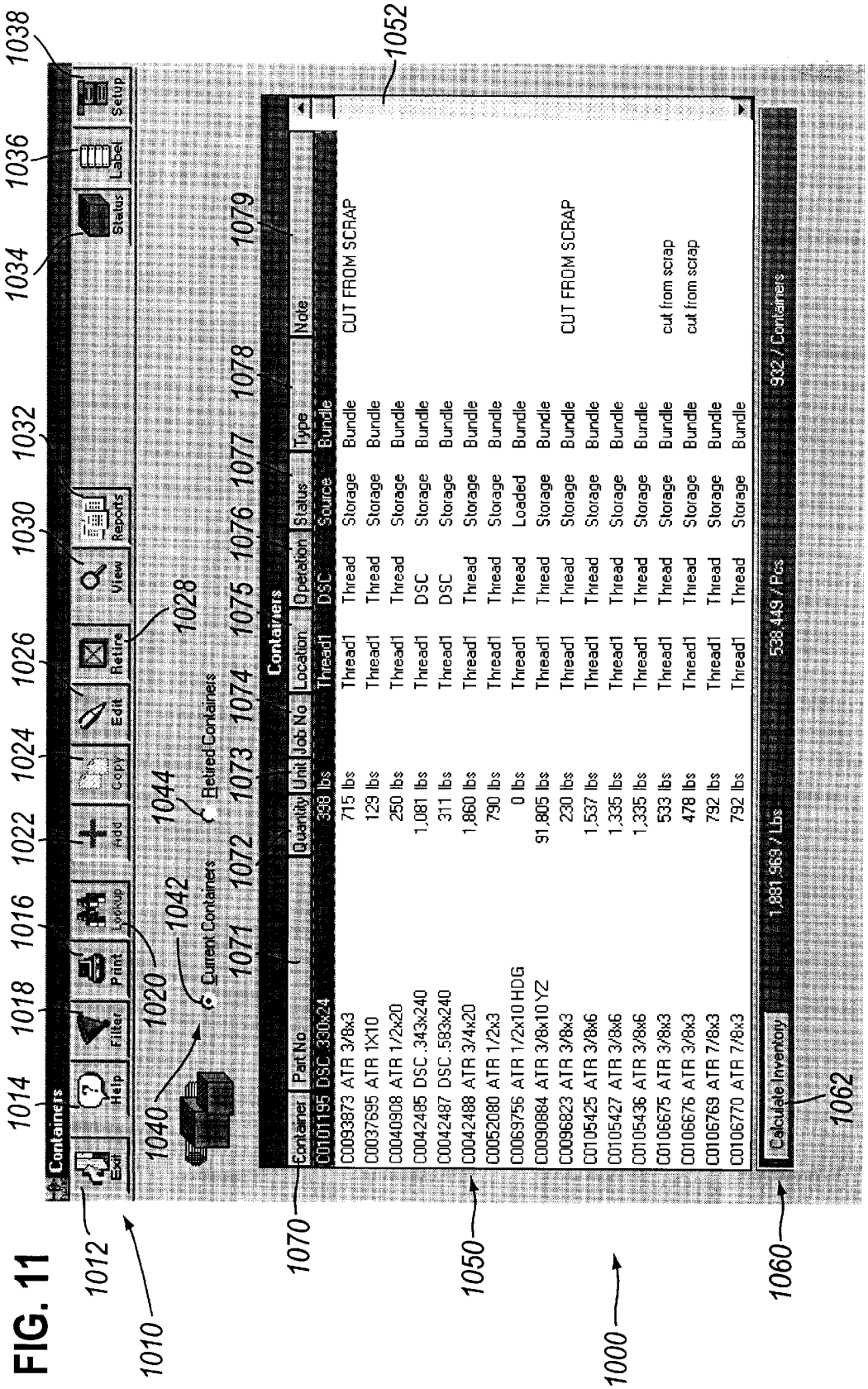
FIG. 11 is a containers screen of the graphical user interface shop floor control system of this invention.
Figure 16:
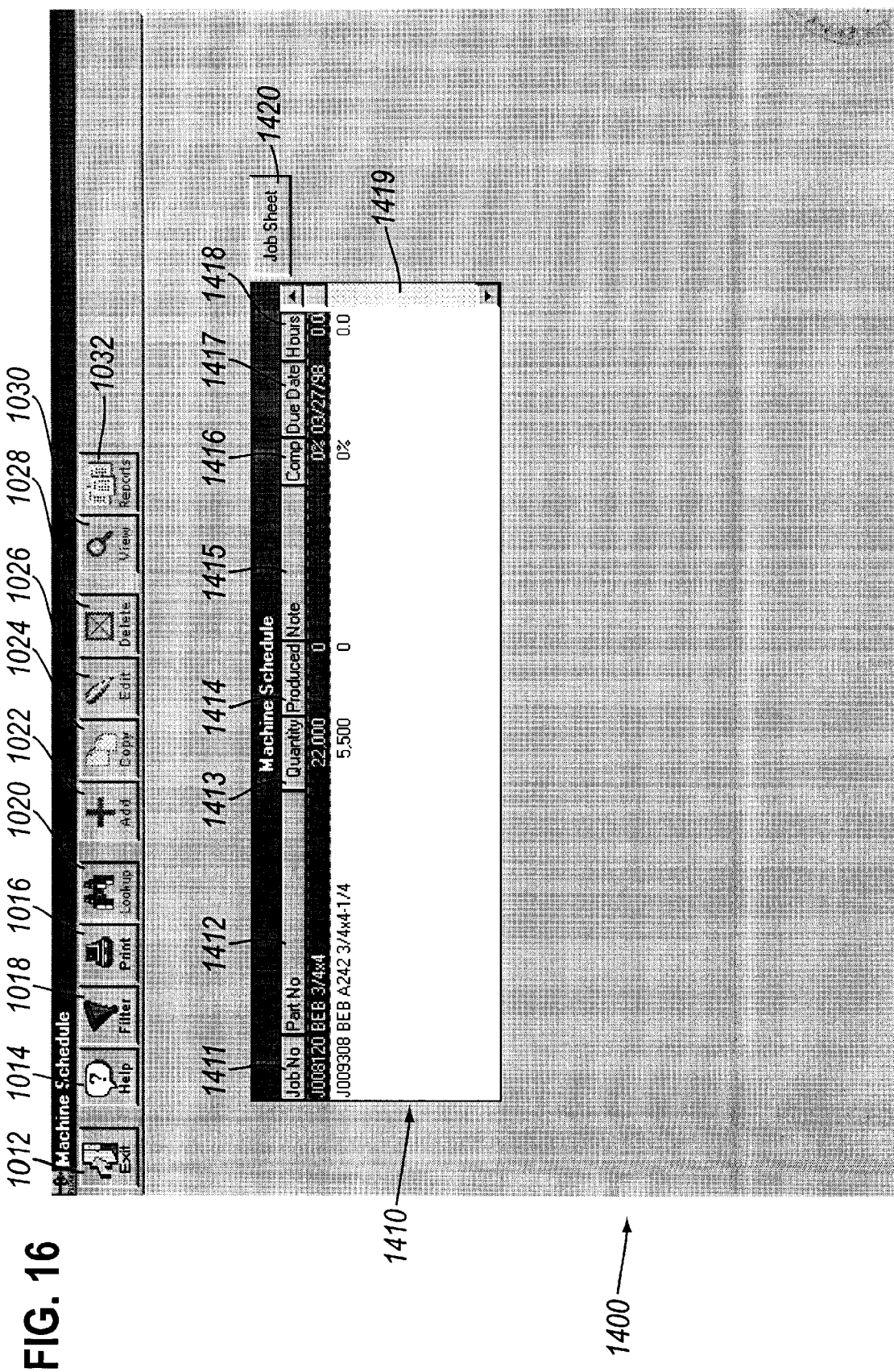
FIG. 16 shows a select production screen of the graphical user interface shop floor control system of this invention.
Figure 21:
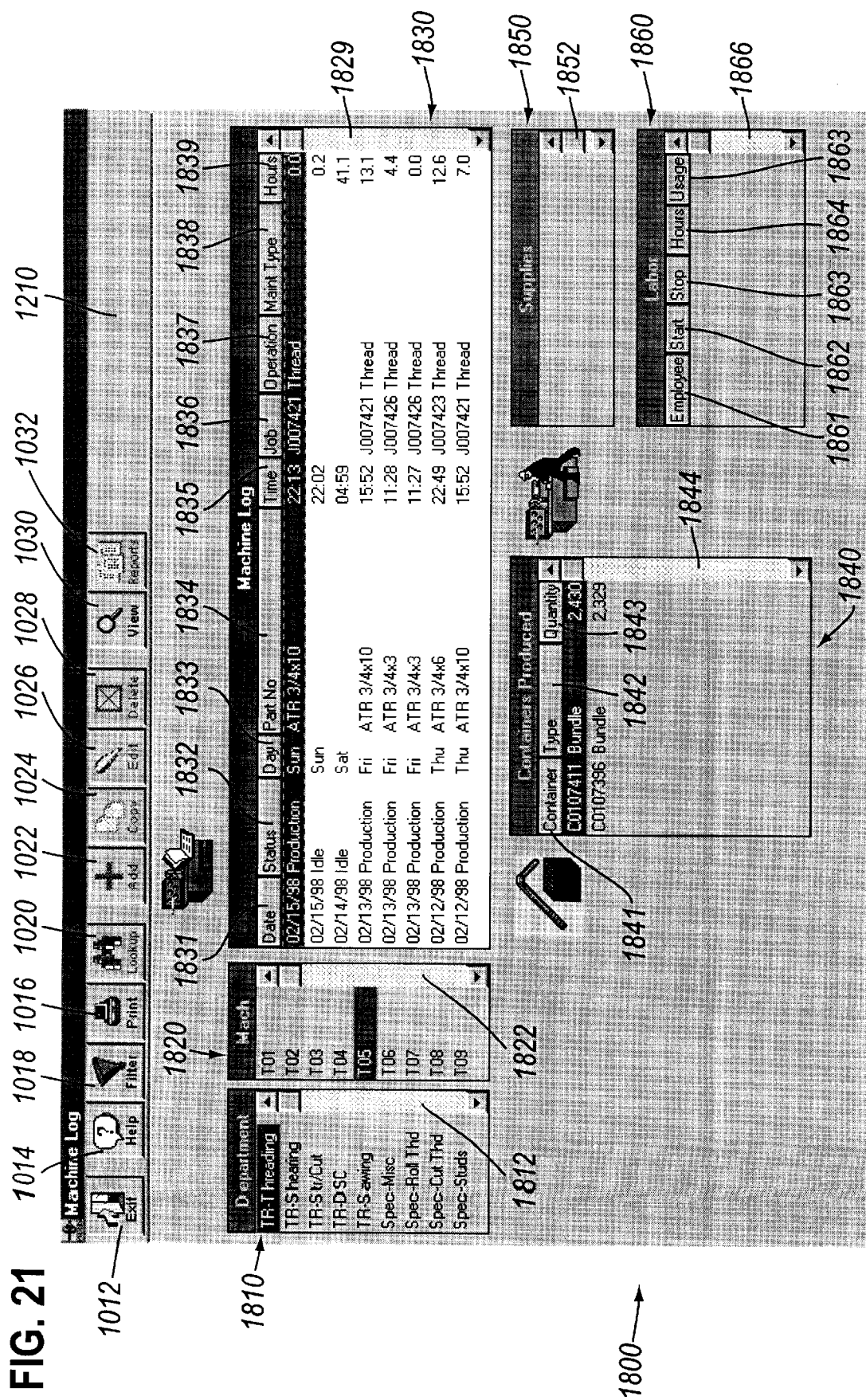
FIG. 21 is a machine log screen of the manufacturing menu of FIG. 5 according to this invention.
Figure 22:
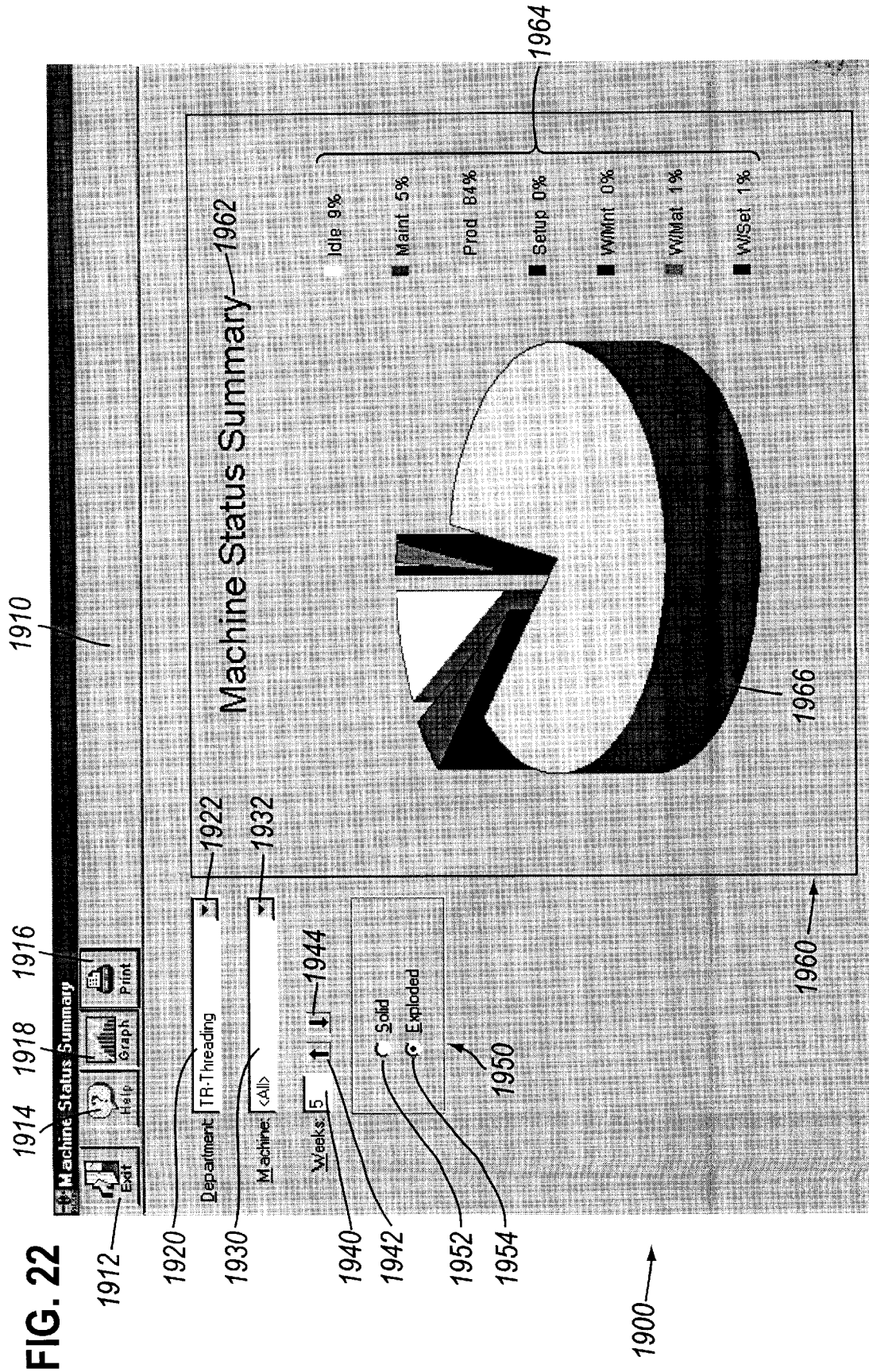
FIG. 22 is a machine status summary screen of the reports and graphs menu of the manufacturing menu of FIG. 5 of the graphical user interface shop floor control system of this invention.
Figure 23:
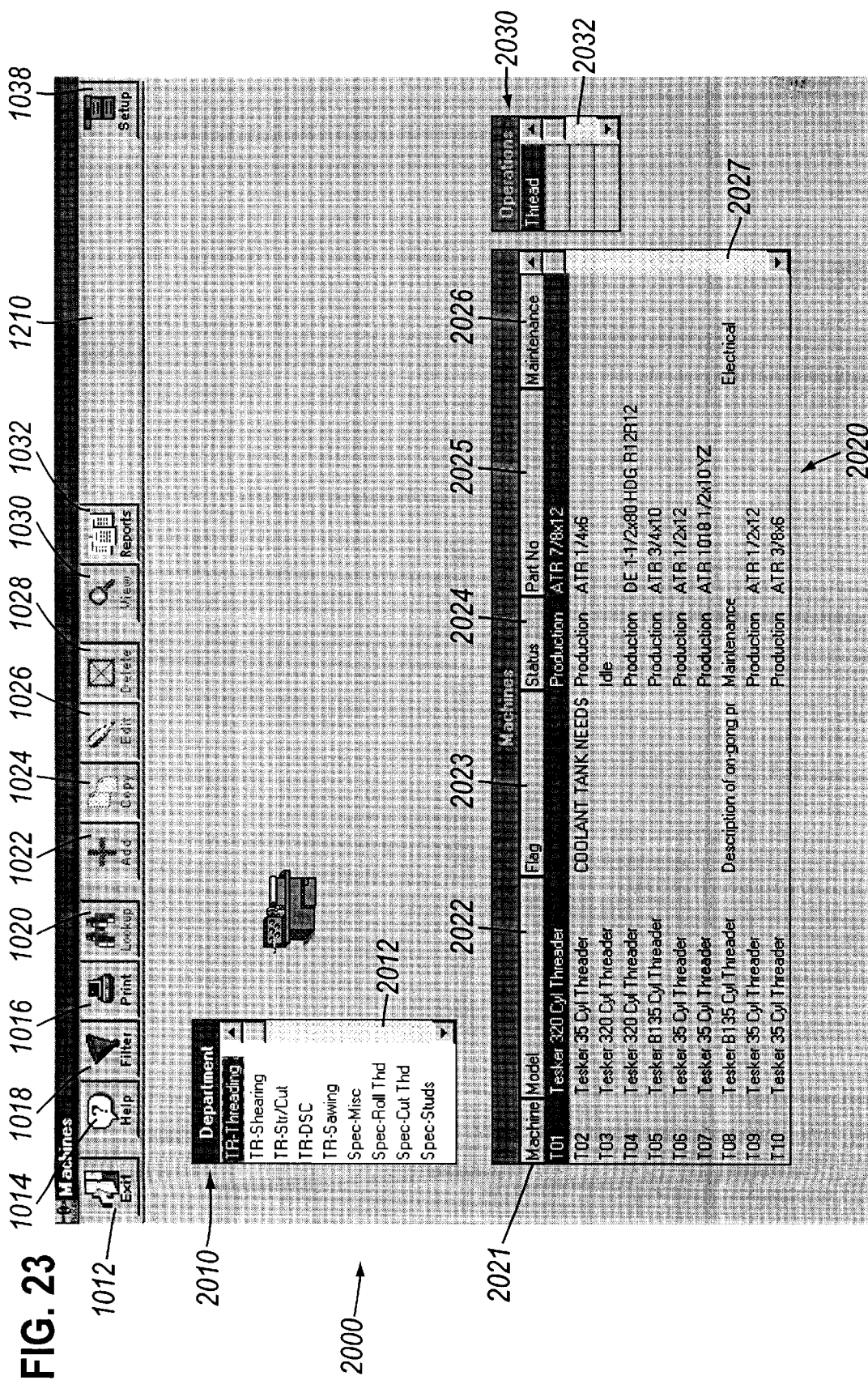
FIG. 23 is a machines list screen of the manufacturing menu of FIG. 5 of the graphical user interface shop floor control system of this invention.
Figure 24:
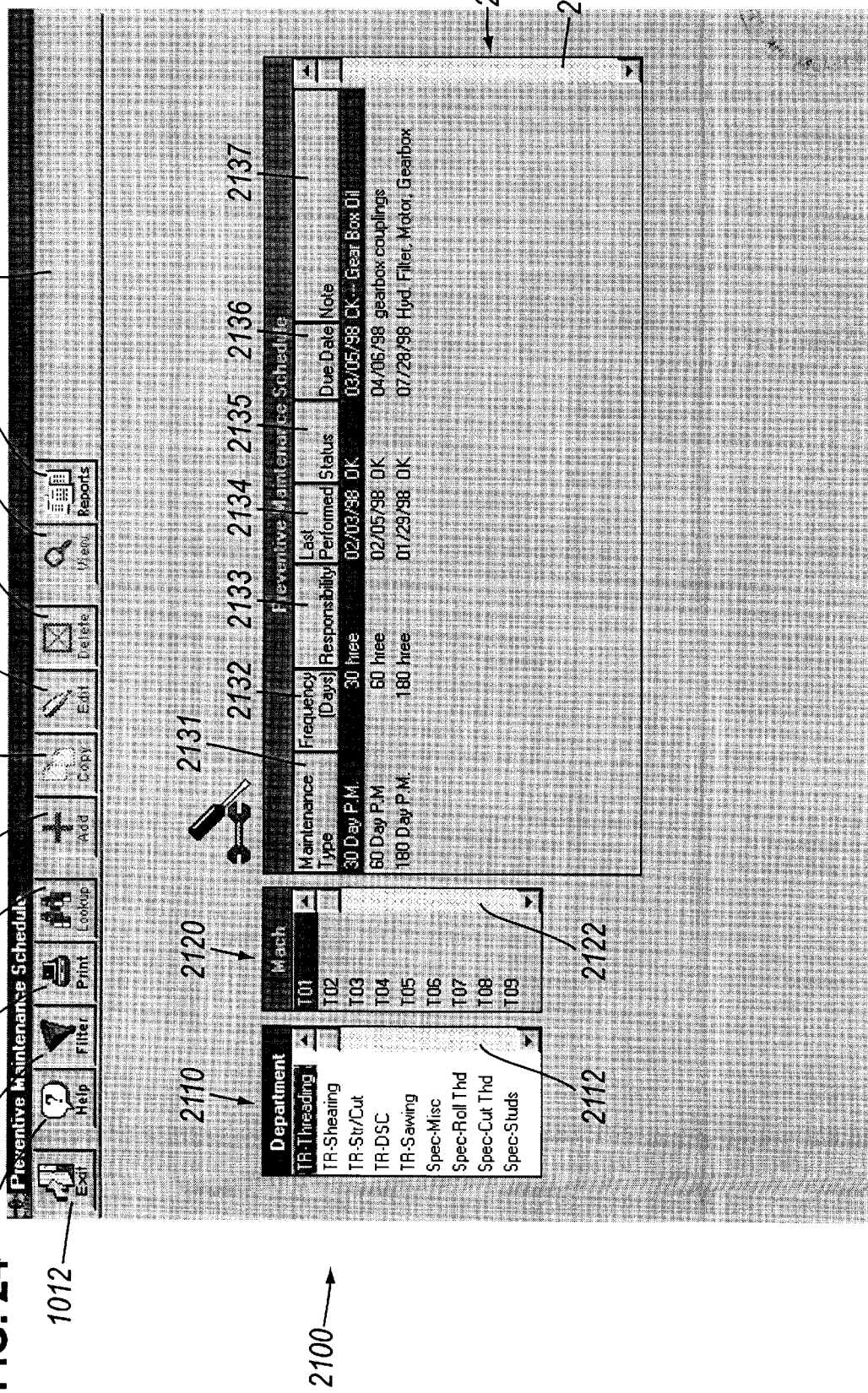
FIG. 24 is a preventative maintenance schedule screen of the manufacturing menu of FIG. 5 according to the graphical user interface shop floor control system of this invention.
Figure 25:
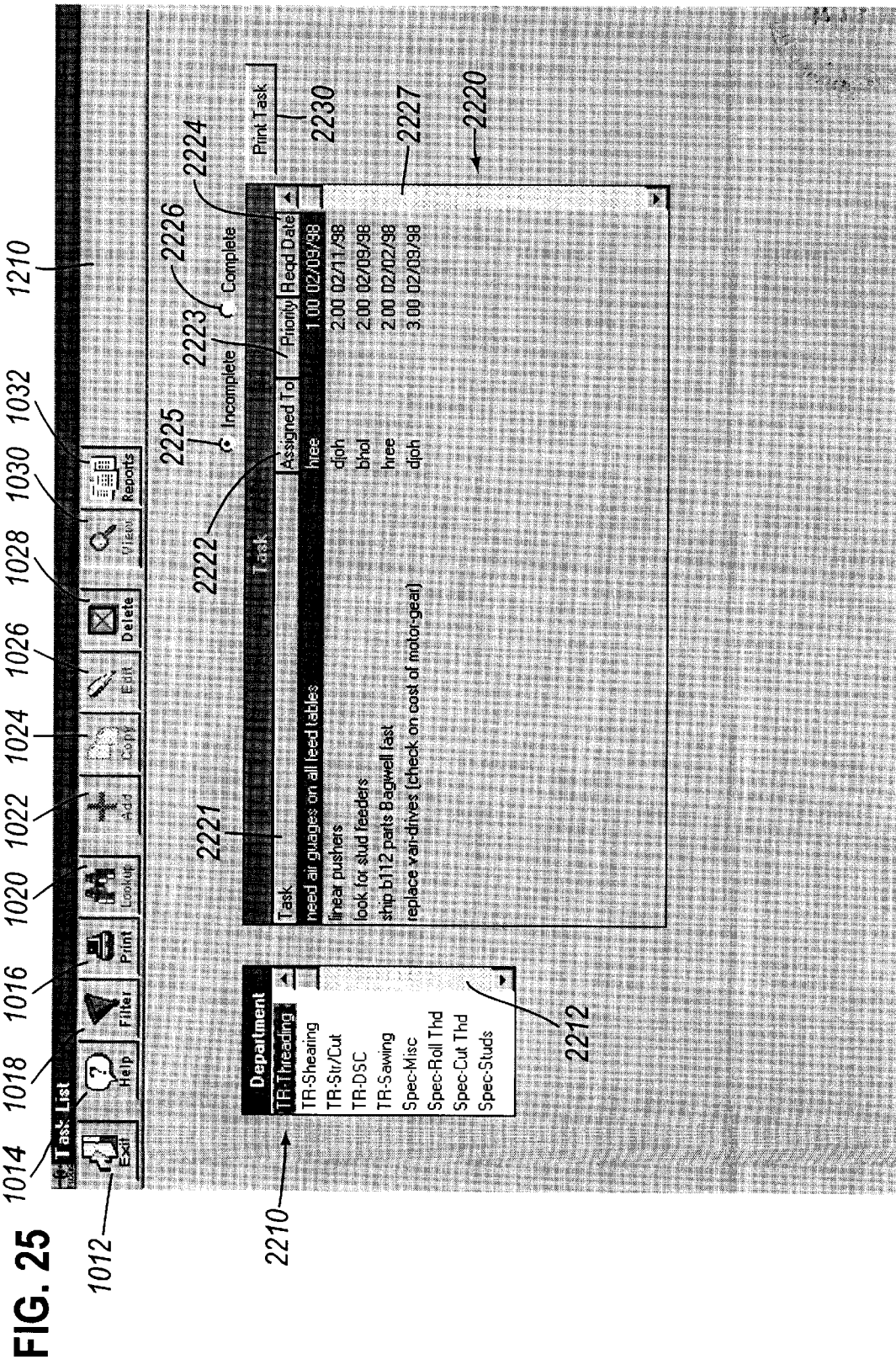
FIG. 25 is a task list screen of the manufacturing menu of FIG. 5 according to the graphical user interface shop floor control system of this invention.

When the CONTAINERS button 520 is selected, the graphical user interface shop floor control system of this invention displays a containers screen, such as the exemplary screen 1000, of the graphical user interface shop floor control system of this invention, as shown in FIG. 11. When the MACHINE LOG button 530 is selected, the graphical user interface shop floor control system of this invention displays a machine log screen, such as the exemplary screen 1800, of the graphical user interface shop floor control system of this invention, as shown in FIG. 21. When the REPORTS AND GRAPHS button 540 is selected, the graphical user interface shop floor control system of this invention displays a reports and graphs menu, which provides a list of different reports and graphs that can be created. FIG. 22 shows an exemplary graph, a machine status summary graph 1900 of the graphical user interface shop floor control system of this invention. When the MACHINE LIST button 550 is selected, the graphical user interface shop floor control system of this invention displays a machines screen, such as the exemplary screen 2000, of the graphical user interface shop floor control system of this invention, as shown in FIG. 23. When the PREVENTATIVE MAINTENANCE SCHEDULE button 560 is selected, the graphical user interface shop floor control system of this invention displays a preventative maintenance schedules screen, such as the exemplary screen 2100, of the graphical user interface shop floor control system of this invention, as shown in FIG. 24. When the TASK LIST button 570 is selected, the graphical user interface shop floor control system of this invention displays a task list screen, such as the exemplary screen 2200, of the graphical user interface shop floor control system of this invention, as shown in FIG. 25. When the MACHINE SCHEDULE button 590 is selected, the graphical user interface shop floor control system of this invention displays a machine schedule screen, such as the exemplary screen 1400, of the graphical user interface shop floor control system of this invention, as shown in FIG. 16. Each of these screens will be described in greater detail below.

When either the JOB SUPERVISION button 580 or the RESTOCK ANALYSIS button 595 is selected, a specific data entry and/or data viewing screen is displayed that allows a user to view data stored by, and/or add data to, the database 250 of the graphical user interface shop floor control system of this invention.

It should also be appreciated that it is not necessary to use either the main menu screen 400 or the manufacturing menu screen 500 as the initially displayed screen initially displayed when the graphical user interface shop floor control system is opened on a particular one of the client systems 124, 128 and/or 132 or the server system 112. Rather, an appropriate one of the factory screen 600 or the shop floor screens 700, 800, 2300 or 2400 described below or some other appropriate one of the various screens of the graphical user interface shop floor control system disclosed herein can be used as the initially displayed screen. This is especially true when the graphical user interface shop floor control system of this invention is used to represent a job shop, as in the job shop represented in FIG. 27, rather than the production factory represented in FIG. 6 and the production shops represented in FIGS. 7, 8 and 26.

FIG. 6 shows an exemplary embodiment of the first level, or factory, screen 600 of the graphical user interface shop floor control system of this invention. In particular, the exemplary factory screen 600 represents a production factory having a number of distinct shop floors. The factory screen 600 includes the menu bar 410 described above.

As shown in FIG. 6, the factory screen 600 presents an overhead plan view of the buildings, parking lots and other areas forming the factory represented by the factory screen 600. Moreover, the various buildings, parking lots and other areas are shown in their actual relative locations and are shown to scale. Preferably, the various areas of the factory screen, are colored according to their function. For example, the non-improved, or grassy, areas 604 are colored green, while the various parking areas 606, 607, 608 and 609 are preferably colored light gray. Similarly, the road 602 cutting through the factory site is preferably colored dark gray. The light and dark gray colors are selected to represent the asphalt or concrete materials used to form the road 602 and the parking areas 606–609. The various buildings 610, 620, 630 and 640 are preferably colored using some other distinctive color.

Selectable icons representing the various shop floors of the factory, for a small factory, or the various shop floors and intermediate functional or structural divisions of the buildings, for a large factory, are positioned within the bounds of the building icons representing the particular buildings containing the particular shop floors or intermediate functional or structural divisions. Thus, as shown in FIG. 6, the icon 630 representing Building 7 contains selectable icons 632 and 634 representing the Bar Mill and the Wire Mill, respectively, contained within Building 7. Similarly, the icon 640 representing Building 10 contains within its bounds the selectable icons 642, 644, 646 and 648, representing the Finished Goods Area, the Threaded Rod Shop, the Specials 2 Area and the Specials 1 Area, respectively, contained within Building 10. Likewise, the icon 620 representing Building 14 contains within its bounds the icons 622 and 624 representing the TR area and the Spec Area, respectively, contained within Building 14.

As shown in FIG. 6, each of the icons 610, 620, 630 and 640, representing Buildings 12, 14, 7 and 10, respectively, is shaped corresponding to the shape of the particular building that icon represents. Furthermore, each of the icons 610, 620, 630 and 640 is positioned within the plant screen 600 at a relative location and orientation corresponding to the actual relative location and orientation of the corresponding Buildings 12, 14, 7 and 10, respectively. Additionally, the road 602, the unimproved areas 604, the parking areas 606–609 and the coil storage areas 650 and 652 are also positioned in the factory screen 600 at locations and orientations corresponding to the various represented portions of the actual factory.

In operation, the factory screen 600 is generally used by the various factory managers, who need to access all areas of the factory represented by the factory screen 600. The factory screen 600 will generally be used by the workers of the factory only when they need to navigate among the various shop floor screens used to represent the various production areas of the factory, such as the shop floor screens representing the Bar Mill and Wire Mill of Building 7, the Finished Goods, Threaded Rod, Specials 2, and Specials 1 Areas of Building 10 and the TR and Spec Areas of Building 14, as well as any outside storage areas outside of the various buildings, such as the coil storage areas 650 and 652. Thus, the first level screen will usually not be the primary display of the various client systems, such as the client systems 124, 128 and 132. Rather, each of these client systems will preferably use as its primary display the particular shop floor screen corresponding to the particular shop floor in which that client system is located.

Figure 7:
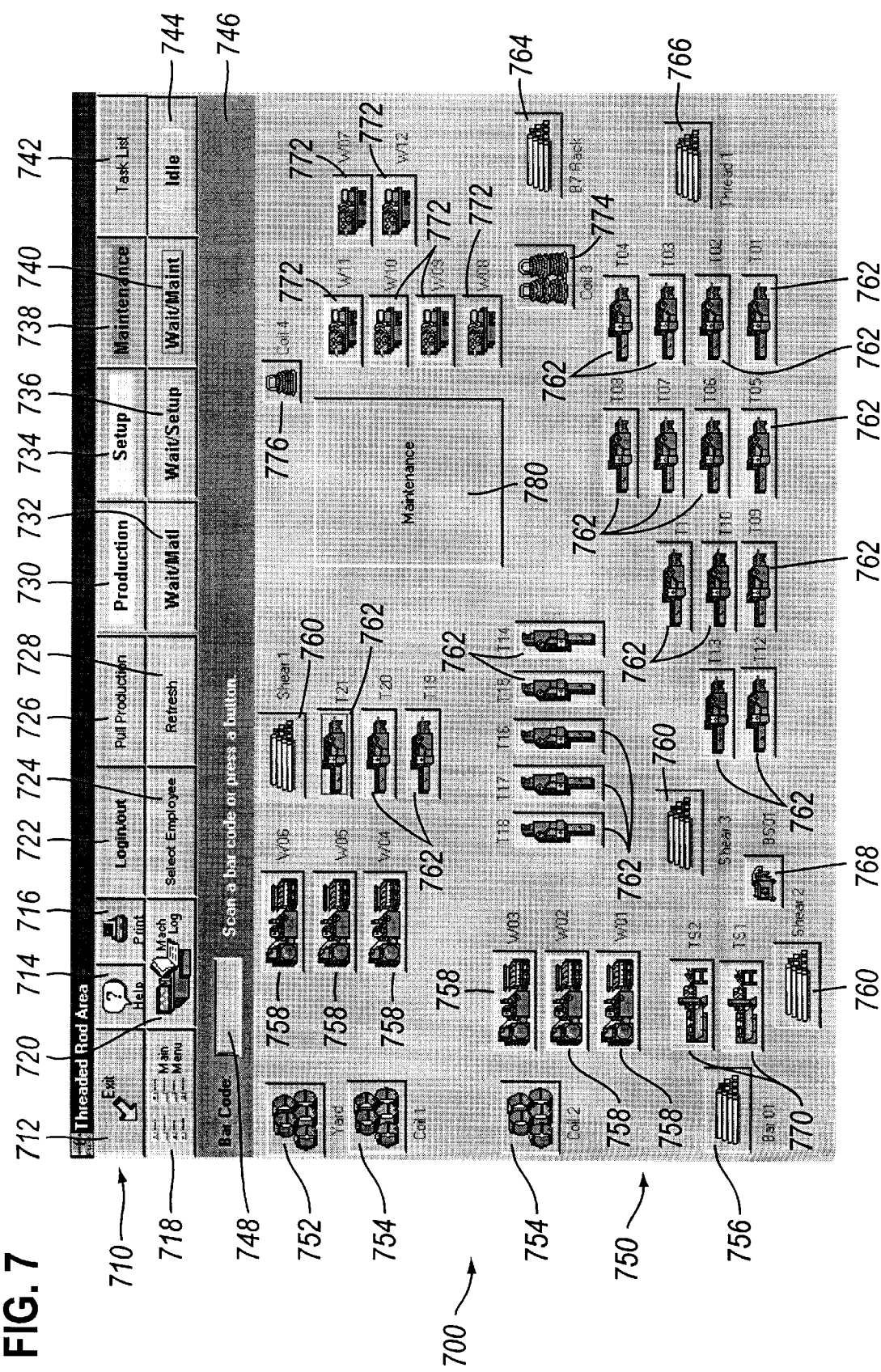
FIG. 7 is a first shop floor screen for a production shop of the graphical user interface shop floor control system of this invention depicting the Threaded Rod area of FIG. 6.
Figure 8:
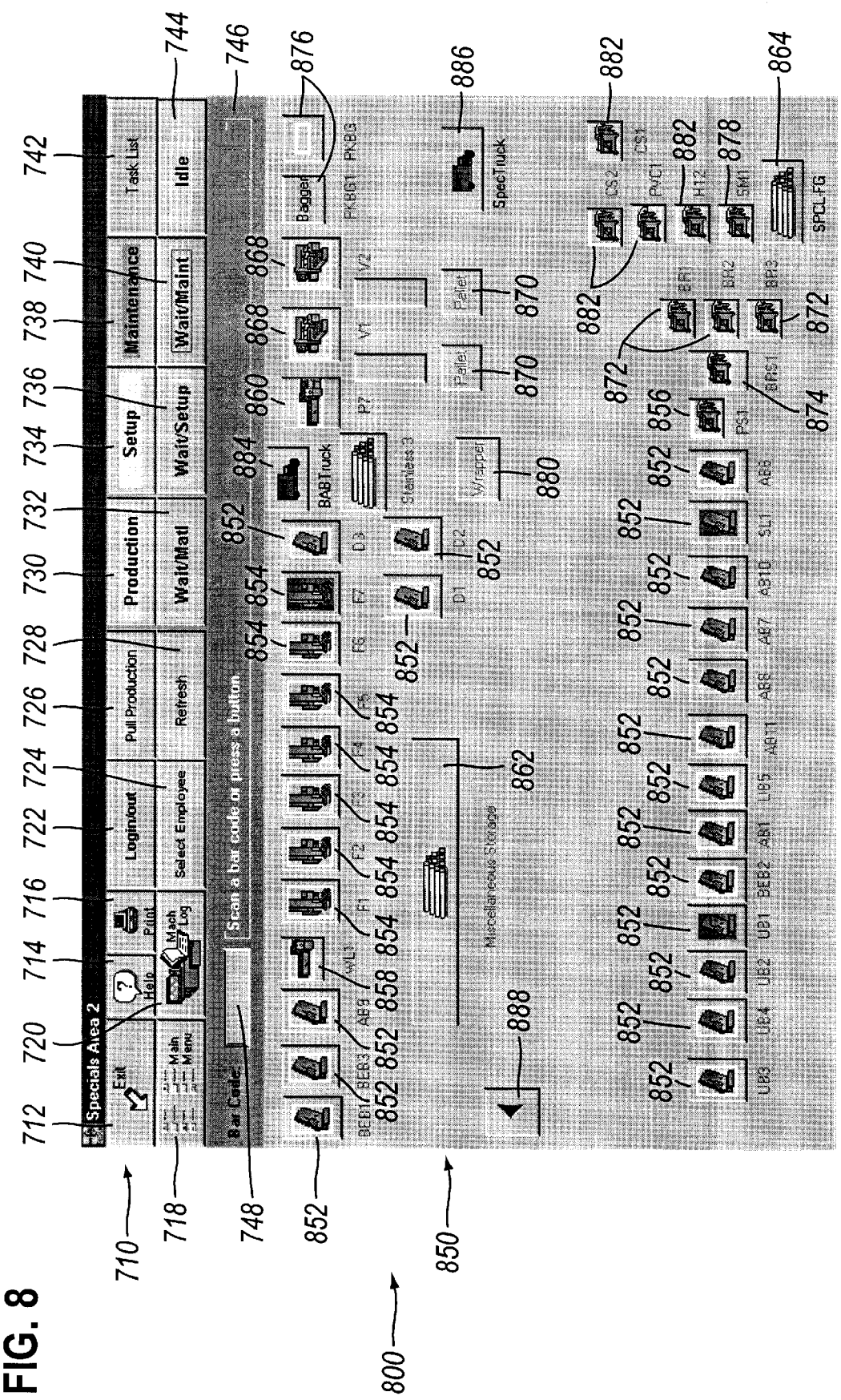
FIG. 8 is a second shop floor screen for a production shop of the graphical user interface shop floor control system of this invention depicting the Specials Area 2 of FIG. 6.

FIGS. 7 and 8 show two such exemplary shop floor screens 700 and 800, representing the Threaded Rod area, represented by the selectable icon 644, and the Specials Area 2, represented by the selectable icon 646, of the factory represented by the factory screen 600 of FIG. 6. In particular, the exemplary shop floor screens 700 and 800 each represents the shop floor of a distinct production shop.

As shown in FIG. 7, the shop floor screen 700 comprises a menu bar 710 and a shop floor representation 750. The menu bar 710 includes an EXIT button 712, a HELP button 714, a PRINT button 716, a MAIN MENU button 718, a MACHINE LOG button 720, a LOGIN/OUT button 722, a SELECT EMPLOYEES button 724, a PULL PRODUCTION button 726, a REFRESH button 728, a PRODUCTION button 730, a WAIT/MATL button 732, a SETUP button 734, a WAIT/SETUP button 736, a MAINTENANCE button 738, a WAIT/MAINT button 740, a TASK LIST button 742 and an IDLE button 744. The menu bar 710 also includes a bar code area 746 containing a bar code input box 748.

The shop floor representation 750 comprises a number of material storage location icons, production machine element icons and other area icons, such as office area icons and the like. In particular, the material storage location icons of the shop floor representation 750 include a number of material storage location icons, including a YARD icon 752, a pair of first COIL icons 754, a BAR icon 756, a trio of SHEAR icons 760, a RACK icon 764, a THREAD icon 766, a second COIL icon 774 and a third COIL icon 776. Similarly, the production machine element icons of the shop floor representation 750 include machine icons 758 representing six first-type wire drawing machines W01–W06, machine icons 762 representing twenty-one thread cutting machines T01–T21, a machine icon 768 representing a bar straightener machine, machine icons 770 representing two other thread cutting machines TS1 and TS2 and machine icons 772 representing six second-type wire drawing machines W07–W12. Finally, the shop floor representation 750 includes an office icon 780 representing the maintenance office for the Threaded Rod area.

It should be appreciated that each of the different types of machines represented by the machine icons 758, 762, 768, 770 and 772 are identified by using different graphic representations of the corresponding machines that are embedded in or contained within the various machine icons 758, 762, 768, 770 and 772. In particular, each different graphic representation closely corresponds to the visual appearance of the correspondingly represented machine. Furthermore, the machine icon representing each particular machine is physically located within the shop floor representation 750 at a location that closely corresponds to the actual location of the represented machine on the shop floor of the Threaded Rod Area. Accordingly, even unsophisticated workers or workers completely unfamiliar with the graphical user interface shop floor control system of this invention can readily relate each selectable machine icon with the corresponding machine on the shop floor.

Similarly, each of the various material storage location icons 752, 754, 756, 760, 764, 766, 774 and 776 include a graphic representation of, and alpha-numeric name indicating, the type of material stored in the corresponding materials storage locations on the shop floor of the Threaded Rod Area. Thus, the material storage location icons 752 and 754 for the YARD storage area and the COIL 1 and COIL 2 storage areas incorporate the same graphic, indicating these storage areas generally store the same type of material, but using names that distinguish the particular storage areas that store the same types of material. Thus, the material storage location icons 774 and 776 for the COIL 3 and COIL 4 storage areas, respectively, of the Threaded Rod Area use different graphics from each other and from the material storage location icons 752 and 754. This clearly indicates that these storage areas generally store different types of materials from the COIL 1 and COIL 2 storage areas, even though their names are very similar. In contrast, the material storage location icons 756, 760, 764 and 766 use the same graphic icon to represent the BAR 01, SHEAR 1–SHEAR 3, B7 RACK, and THREAD 1 storage areas, thus clearly indicating that these storage areas store generally the same type of material despite the very different names of these storage areas.

Referring again to the menu bar 710, the EXIT button 712, the HELP button 714 and the PRINT button 716 provide the conventional functions for such buttons, as is commonly understood by those familiar with MS Windows 95® operating system. The MAIN MENU button 718 closes the currently displayed screen of the graphical user interface shop floor control system of this invention and returns the user to the main menu 400 of the graphical user interface shop floor control system of this invention shown in FIG. 4.

Figure 17:
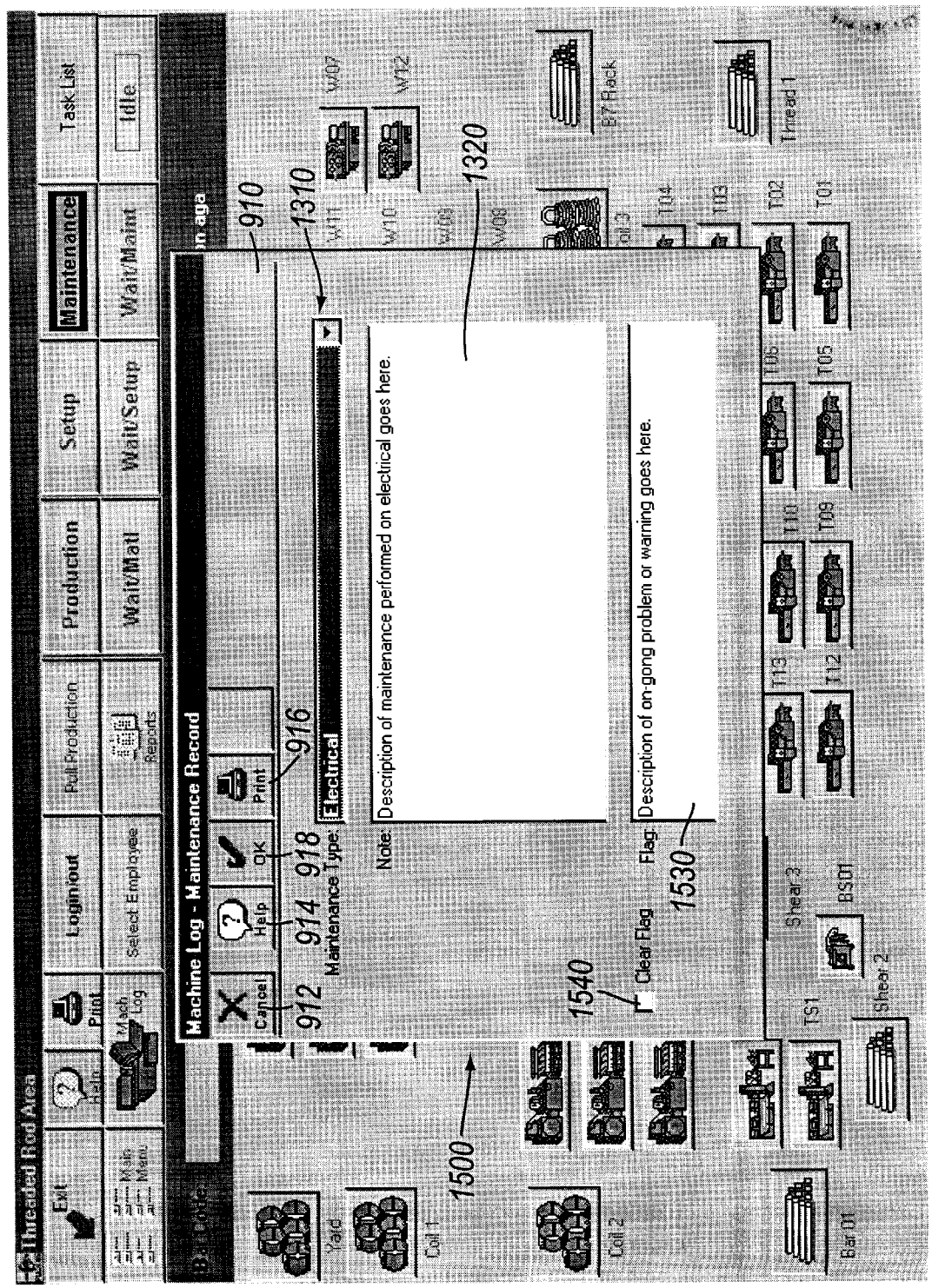
FIG. 17 shows a machine log-maintenance record screen of the graphical user interface shop floor control system of this invention.

The MACHINE LOG button 720 is used to access the machine log-maintenance record screen 1500, as shown in FIG. 17 and described in greater detail below. The MACHINE LOG button 720 also contains a graphic showing a generic machine and a logbook. This graphic clearly indicates to unsophisticated or unfamiliar users that the MACHINE LOG button is used to access the maintenance record for the machine represented by the selected one of the various machine icons shown in the shop floor representation 750.

Figure 13:
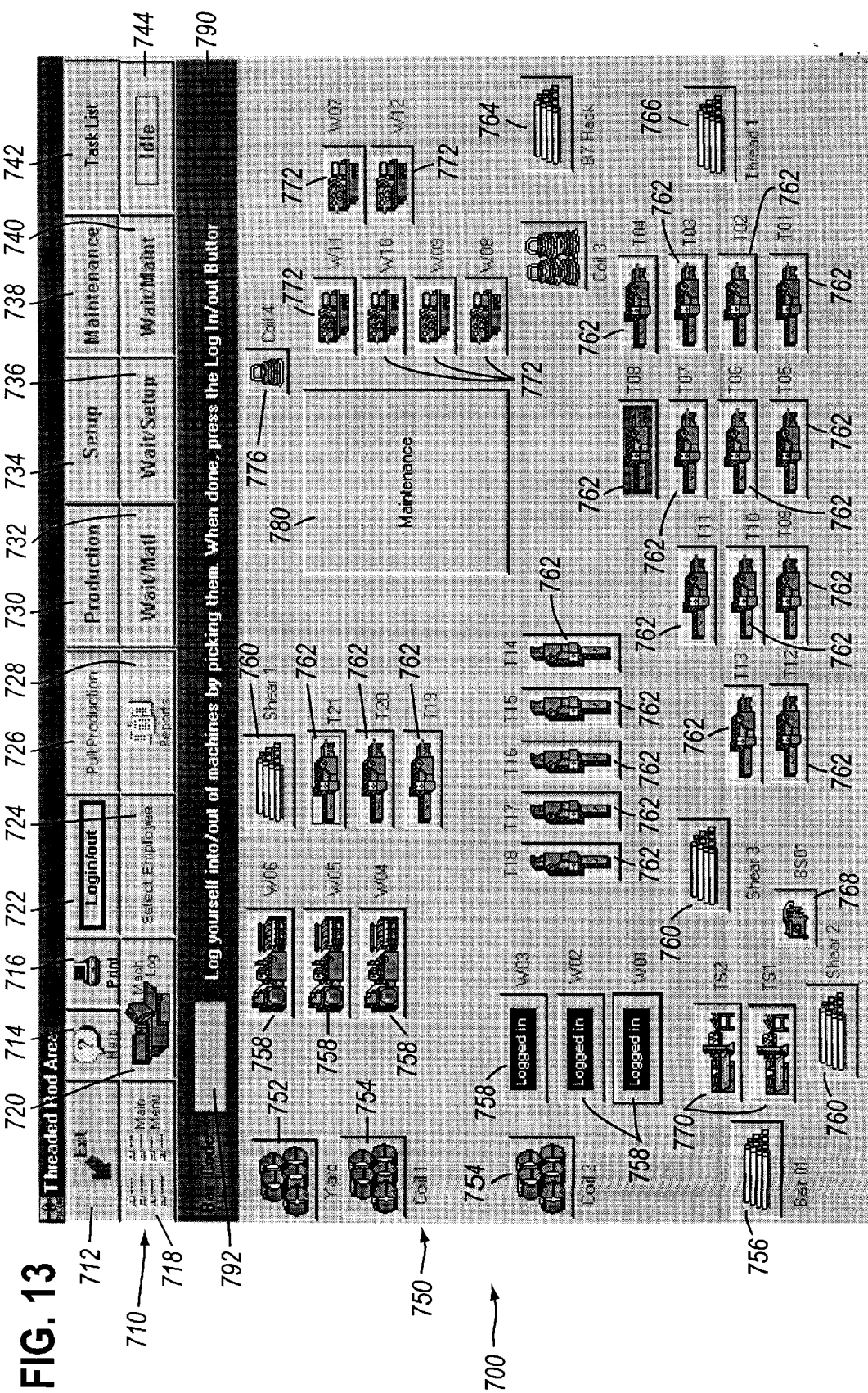
FIG. 13 shows the threaded rod area shop floor screen when used to log a worker onto or off of one or more machine elements of the factory floor.
Figure 14:
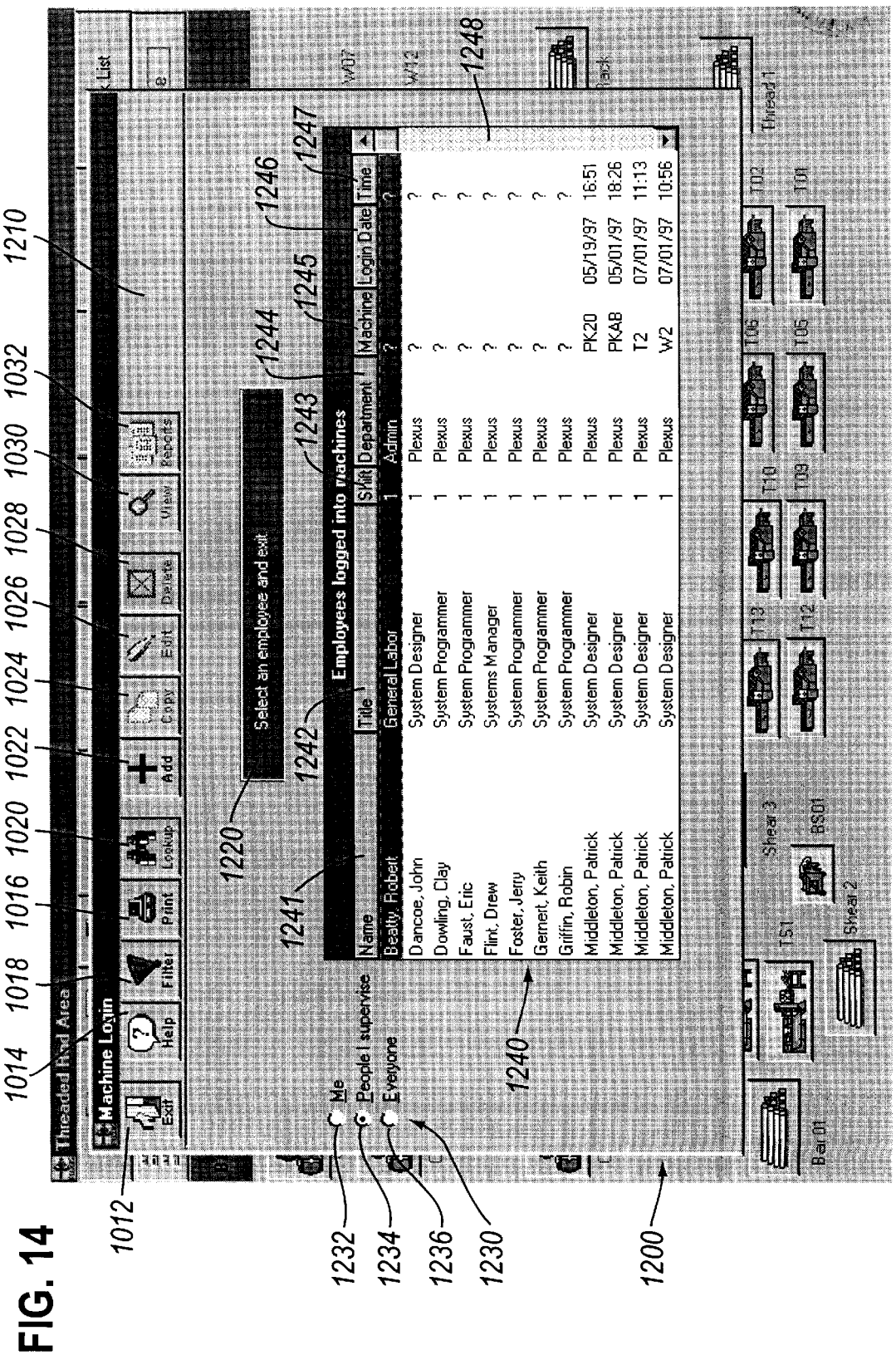
FIG. 14 shows a machine log-in screen of the graphical user interface shop floor control system of this invention.
Figure 15:
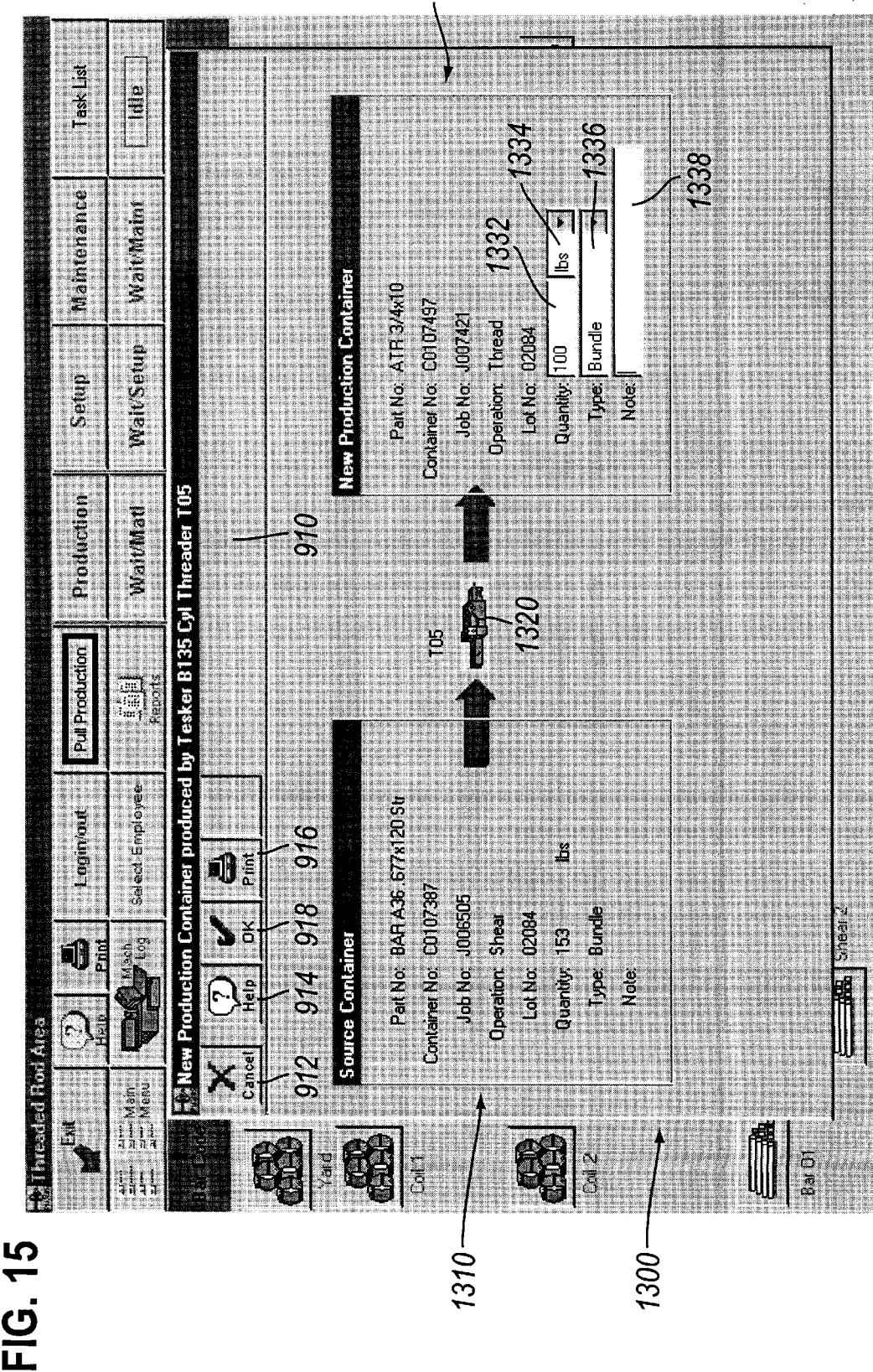
FIG. 15 shows a new production screen of the graphical user interface shop floor control system of this invention.

The LOGIN/OUT button 722 is used to switch the bar code portion 746 of the MENU button 710 to the login/out portion 790, as shown in FIG. 13 and described in greater detail below. The SELECT EMPLOYEE button 724 is used to access the machine login screen 1200, as shown in FIG. 14 and described in greater detail below. The PULL PRODUCTION button 726 is used to open the new production screen 1300, as shown in FIG. 15 and described in greater detail below. The REFRESH button 728 is used to refresh the data of the graphical user interface shop floor control system stored locally on the particular client system displaying the currently displayed screen. The operation of the REFRESH button 728 will be described in greater detail below.

The right-most eight buttons 730–744 are collectively known as the machine status buttons. For the particular factory shown in FIGS. 6–25, the implemented machine status buttons include the PRODUCTION button 730, the WAIT/MATL button 732, the SETUP button 734, the WAIT/SETUP button 736, the MAINTENANCE button 738, the WAIT/MAINT button 740, the TASK LIST button 742 and the IDLE button 744. However, it should be appreciated that the particularly implemented machine status buttons will differ between different implementations of the graphical user interface shop floor control system of this invention, depending on the particular needs and machines of the particular factory represented by the particular implementation of the graphical user interface shop floor control system of this invention.

The machine status buttons are used to update the data stored in the relational database 250 on the server system 112 when the status of one of the represented machines changes. In particular, to change the status of a particular machine, the user first selects one of the machine status buttons 730–744, and then selects the machine icon corresponding to that particular machine. Furthermore, depending on the particular implementation of the graphical user interface shop floor control system of this invention, the machine status buttons can be used to submit requests for materials, setup or maintenance on a particular machine.

In addition, each of the machine status buttons has associated with it a particular color encoding. Accordingly, when a factory element icon displayed in the shop floor representation 750 is assigned a particular machine status, that icon takes, in addition to its embedded graphic, a color encoding corresponding to the particular assigned machine status. In this way, the various users of the system, including the workers and the supervisors on the shop floor and the various supervisors and managers in other parts of the factory, including the administrative offices, can quickly and visually determine the status of the various machines and other factory elements on the various shop floors.

In particular, the PRODUCTION button 730 uses a solid green color encoding, as shown in FIG. 7. In an analogy to a green traffic light, the green color encoding indicates machines assigned the production status are currently operating to produce finished goods or work in progress. The WAIT/MATL button 732 has a green frame color encoding, as shown in FIG. 7. This green frame indicates that while the particular machine is waiting for materials, as soon as the materials are provided, it can go into a production mode.

The SETUP key 734 uses a solid blue color encoding. The setup status indicates that the particular machine is currently being prepared for a new production operation and will be ready to be placed into either a production mode or the waiting-for-materials status as soon as the setup operation has been completed. The WAIT/SETUP button 736 uses a blue frame color encoding. The wait/setup status indicates the particular machine has finished its current production run and is waiting to be setup for a new production run but that the setup process has not yet begun.

The MAINTENANCE button 738 uses a solid red color encoding. The red color encoding, in an analogy to a red traffic light, indicates the machine has been stopped from a production run due to some maintenance problem, but that the machine is currently being maintained in order to resolve the maintenance problem. The WAIT/MAINT button 740 is color encoded using a red frame encoding. The red frame encoding indicates that the particular machine has been taken off line and is no longer in a production run due to a maintenance problem, but that the particular machine is not yet being maintained.

It should be appreciated that the WAIT/MATL, WAIT/SETUP and WAIT/MAINT buttons 732, 736 and 740 can be used merely to reflect the status of a particular machine. However, these buttons can also be used to generate material, setup or maintenance requests to the graphical user interface shop floor control system of this invention. That is, these buttons can be additionally used to send messages to various departments and/or workers to notify those departments and/or workers that a particular machine is currently waiting for materials, waiting for a setup crew or waiting for a maintenance crew. Thus, these buttons are not only capable of being used to passively provide data concerning the status of the represented machine to the relational database 250 of the graphical user interface shop floor control system of this invention, but can also be used in actively participation in the day-to-day management of the factory.

The TASK LIST button 742 is used to access the exemplary task list screen 2200 shown in FIG. 25 without having to return to the exemplary manufacturing menu 500 shown in FIG. 5.

Alternatively, instead of, or in addition to, the TASK LIST button 742, the menu bar 710 can include a CLOSE DEPT button. The CLOSE DEPT button is used to close down the shop floor. That is, the CLOSE DEPT bottom represents a "lights out" state of the shop floor, such as when the shop floor is closed down between shifts. For example, a shop floor supervisor will use the CLOSE DEPT button to change the status of all factory elements of the shop floor to "closed" or "shut down" just before the shop floor is closed for the night. The CLOSE DEPT status is used to distinguish time periods when the entire shop is shut down from time periods where the shop floor is open, but various machines are idle or otherwise not producing parts. The CLOSE DEPT button could use a gray color encoding.

The IDLE button 744 is used to indicate that a particular machine is currently inactive, i.e., not running production or otherwise engaged, and thus it is available to be used for any new production orders that may be received. As shown in FIG. 7, the IDLE button 744 uses a yellow frame color encoding.

The bar code portion 746 of the menu bar 710 is used to display the data input when scanning a bar code, or when inputting the bar code data through the keyboard 284 or 384. The bar code scanner 286 or 386 is used to scan bar code labels. These bar code labels are generally used to identify containers of input materials, work-in-progress, or finished goods. In addition, each worker can be issued a badge containing a bar code that identifies that worker. A worker's bar code can then be scanned by the worker when logging into or out of various machines or other factory elements of the factory.

Alternately, rather than, or in addition to, the bar code scanner, the keyboard 284 or 384 can be used to input the alphanumeric bar code by hand. However, it is not necessary to provide both the bar code scanner and the keyboard. Furthermore, if the keyboard 284 or 384 is provided, it does not need to be a full typewriter-style keyboard. Rather, the keyboard 284 or 384 need merely have enough keys to input the alphanumeric bar codes associated with the containers, and possibly the workers.

In operation, when the status of a machine on the actual shop floor changes, one of the workers on the shop floor goes to the nearest client system. If the shop floor screen for this shop floor is not already displayed on the display 262, the worker navigates through the various screens of the graphical user interface shop floor control system until the shop floor screen for the particular shop is displayed. That worker, who is generally the operator of the particular machine, selects the particular machine status button corresponding to the current status of the particular machine for which the operator wishes to update the status. The operator then selects the icon corresponding to that machine. Because the display 262 or 362 is a touch-screen display, the worker selects the various icons by physically touching the touch-screen display 262 or 362. In response, the touch-screen display 262 or 362 generates electrical signals that indicate to the graphical user interface shop floor control system which button and which machine icon were touched. Thus, when the term "selected" is used herein, it should be understood that "selected" includes selecting a button or selectable icon with a mouse, touch-pad, track ball, light pen, joystick or the like, or touching a button or selectable icon using the touch screen 262 or 362.

The graphical user interface shop floor control system then alters the displayed shop floor screen to change the color coding for the selected icon so that it corresponds to the color coding of the selected status button. At the same time, the graphical user interface shop floor control system provides updated status information for the particular machine to the relational database 250. In particular, the particular record in the relational database 250 corresponding to that machine is a machine log record that maintains a detailed log of every action and status change that occurs to that machine.

The REFRESH button 728 is used to control how the displayed information is updated on the various screens of the graphical user interface shop floor control system of this invention. In particular, because there will generally be a number of client systems within each shop floor, data concerning the various machines on each particular shop floor will be input to the relational database 250 through a number of different client systems. The information displayed on those client systems can be updated using any one of a number of refresh modes. In general, the information displayed in any screen of the graphical user interface shop floor control system of this invention is updated each time that screen is initially displayed. The refresh modes described below are used after the particular screen is initially displayed.

After the particular screen is initially displayed, the graphical user interface shop floor control system is in a first refresh mode. In this first refresh mode, the displayed screen of the graphical user interface shop floor control system is updated only to reflect information entered through that particular client system. Thus, in this first refresh mode, the displayed screen on a particular client system is not updated to reflect other information entered into the relational database 250 through other ones of the client systems.

This other information can be obtained in either one of two ways. First, the currently displayed screen can be closed and reopened, thus again initially displaying the screen with the complete current information for this screen as stored in the relational database 250. Alternately, the REFRESH button 728 can be pressed a single time to place the graphical user interface shop floor control system for this client system into a second refresh mode.

In the second refresh mode, the displayed screen is updated automatically once every predetermined time period. Preferably, this predetermined time period is one second. Thus, every one second, the client system placed in the second refresh mode obtains a complete snapshot of the information currently stored in the relational database 250 for the factory elements being displayed. Accordingly, for each shop floor screen 700 placed in this second refresh mode, the instantaneous status of the various factory elements in the shop floor representation 750 of the particular shop floor represented by the shop floor screen 700 are continuously displayed.

The MAINTENANCE icon 780, representing the maintenance office of the Threaded Rod Area shop floor, can also be selected. When selected, various maintenance system screens can be displayed, such as, for example, the exemplary preventative maintenance screen 2100, as shown in FIG. 24 or a screen providing a more detailed representation of the maintenance office. This more detailed screen could allow the preventative maintenance schedule and the specific supply stores for this shop floor to be selected. The particular maintenance system screens that can be displayed will depend upon the various preventative maintenance systems and/or schedules that are used by the particular factory represented by the graphical user interface shop floor control system of this invention. In addition, various spare parts screens can be implemented to allow spare parts inventory to be maintained and accessed. Again, the particular supplies and/or spare parts screens to be implemented will depend upon the supplies and/or spare parts systems used by the factory represented by the graphical user interface shop floor control system of this invention.

As set forth above with respect to the main menu screen 400 shown in FIG. 4, various organizational entities of the exemplary company represented by the main menu screen 400 shown in FIG. 4 can be accessed through the buttons 420–494. By selecting one or more of the buttons 420–494, specific further screens, including one or more of data input screens or data displaying screens, can be accessed to allow the employees of the company to provide data to, or view data in, the database 250 of the graphical user interface shop floor control system of this invention.

Alternately, rather than providing the organizational structure shown in the main menu screen 400, one or more shop floor screens for the non-manufacturing portions of the company, comprising the various organizational offices of the company, could be provided. That is, offices can be represented as information processing factory elements. For example, an order can be received by a sales office and entered into the relational database 250 using one or more screens accessed through a "Sales Office" icon of an "Administration" shop floor screen. The "Sales Office" can thus represent a gateway into an order inputting procedure controlled by one or more "Order Input" screens. For example, the "Administration" shop floor screen of the factory represented by the graphical user interface shop floor control system of this invention could represent the administrative offices of the factory. This "Administration" shop floor screen could include the "Sales Office", an "Engineering Office", a "Purchasing Office", a "Quality Control Office" and the like.

When the sales staff of the factory receives a new order, the sales staff would enter the order into the relational database 250 through one or more screens entered by selecting the "Sales Office" icon of the "Administration" shop floor control screen. This order would indicate the customer, the part ordered and all other relevant information. The order could then be placed in a first storage location of the "Administration" shop floor control screen. Then, one of the engineering staff could move the order from the first storage location into the "Engineering Office", to indicate that the order is being worked on by the engineering staff. For example, the engineering staff may need to either create the engineering drawings for the particular part indicated in the order, pull the engineering drawings for that part from archives, or modify a current engineering drawing to represent a new part. Once the engineering office staff has completed processing the order, the order could be placed in a second storage location of the "Administration" shop floor control screen, between the "Engineering Office" and the "Purchasing Office".

Someone in the purchasing staff could then move the order from the second storage location into the "Purchasing Office", to indicate that the order is being worked on by the purchasing office staff. In particular, this involves generating the purchasing orders for obtaining the materials necessary to produce the requested part at the requested quantities. Once the purchasing office staff has completed processing the order, the order can then be moved to a third storage location of the "Administration" shop floor control screen, between the "Purchasing Office" and an office for the manager of the particular shop floor responsible for producing the requested part. The manager of that shop floor could then move that order into a "Manager's Office" for scheduling that order on one or more of the machines of the shop floor. In this way, the various offices of the factory can be modeled and the information flow between the various offices tracked and maintained.

FIG. 8 shows a second shop floor screen 800 having a different shop floor representation 850 that represents a different shop floor of the factory. In particular, the shop floor representation 850 represents the shop floor of the Special Areas 2 of the factory. As shown in FIG. 8, the various buttons 712–744 and the bar code area 746 and input box 748 are the same as in the first shop floor screen 700. In general, these buttons will not change between the various shop floor screens representing the various shop floors of the factory.

As shown in FIG. 8, the shop floor representation 850 of the second shop floor screen 800 includes a material storage location icon 862, representing a MISCELLANEOUS storage area, a material storage location icon 864, representing a SPCL-FG (special FG) storage area and a material storage location icon 866 representing the STAINLESS 3 storage area. The shop floor representation 850 also includes PALLET work center icons 870 representing PALLET work centers, PKBG and PKBG1 work center icons, 876 representing bagging packaging work centers, and a WRAPPER work center icon 880 representing a WRAPPER work center. A work center is an area of the shop floor that represents a group of employees performing a physical task, such as packaging parts into bags, wrappers or pallets, or the like. In particular, the work centers are not associated with any specific machine, and so cannot be represented with a machine icon. Likewise, the work centers are not merely storage locations, as work is performed on the parts in the work centers. Thus, they cannot be represented by storage location icons.

The shop floor representation 850 also includes machine icons 852 representation the machines BEB1–BEB3, UB1–UB5, AB1 and AB6–AB11, SL1 and D1–D3, machine icons 854 representing the machines F1–F7, machine icon 856 representing the machine PS1, a machine icon 858 representing a welding machine WLI, a machine icon 860 representing the machine P7, machine icons 868 representing machines V1 and V2, machine icons 872 representing the machines BR1–BR3, a machine icon 874 representing the press machine BRS1, a machine icon 878 representing the machine SM1, and machine icons 882 representing the header machine H12, PUC1, CS1 and CS2.

It should be appreciated that similar types of machines use the same type of machine icon, while different makes or subtypes of machines use different letter codes and individual machines use different number codes. Thus, the machines BEB1–BEB3, UB1–UB5, AB1 and AB6–AB11, and D1–D3 are all represented on the shop floor representation 850 with the same machine icon, while the machine icons 852 use different letter codes to distinguish between the anchor bolt producing machines, the U-bolt producing machines, and the various makes of particular anchor bolt and/or U-bolt producing machines. Similarly, machine icons 856, 872, 874, 878 and 882 all represent different presses, while the letter codes indicate the different makes and/or the different subtypes of presses. Thus, while the same icon is used to represent similar types of machines, the alphanumeric code for each particular icon indicates both the specific type of machine and the particular machine represented by each icon.

The shop floor representation 850 of the shop floor screen 800 also includes a BAB truck icon 884 and a Spec Truck icon 886. These truck icons 884 and 886 represent different loading docks of the Special Area 2. The graphical user interface shop floor control system of this invention can use a number of different types of loading docks. For example, one of these loading docks can be used to represent the location of containers that have been shipped off-site to subcontractors for specialized processing, such as plating. In this case, when a container has been shipped off-site for such special processing, the container icon for that container is moved from one of the storage areas 862–866, one of the machines 852–860, 868, 872, 874, 878 or 882, or one of the work centers 870, 876 or 880 to the corresponding one of the truck icons 884 or 886 to advise the database 250 that that container has been shipped to the off-site subcontractor. When that container is returned from the off-site special processing, the container icon for that container is moved from the corresponding truck icon to the appropriate next location on the shop floor representation to advise the database 250 that that container has been returned by the off-site subcontractor.

Alternatively, one of these loading docks can be used to represent the location of containers that have been shipped to the customer ordering the parts stored in that container. Accordingly, when a container has been placed onto a truck for transport to a customer, the container icon representing that container is moved from one of the storage areas 862–866, one of the machines 852–860, 868, 872, 874, 878 or 882, or one of the work centers 870, 876 or 880 to one of the truck icons 884 or 886 to advise the database 250 that that container has been placed onto the truck.

The shop floor representation 850 also includes a scroll button 888 that allows a portion of the shop floor representation 850, which does not fit onto the touch screen 262 or 362 at the required resolution, to be viewed.

As in FIG. 7, the various machine icons 852, 860, 864, 868, 872, 874, 878, and 882 are color-encoded according to the status information for the represented machines stored in the relational database 250. In particular, the color encoding of the machine icons for the machines F7, UB1 and SL1 indicate these machines are being maintained, the color encoding of the machine icons for the machines UB2, F4, AB7, AB8, AB10, BRS1, BR1–3, SM1, H12, and CS1 indicate these machines are in production, and the color encoding of the machine icons for the other machines indicate the other machines are idle.

Figure 9:
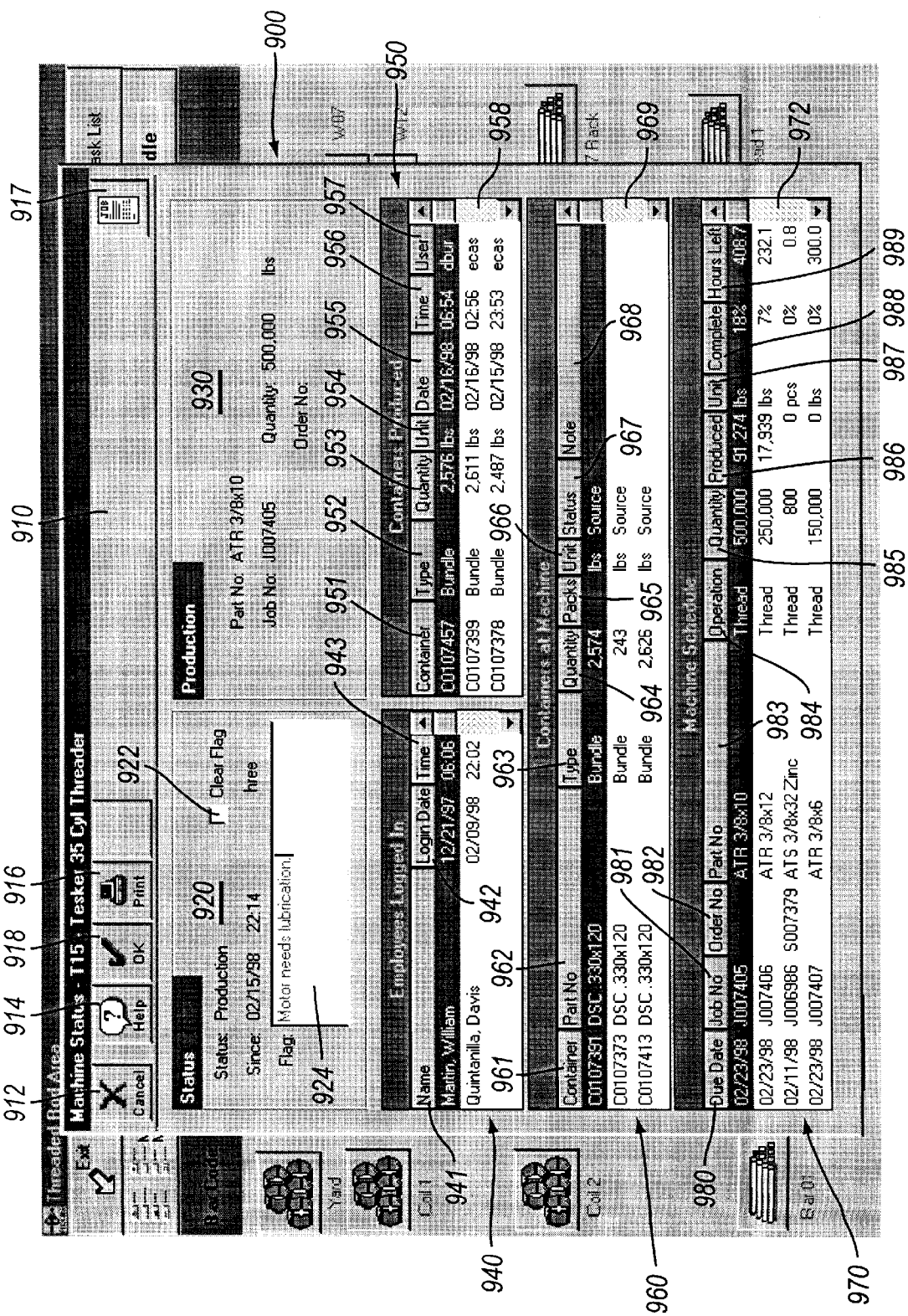
FIG. 9 shows a machine status screen of the graphical user interface shop floor control system of this invention for a machine having a "production" status.

FIG. 9 shows the machine status screen 900. As described above, when one of the shop floor screens, such as the first or second shop floor screens 700 and 800, is displayed, and the user first selects one of the machine status buttons 730–744, and then selects one of the machine icons, the user can alter the status information for that machine. In contrast, if the user selects one of the machine icons in the shop floor representation 750 or 850 without first selecting one of the status buttons 730–744, the graphical user interface shop floor control system of this invention instead displays the machine status screen 900. The machine status screen provides more details about what is currently happening on the machine represented by the selected machine icon. For example, as shown in FIG. 9, the machine status screen 900 shows the machine status information for machine T15 located on the Threaded Rod shop floor.

As shown in FIG. 9, the machine status screen 900 includes a menu bar 910, a status portion 920, a production portion 930, an employee logged-in portion 940, a containers produced portion 950, a containers at machine portion 960, and a machine schedule 970. In particular, the menu bar 910 includes a CANCEL button 912, a HELP button 914, a PRINT button 916, a JOB button 917, and an OK button 918. The menu bar 910 also indicates the particular machine number and the machine name for the selected machine. In this case, the machine number is T15 and this machine is, in particular, a TESKER 35 cylinder threader. The CANCEL button 912 closes the machine status screen 900 and cancels any changes that have been made to any of the various portions of the machine status screen 900 while the OK button 918 closes the machine status screen 900 and accepts any changes. The HELP button 914 and the PRINT button 916 operate similarly to the HELP button 714 and the PRINT button 716 of the menu bar 710 of the shop floor screens 700 and 800.

The status portion 920 indicates the current status of the selected machine, the date and time the status was last changed, and any flags that may be present on that machine. In particular, the status portion 920 of the machine status screen 900 for the machine T15 indicates this machine is currently in a production run and has been in the production run since 11:20 a.m. on Sep. 25, 1997. Additionally, there are no flags set on the status of this machine.

The status flag includes a CLEAR FLAG check box portion 922 and a details portion 924. When the check box portion 922 is not checked, the alphanumeric machine identifier portion of the machine icon corresponding to the machine displayed in the machine status screen is changed from black to red. That is, when the flag portion 922 is checked, the alphanumeric identifier is displayed using black text. However, when the flag portion 922 is not checked, indicating this machine has a status flag associated with it, that flag is indicated on the shop floor screen by changing the alphanumeric identifier from black to red color encoding.

The details box 924 is used to indicate the nature of the flag. The flag can be used to provide any additional information about the corresponding machine to the system. In particular, the flag is often used to indicate that some preventative maintenance needs to be performed on the machine, even though it is not necessary to take the machine out of production status. The flag can also be used to indicate to the graphical user interface shop floor control system some other piece of information about the particular machine. To access the information input into the details box 924, the machine screen 2000 shown in FIG. 23 or the machine log screen 1800 shown on FIG. 21 can be displayed, or a report requesting all flag details from the relational database 250 can be generated.

The production portion 930 indicates the particular part and job number of the production run being produced by the selected machine, as well as the quantity and the order number, if any. In particular, the production portion 930 of the machine status screen 900 for this machine indicates that it is currently producing part number ATR 3/8X10 for job number J0007405 and is producing 500,000 pounds of these parts. It should also be appreciated that, as the status indicated in the status portion 920 changes, the information disclosed in the portion 930 of the machine status screen 900 changes correspondingly, as shown in the machine status screen 900 of FIG. 10.

The employee logged-in portion 940 indicates all of the employees currently logged onto this machine and the time and date each employee logged on. The graphical user interface shop floor control system of this invention uses this information to attribute labor hours to different production jobs, and to determine maintenance activity, production efficiency calculations, and the like.

The employee logged-in portion 940 includes a NAME title button and column 941, a LOGIN DATE title button and column 942 and a TIME title button and column 943. The name column 941 lists the names of the employees currently logged onto the selected machine. The login date column 942 indicates the date at which that person last logged in for the current machine. The time column 943 indicates the time of day that the employee last logged in. The employees logged-in portion 940 also includes a scroll bar 944.

The containers produced portion 950 is used to indicate the full or completed containers of work-in-progress or finished goods that have been produced by this machine, and transferred to another machine, a storage location or shipping to the customer. In the containers produced portion 950 of the machine status screen 900 for the machine T15, at least three different containers have been produced by this machine.

The containers produced portion 950 includes a CONTAINER title button and column 951, a TYPE title button and column 952, a QUANTITY title button and column 953, a UNIT title button and column 954, a DATE title button and column 955, a TIME title button and column 956 and a USER title button and column 957. The container column 951 lists the number of bar code label attached to each of the various containers produced by the selected machine. The type column 952 indicates the type of storage in that container. The quantity column 953 indicates the amount of material in the container. The unit column 954 indicates the units of the quantity. The date column 955 indicates the date the container was produced, while the time column 956 indicates the time of day that container was produced. The user column 957 indicates the particular operator that produced that container. The containers produced portion 950 also includes a scroll bar 958.

The containers-at-machine portion 960 indicates the source containers that are currently at the selected machine, i.e., the containers supplying source material for the production of the part indicated in the production portion 930. In particular, as shown in FIG. 9, the containers-at-machine portion 960 of the machine status screen 900 for the machine T15 lists three containers, having ID numbers C10739, C107373 and C107413, and which contain a bundles of 254, 243 and 2656 pounds, respectively, of parts having a part number DSC330X120.

The containers-at-machine portion 960 includes a CONTAINER title button and column 961, a PART NO title button and column 962, a TYPE title button and column 963, a QUANTITY title button and column 964, a PACKS title button and column 965, a UNITS title button and column 966, a STATUS title button and column 967 and a NOTE title button and column 968. The containers-at-machine also includes a scroll bar 969. The container column 961 indicates the number of the bar code label of the source container associated with the selected machine. The part number column 962 indicates the part number of the material or work in progress stored in that container. The type column 963 indicates the storage type for the part or materials stored in that container. The quantity column 964 indicates the amount of parts in that container when it was first associated with the selected machine. The packs column 965 is used to indicate the type of packaging or grouping when the parts are stored in the container in packages or groups, such as boxes or other types of packaging. The unit column 966 indicates the units for the quantity of parts, or packages, stored in that container. The status column 967 indicates the status of that container. In general, the status will be "source", indicating this container is being used as a source of material to produce the parts selected in the machine schedule portion 970. The note portion 968 provides a location for the operator or other worker of the factory to provide notes about the material stored in that particular container.

Finally, the machine schedule portion 970 of the machine status screen 900 indicates the current job being produced and the next jobs that have already been scheduled for production on the selected machine. In particular, as shown in FIG. 9, the machine schedule portion 970 of the machine status screen 900 for the machine T15 indicates that for the current job, the current job was due on Feb. 23, 1998. The machine schedule portion 970 also indicates that of the 500,000 pounds of parts to be produced, approximately 91,000, or 18%, have been produced and an estimated 408.7 hours of production run time are required to complete the job.

In addition to the current job, the machine schedule portion 970 shows the next two jobs scheduled for machine T15. If there are other jobs scheduled for this machine, they can be viewed by selecting the up and down arrows of the scroll bar 972 to display such jobs. It should be appreciated that each of the employee logged-in portion 970, the containers produced portion 950 and the containers-at-machine portion 960 also have scroll bars that allow additional information to be viewed that could not otherwise be displayed. In response to selecting the JOB button 917, the job sheet, described below with respect to the JOB SHEET button 1420 of the machine schedule screen 1400 shown in FIG. 16, is displayed for the selected job in the machine schedule portion 970.

The machine schedule portion 970 includes a DUE DATE title button and column 980, a JOB NO title button and column 981, a ORDER NO title button and column 982, a PART NO title button and column 983, a OPERATION title button and column 984, a QUANTITY title button and column 985, a PRODUCED title button and column 986, a UNIT title button and column 987, a COMPLETE title button and column 988 and an HOURS LEFT title button and column 989. The due date column 980 indicates the due date for the particular job. The job number column 981 indicates the particular job numbers assigned to the particular jobs associated with the selected machine. The order number column 982 indicates any particular order number that may be associated with the particular job. The part number column 983 indicates the particular part number that is to be produced for the particular job. The operation column 984 indicates the next operation to be performed on the particular part for the particular job.

The quantity column 985 indicates the number of units of the particular part to be produced for that job. The produced column 986 indicates the number of units of parts that have actually been produced based on the current information stored in the database 250 of the graphical user interface shop floor control system. The unit column 987 indicates the number of units of the quantity that is to be produced. As shown in FIG. 9, the units can be pounds or pieces or the like. The complete column 988 indicates, based on the value in the produced column 986 and the quantity column 985, the percentage of completion of that job. The hours left column 989 indicates, based on current production rates, the amount of machine hours required to produce the remaining amount of quantity of parts for that job.

It should be appreciated that each of the title buttons 941–943, 951–957, 961–968 and 980–989 is selectable. Selecting any one of these title buttons sorts the records displayed in that particular portion of the machine status screen 900 in descending order based on the data for that column. Pressing that title button again resorts the records for that portion based on the data for that column in ascending order. Pressing a different title button of that portion resorts the records for that portion in descending order based on the data for that column.

It should be appreciated that the employee logged-in portion 940 can be used to indicate to the database 250 of the graphical user interface shop floor control system of this invention which of the logged-in employees is currently operating the selected machine. This is performed by selecting the row corresponding to that employee or by using the scroll bar 942 to scroll through the list of logged-in employees.

It should be appreciated that, as set forth below with respect to FIG. 15, that a particular container is associated with a particular job when that container is pulled from a previous machine or storage location and moved to the selected machine. Thus, indicate the various source containers located at the selected machine. In general, because each source container is associated with a specific job, selecting a particular job for production when the PRODUCTION button 730 is pressed, as set forth below with respect to FIG. 16, automatically selects the associated source container. However, the containers-at-machine portion 960 could be used to select the particular source container that is being used to supply input parts and/or raw materials to the selected machine for generating the currently produced parts. As above, the particular source container can be selected either by directly selecting the particular row associated with that container or by using the scroll bar 962 to scroll through the source containers at the selected machine.

Finally, while a particular job for production is usually selected when the PRODUCTION button 730 is pressed, as set forth below with respect to FIG. 16, the machine schedule portion 970 can be used to select the particular job to which the current operation of the selected machine should be attributed. As indicated above, the particular job can be either directly selected by sorting the particular column corresponding to that job, or by using the scroll bar 972 to select the job.

Figure 10:
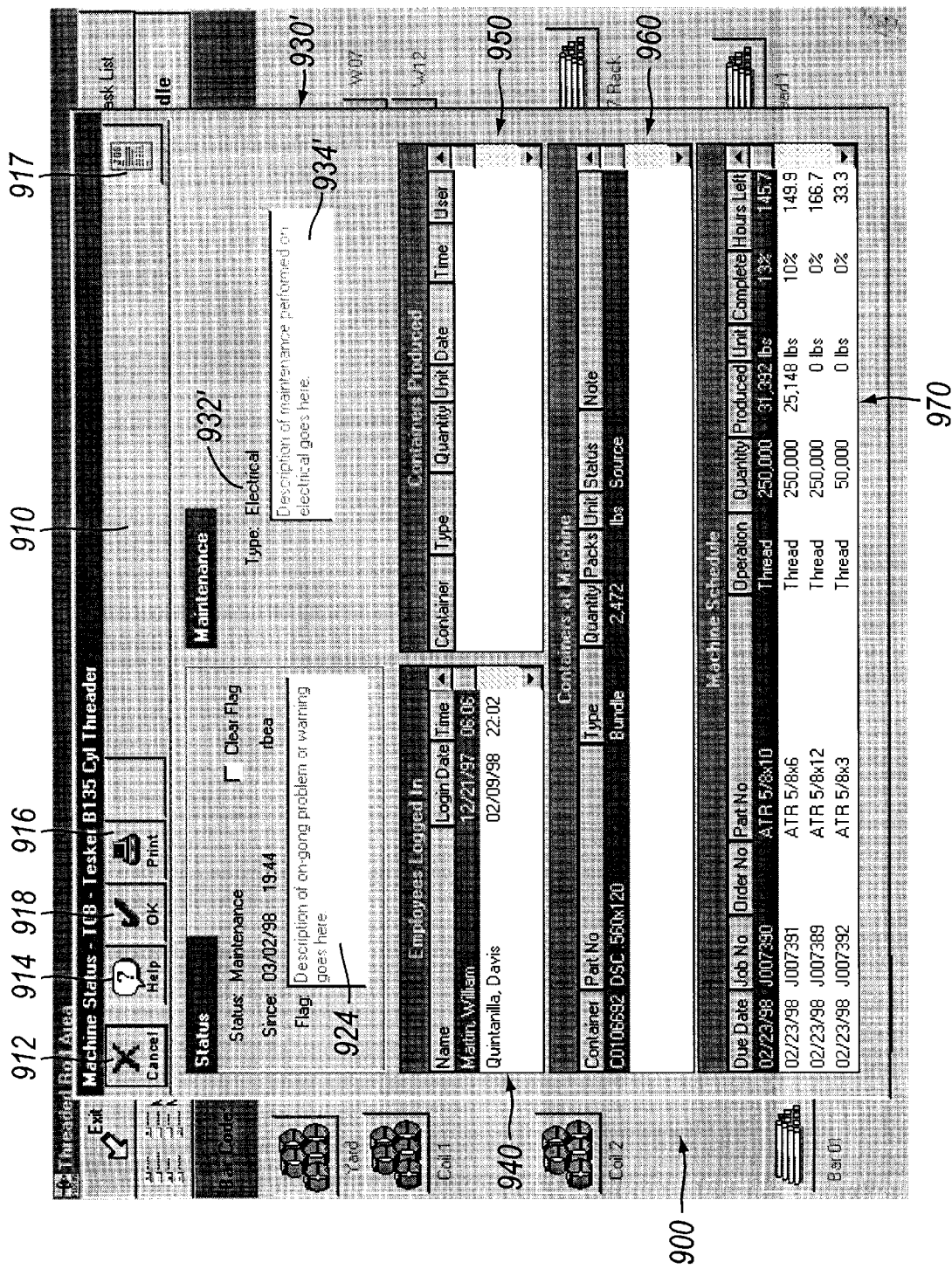
FIG. 10 shows a second machine status screen of the graphical user interface shop floor control system of this invention for a machine having a "maintenance" status.

As set forth above, if the status is SET UP, MAINTENANCE, IDLE, WEIGHT/MATL, WEIGHT/SETUP or WEIGHT/MAINT instead of PRODUCTION, the information displayed in the production portion 930 of the machines status screen 900 will change correspondingly to a setup portion, a maintenance portion, an idle portion, a waiting-for-materials portion, a waiting-for-setup portion or a waiting-for-maintenance portion, respectively. For example, as shown in FIG. 10, when the status in the status portion 920 is "maintenance" instead of "production", the production portion 930 is replaced with the maintenance portion 930'. The maintenance portion 930' includes a type 932' that identifies the type of maintenance to be performed on the machine and an input box 934'.

As shown in FIG. 10, in this example, the type 932' indicates an electrical problem with this machine. Once the technician has fixed the problem on this machine, the description of the maintenance performed on the electrical systems of this machine is input to the database 250 of the graphical user interface shop floor control system of this invention through the input box 934'. In all other respects, except that the JOB button 917 is grayed-out, the machine status screen 900 as shown in FIG. 10 is identical to the machine status screen 900 shown in FIG. 9.

FIG. 11 shows the containers screen 1000 of the graphical user interface shop floor control system of this invention. In the same way that the machine status screen 900 pops up whenever a machine icon is selected, as described above, whenever a storage location icon is selected, the containers screen 1000 is displayed to display the current information stored in the relational database 250 concerning the various containers stored within that storage location. In particular, the containers screen 1000 includes a menu bar 1010, a container type selection portion 1040, a containers display portion 1050 and an inventory portion 1060.

The menu bar 1010 includes an EXIT button 1012, a HELP button 1014, a PRINT button 1016, a FILTER button 1018, a LOOKUP button 1020, an ADD button 1022, a COPY button 1024, an EDIT button 1026, a RETIRE button 1028, a VIEW button 1030, a REPORTS button 1032, a STATUS button 1034, a LABEL button 1036, and a SETUP button 1038. The EXIT, HELP, and PRINT buttons 1012, 1014 and 1016 operate as described above with respect to the EXIT, HELP, and PRINT buttons 712, 714, and 716. Accordingly, no further description of these buttons is provided. The FILTER button 1018 is used to input search parameters to select certain ones of the containers for display in the display portion 1050. The EDIT button 1026 allows the information displayed in the display portion 1050 to be modified. The RETIRE button 1028 retires the selected container from the containers list displayed in the display portion 1050. That is, the RETIRE button 1028 changes the status of the selected container from "current" to "retired". The VIEW button 1030 allows all database record fields for the selected container to be displayed. That is, the VIEW button 1030 displays detailed information about the selected container. The REPORTS button 1032, when selected, causes the graphical user interface shop floor control system of this invention to display the available reports for the container screen 1000. Once a particular report has been selected, it can be viewed on screen or printed.

The LABEL button 1036 generates bar code labels for the selected containers selected in the display portion 1050. The SETUP button 1038 is used when initially setting up the containers screen when initially setting up the graphical user interface shop floor control system for a particular factory or application. The set-up screens include one to twelve screens that are used to identify the allowable storage locations, the allowable types of containers, allowable container states, and other configuration information. Generally, this button will not be used after initial setup.

While the LOOKUP button 1020, the ADD button 1022 and the COPY button 1024 are provided on the menu bar 1010, these buttons are not enabled and thus are shown in a grayed-out format. The LOOKUP button 1020 provides a way of obtaining a list of available choices when entering data into data input boxes or data input screens. Thus, when the LOOKUP button 1020 is selected, the graphical user interface shop floor control system of this invention displays a pop-up window for a selected field of an input box or screen. The ADD button 1022 adds a record to the containers file of the database 250. In response to selecting the ADD button 1022, the graphical user interface shop floor control system of this invention displays a data input screen that allows the relevant data for a new container to be added to the database 250. The COPY button 1024 works similarly to the ADD button 1022, but not only creates a new record but adds the data of an existing selected record to that new record. However, because these buttons are grayed-out, this indicates that these functions are not normally available when the container screen 1000 is displayed on one of the client systems 124, 128 or 132 present on the shop floor.

The container type portion 1040 contains a pair of option, or "radio", buttons 1042 and 1044. When the current containers option button 1042 is pressed, only the current containers stored in the selected storage area will be displayed in the display portion 1050. In contrast, if the retired containers option button 1044 is selected, only the retired containers associated with the selected storage location will be displayed in the display portion 1050.

The display portion 1050 displays all of the containers that have been identified to the graphical user interface shop floor control system of this invention as being located in the selected storage location. In particular, only the containers meeting the filter parameters, if any, and corresponding to the selected option button 1042 and/or 1044 will be displayed in the display portion 1050. For each such displayed container, data corresponding to the container number, the part number, the quantity and units of material stored in the storage container, its current location (which should be the selected storage location when the containers screen 1000 is accessed by selecting a particular storage location icon), the operation to be performed on that container, the status of that storage container, and the type of that storage container are displayed. The particular containers are selected by selecting them using the touch-screen display 262 or 362. If more containers are to be listed than can be displayed on the container screen 1000, the scroll bar 1052 can be used to display any information extending off the bottom of the container screen 1000.

The display portion 1050 includes a CONTAINER title button and column 1070, a PART NO title button and column 1071, a QUANTITY title button and column 1072, a UNIT title button and column 1073, a JOB NO title button and column 1074, a LOCATION title button and column 1075, an OPERATION title button and column 1076, a STATUS title button and column 1077, a TYPE title button and column 1078 and a NOTE title button and column 1079. The container column 1070 indicates the number of the bar code label for each container displayed in the display portion 1050. The part number column 1071 indicates the part number stored in that container. The quantity column 1072 indicates the quantity of materials stored in the particular container. The unit column 1073 indicates the units of quantity for each particular container.

The job number column 1074 indicates any particular job number that may be associated with a container when that container contains work in progress rather than raw material. The location column 1075 indicates the particular storage location for each container. In general, when the container screen 1000 is accessed by selecting a particular storage location icon and a particular shop floor screen, the location column 1075 will indicate that location. In contrast, when the container screen 1000 is accessed through the CON- TAINERS button 520 of the manufacturing menu 500, the list of displayed containers will not be limited to a single storage location.

The operation column 1076 indicates the particular operation last performed on the part stored in the particular container. The status column 1077 indicates the particular status for that container. For example, if the container stores raw materials, the status for that container will be "source". In contrast, when a particular container stores work in progress, whether for a particular job or in anticipation of future jobs, that container's status will be "storage". The type column 1078 indicates the type of storage of the parts in a particular container. The note column 1079 provides a place for an operator to provide comments about the particular part or material stored in a particular container.

As set forth above with respect to the machine status screen 900, each of the buttons 1070–1079 is selectable and operates as described above with respect to the buttons 941–943, 951–957, 961–968 and 980–989. Accordingly, no further description of the operation of these title buttons will be provided.

The FILTER button 1018 can be used to filter the list of containers. Finally, the CALCULATE INVENTORY button 1062 of the inventory portion 1060 is used to calculate the totals for the displayed fields for the listed containers. As shown in FIG. 11, the displayed fields for the inventory portion 1060 can include the amounts for the different units such as pounds or pieces, and the number of containers based on the containers displayed in the display portion 1050.

It should also be appreciated that the containers screen 1000 is accessible not only by selecting a particular storage location of a shop floor screen of the shop floor control system of this invention. Rather, as indicated above, the containers screen 1000 can also be accessed by selecting the CONTAINERS button 520 of the manufacturing menu 500. In this case, the container screen 1000, if otherwise unfiltered, would display all of the containers for the entire manufacturing operation. In contrast, by accessing the container screen 1000 by selecting a particular container icon of a particular shop floor screen of the shop floor control system of this invention, the container screen 1000 is displayed with an initial filter to limit the displayed containers to those stored in the selected storage location.

Figure 12:
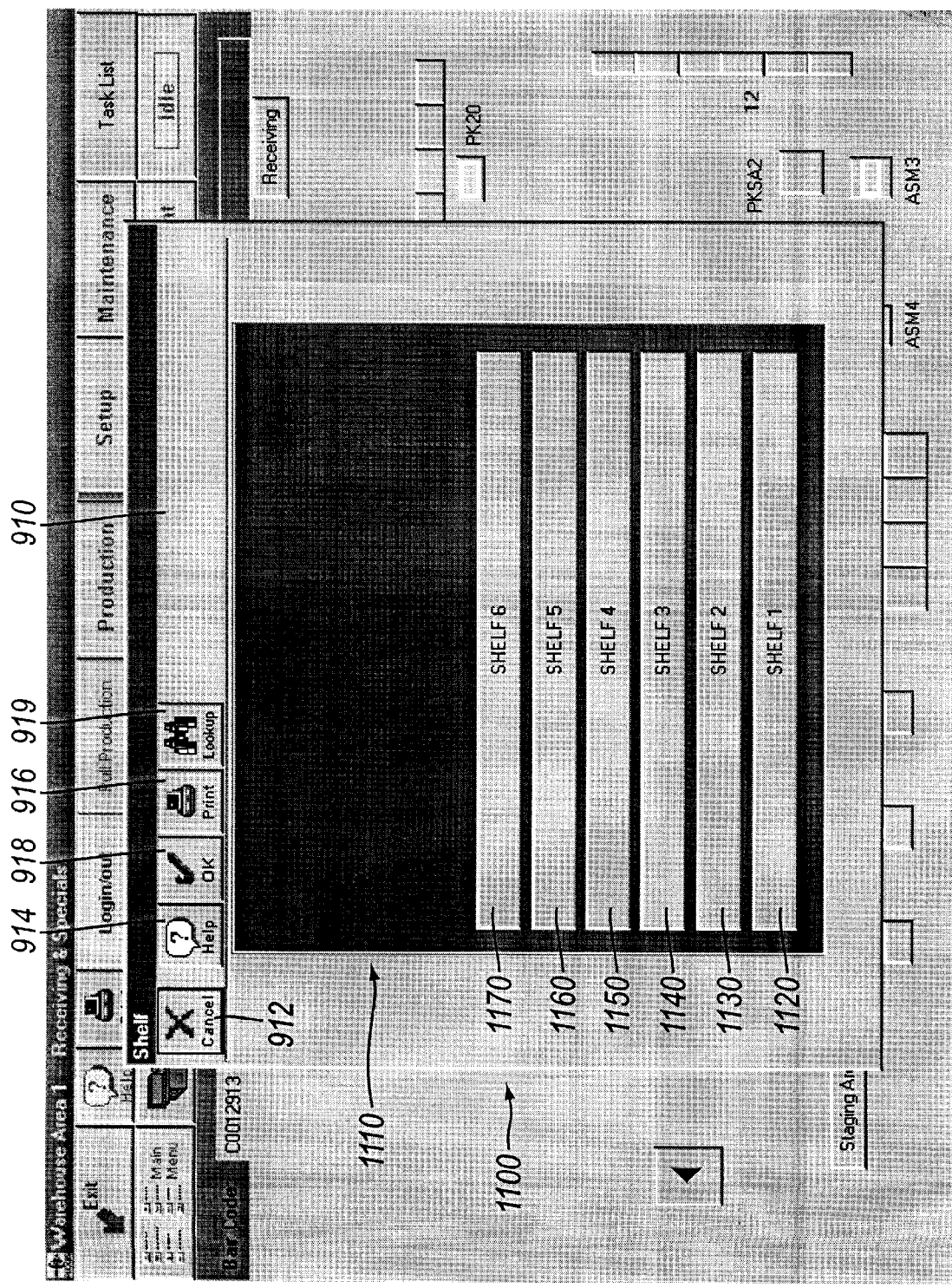
FIG. 12 is a shelf screen of the graphical user interface shop floor control system of this invention for a large storage location.

FIG. 12 shows an exemplary shelf screen 2200. When a storage location is very large, such as when the storage location is part of a warehouse or other area storing a large number of containers, parts or the like, that storage location may be organized into a number of sublocations to aid the worker in locating the container, the part or the like that is being pulled from or added to that storage location. In the previous discussion of a storage location, the storage location was assumed to be small enough that any container, part or the like could be readily located within the storage location without any specific notation indicating where in the storage location that container, part or the like was actually located.

However, when the storage location is sufficiently large, this assumption no longer holds true. In this case, when the storage location is selected, before the containers screen 1000 is displayed, the shelf screen 1100 is displayed to allow the user to select a sublocation within the selected storage location, where each sublocation is represented by one of the shelves of the shelf screen. It should be appreciated that a "shelf" can represent any type of sublocation with in a storage location, not just a "shelf".

The shelf screen 1100 includes the menu bar 910 of the machine status screen 900 shown in FIGS. 9 and 10 and a shelf portion 1110. The menu bar 910 is identical to the menu bar 910 shown in FIGS. 9 and 10, except that it also includes a LOOK-UP button 919 corresponding to a LOOK-UP button 1020 of the container screen 1000 shown in FIG. 11, and does not include the JOB button 917.

The shelf portion 1110 includes a SHELF 1 portion 1120, a SHELF 2 portion 1130, a SHELF 3 portion 1140, a SHELF 4 portion 1140, a SHELF 5 portion 1150 and a SHELF 6 portion 1170. Each of these SHELF portions 1120–1170 can be further selected to display the containers screen 1000 for the containers that are stored on that shelf, and thus have been associated with that shelf portion. Similarly, when moving a container to a particular sublocation of such a large storage location, the shelf screen 1100 will be displayed to allow that container to be associated with a particular shelf portion corresponding to the particular sublocation of that large storage location.

FIG. 13 shows how the shop floor screen 700 is modified when the LOGIN/OUT button 722 is pressed. In particular, when the LOGIN/OUT button 722 is pressed, the bar code portion 746 is replaced with the employee login portion 790 and all of the menu buttons 712–744 are grayed-out except the PRINT button 716, the LOGIN/OUT button 722 and the TASK LIST button 742.

When the employee login portion 790 is displayed, the input box 792 is used to display the employee number of the employee being logged into or out of various ones of the machines of the shop floor represented by the shop floor representation 750. In operation, the employee number data is input either by using the bar code scanner 286 or 386, or the keyboard 284 or 384. Once the employee number is entered, the user logs the employee represented by the input employee number onto machines that that employee is not already logged into by selecting the machine icon corresponding to that machine. At the same time, the user can log out the employee corresponding to the input employee number from any machines that that employee is already logged into by selecting the machine icons corresponding to those machines. That is, selecting any machine icon toggles its status from logged-in to logged-out and back.

In particular, in the graphical user interface shop floor control system of this invention, each operator is responsible for logging himself or herself into the machines he or she is running. That operator's labor hours are then allocated to the jobs that are produced with that machine while that operator is logged onto that machine. When the operator selects the LOGIN/OUT button 722, the shop floor representation 750 is modified to display a color coded graphic with the word "logged in" on each machine that operator is already logged into. In particular, the color coding should be different from the color coding for any other machine status. Preferably, as shown in FIG. 13, the color purple is used as the color coding indicating that the identified operator is logged onto a particular machine. The operator then selects the machine icons corresponding to the machines that he is not already logged into and the icon for that machine is converted to display the purple "logged in" graphic. Alternately, when the operator selects machine icons for machines that that operator is already logged into, the purple "logged in" graphic is replaced with the normal graphic for that machine.

As shown in FIG. 13, the employee having the employee number "123456" is currently logged into the machines W01, W02 and W03, as indicated by the purple "logged in" graphic displayed on the machine icons corresponding to these machines. Once the operator has finished logging him or herself into and out of the appropriate machines, the operator again presses the LOGIN/OUT button 722 to finish the login/out process and send the updated login/out information to the relational database 250.

FIG. 14 shows the machine login screen 1200. The machine login screen 1200 is displayed when the SELECT EMPLOYEE button 724 is selected. The machine login screen 1200 provides a list of all machines and all of the operators logged into those machines. In general, the machine login screen is used by a supervisor who may want to log an operator into a machine, see an overview of all those logged onto all the various machines of the factory, or log an operator out of the machine.

The machine login screen 1200 includes a menu bar 1210, a SELECT button 1220, an option, or "radio", button portion 1230, and a display portion 1240. The menu bar 1210 includes the buttons 1012–1032 of the menu bar 1010 shown in FIG. 11. Moreover, the menu bar 1210 includes the same active and disabled ones of the buttons 1010–1032 as the menu bar 1010, except that the ADD button 1022 is active, rather than disabled, in the menu bar 1210 and that the RETIRE button 1028 is replaced with a DELETE button 1029, which is grayed out. The DELETE button 1029, if it were enabled, would allow the user to delete the selected record from the database 250. Thus, in the machine login screen 1200, only the EXIT button 1012, the HELP button 1014, the FILTER button 1018, the PRINT button 1016 and the ADD button 1022 are not grayed out.

The SELECT button 1220 allows a supervisor to "become" the selected employee, so that the supervisor can log that employee onto or off of various ones of the machines, as described above with respect to FIG. 13. Thus, if a particular employee had to leave the shop floor due to an emergency, the supervisor can use the SELECT button 1220 to "become" that employee so that the supervisor can log that employee off of whatever machines that employee may be logged onto. Alternately, if the employee is a temporary or new employee who is either unfamiliar with the graphical user interface shop floor control system of this invention, or for some reason has been denied access to the graphical user interface shop floor control system of this invention, the supervisor can act in that employee's stead to log that employee onto or off of various machines.

The option button portion 1230 includes a "Me" option button 1232, a "People I supervise" option button 1234 and an "Everyone" option button 1236. The option buttons 1232, 1234 and 1236 are used to easily change the selection, or filter, rules for selecting the employees to be displayed in the display portion 1240. The "Me" option button is used to select only the current operator and the machines that operator is logged into for display in the display portion 1240. In contrast, the "People I supervise" option button 1234 is used to select the people supervised by the current operator for display in the display portion 1240. Finally, the "Everyone" option button 1236 is used to display everyone who is currently logged onto at least one machine.

The display portion 1240 displays the name of each person logged onto at least one machine that meets the selection rules input through the selection buttons 1232–1236 and/or the FILTER button 1018. The NAME title button and column 1241 of the display portion 1240 displays the name of the employee. The TITLE title button and column 1242 displays the title of that employee, while the SHIFT title button and column 1243 indicates that employee's shift. The DEPARTMENT title button and column 1244 indicates that employee's department. The MACHINE title button and column 1245 indicates the machine or machines that employee is logged onto. In particular, if an employee is logged onto more than one machine, one row for that employee will be displayed for each such machine. The LOGIN DATE title button and column 1246 indicates the date that employee was logged onto that machine, while the TIME title button and column 1247 indicates the time of day that employee was logged onto that machine. The scroll bar 1248 allows the data displayed in the display portion 1240 that extends beyond the bottom of the display portion 1240 to be viewed.

The sorting order for the employees to be displayed in the display portion 1240 can be controlled by selecting one of the title buttons 1241–1247 for the columns 1241–1247. The first time a title button 1241–1247 is selected, the employees are sorted in alphabetical or numerical order for that column, in descending order. Selecting that title button again sorts the employees alphabetically and/or numerically in ascending order. Selecting the title button 1241–1247 for another column sorts the employees in descending order according to the data for that column.

FIG. 15 displays the new production screen 1300 displayed in response to selecting the PULL PRODUCTION button 726. As a machine produces either work-in-progress or finished goods, containers of produced parts are completed either when the container is filled or when the particular job is completed. When a machine produces a new container of parts, the operator of the machine or a materials transport worker, such as a forklift driver, selects the PULL PRODUCTION button 726 on the shop floor screen 700 or 800. As a result, the new production screen 1300 is displayed.

As shown in FIG. 15, the new production screen 1300 includes the menu bar 910, a source container portion 1310, a machine portion 1320 and a new production container portion 1330. The menu bar 910 includes the menu buttons 912–918 and has been described previously. Accordingly, no further description of these buttons will be made.

The source container portion 1310 identifies the part number of the parts stored in that container, that container's container number, the job number for which the parts stored in that source container were produced, the operation used to generate those parts, a lot number, a current quantity of parts stored in the source container, including the units for that quantity, the type of storage, and any notes. The source container was previously associated with a particular one of the machines, using the container moving procedure described below with respect to FIGS. 18 and 19. The machine portion 1320 displays the machine number that the source container has been associated with and the graphic for that machine. Similarly, the new production container portion 1330 indicates the part number of the part produced, the new container number to be assigned to the container storing that part and the corresponding job number, the operation, and the lot number.

Because the relational database 250 had been previously provided with the information about the source container when it was associated with the particular machine, and the particular part being produced by the machine when the order was associated with that machine, the part number, job number, operation and lot number are automatically added to the new production container portion 1330 when the new production container screen 1300 is displayed. In particular, the part number, the job number and the operation are obtained from the order being produced by the particular machine. The lot number is taken directly from the source container to allow the material lot to be fully traced through the production of parts. Finally, the container number is automatically assigned by the graphical user interface shop floor control system when the new production container screen 1300 is displayed.

In particular, the new production container portion 1330 provides input boxes 1332–1338 for inputting the quantity, the units, the type and any relevant notes for this container. Typically, the quantity units and type are automatically entered into the quantity input box 1332, the unit input box 1334, and the type input box 1336 of the new production container portion 1330 because the quantity would be read electronically from a production weight-count scale attached to the client system and the unit and the type would be automatically provided by the database 250. When production is pulled, a bar code label is printed and a new container record is created, which updates the real-time inventory and the production tracking records.

That is, after the operator either fills the container or finishes producing the part, the operator carries the container over to the client system for entering the information via the new production container screen 1300. Typically, an electronic scale will also be attached to the client system and the container would be placed on that electronic scale. That electronic scale will automatically fill in the quantity information in the quantity input box 1332 while the database 250 automatically supplies the data for the unit input box 1334 and the type input box 1336. The user can also select the unit and type using the drop-down menus available at the center input box 1334 and the type input box 1336. Finally, the user can enter any information in the note input box 1338 of the new production container portion 1330.

Figure 18:
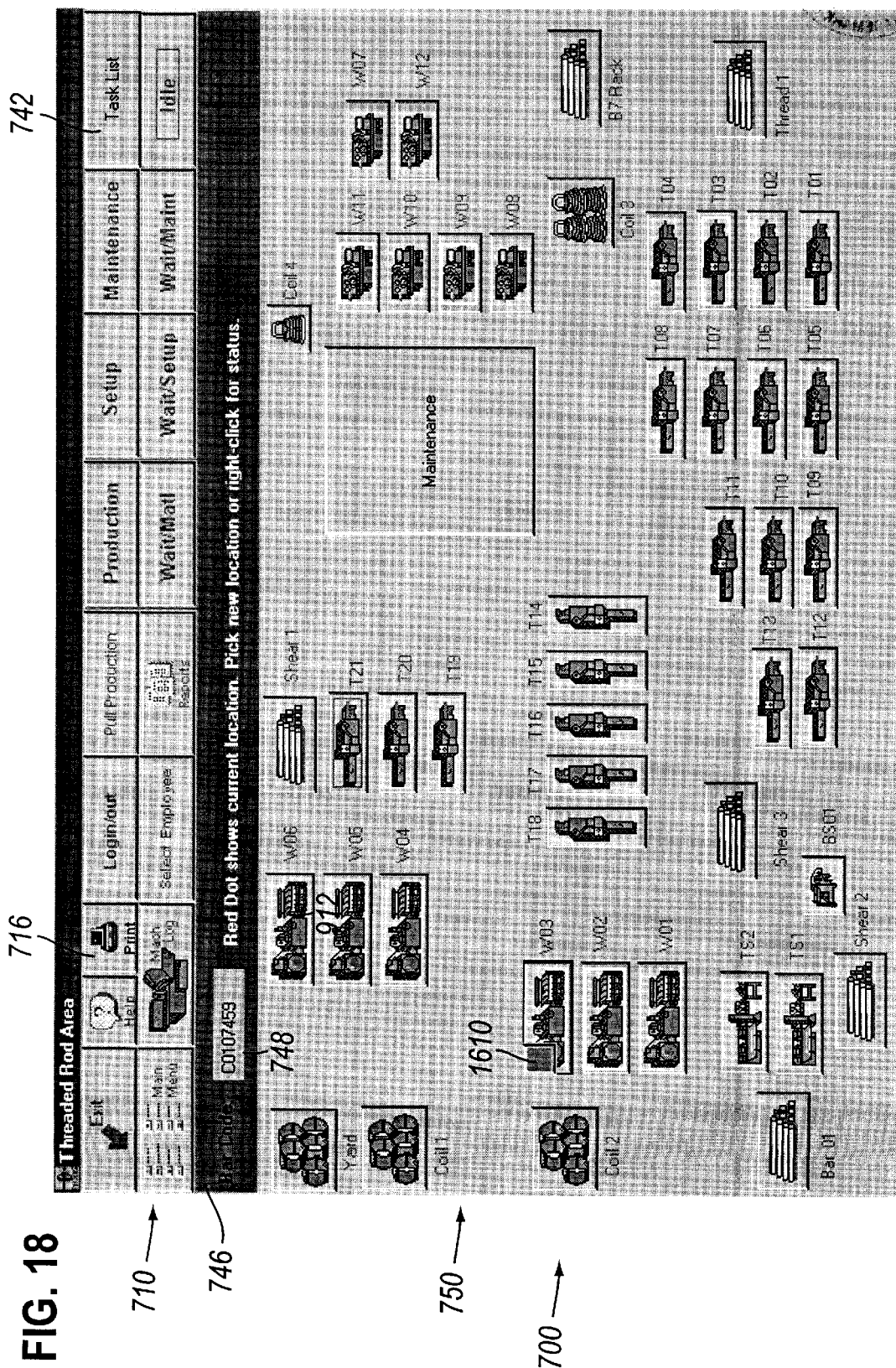
FIG. 18 shows the Threaded Rod Area shop floor screen of the graphical user interface shop floor control system of this invention used to display the current location of a given container on the depicted shop floor.
Figure 19:
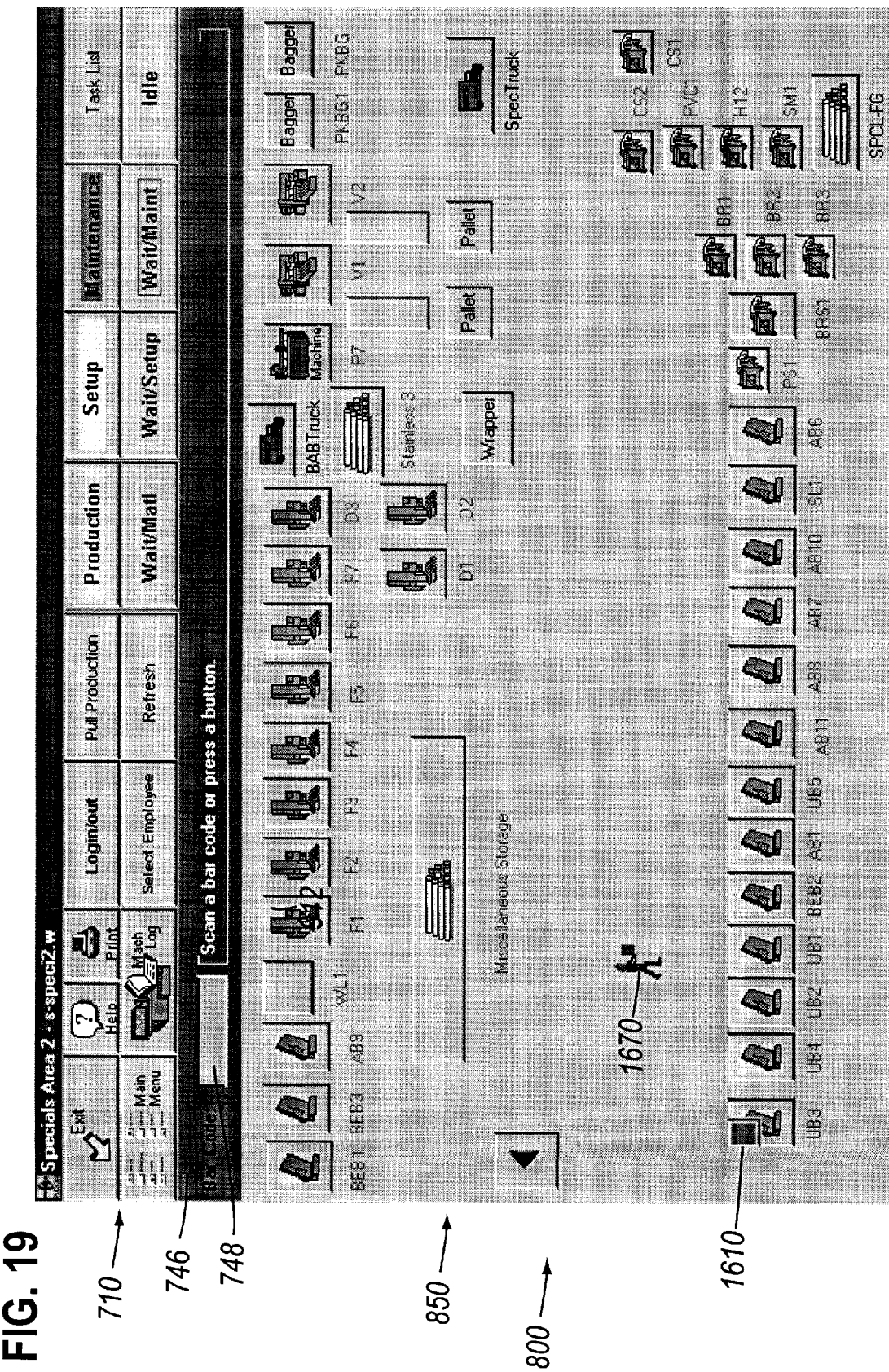
FIG. 19 shows the Specials Area 2 shop floor screen used to enter data to the graphical user interface shop floor control system of this invention when transferring materials within the depicted shop floor.

The user then selects the OK button 918. At that time, the new production container information is transmitted to the relational database 250 and a new production container record is created. At the same time, the client system generates a new bar code label for attaching to the container. The new production container screen 1300 then closes and the container moving process and animation, described below with respect to FIGS. 18 and 19, is used to indicate the new location for this new production container to the graphical user interface shop floor control system.

FIG. 16 shows the machine schedule screen 1400, which is displayed in response to selecting the PRODUCTION button 730 of the shop floor screen 700 or 800. As set forth above, when the status of a particular machine is to be changed to "production", the worker at that machine selects the PRODUCTION button 730 and then selects the machine icon corresponding to that particular machine. Similarly, if the worker needs to stop producing parts for one job and being producing parts for another job, the worker at that machine selects the PRODUCTION button 730 and then selects the machine icon corresponding to that particular machine. This is true even if the part to be produced is the same part. In either case, the machine schedule screen 1400 is displayed to allow the worker to select the job to which the next use of the selected machine will be attributed.

Thus, the machine schedule screen 1400 is displayed to allow the worker to select the particular job to which the currently produced parts will be attributed. The machine schedule screen 1400 includes the menu bar 1210, a machine schedule portion 1410 and a JOB SHEET button 1420.

Normally, a job is scheduled on a machine using the new production screen 1300 described above and the container movement process described below with respect to FIGS. 18 and 19, when a new container is produced and moved to the selected machine for further processing of the parts stored in that container. Similarly, when a container storing work-in-progress is moved from a storage location to a particular machine, the job associated with that container is scheduled to that particular machine. The JOB SUPERVISION button 580 of the manufacturing menu 500 can also be used to schedule a job on a particular machine, for example, as part of moving a container storing raw materials to that particular machine. Often, a container storing raw materials does not yet have a job associated with it. One use of the JOB SUPERVISION button 580 is to associate a job with that raw materials-storing container.

The machine schedule portion 1410 includes a JOB NO title button and column 1411, a PART NO title button and column 1412, a QUANTITY title button and column 1413, a PRODUCED title button and column 1414, a NOTE title button and column 1415, a COMP title button and column 1416, a DUE DATE title button and column 1417, an HOURS column 1418, and a scroll bar 1419. As set forth above with respect to the display portion 1240 of the machine login screen 1200, selecting any one of the title buttons 1411–1418 of the machine schedule portion 1410 sorts the records of the machine schedule for the selected machine in descending order based on the values for the selected title button. Selecting that title button again resorts the records in the machine schedule for the selected machine so they are displayed in the machine schedule portion 1410 in ascending order based on the values for the selecting column. Selecting a different one of the title buttons 1411–1418 causes the records displayed in the machine schedule portion 1410 to be resorted in descending order according to the values for that column.

The JOB NO column 1411 indicates the job number assigned to the particular jobs scheduled for production on the selected machine. The PART NO column 1412 indicates the part number to be produced for this job. The QUANTITY column 1413 indicates the total quantity of parts, in pieces, weight, packages or the like. The PRODUCED column 1414 indicates the quantity of parts actually produced so far for this job. The NOTE column 1415 provides a place for the worker or others to put notes about the job. The COMP (completed proportion) column 1416 indicates the proportion of the total quantity for the job that the quantity in the PRODUCED column represents. The DUE DATE column 1417 indicates the date by which the job should be completed. The HOURS column 1418 indicates the number of labor hours that have been consumed so far in completing the job. The scroll bar 1419 allows the worker to scroll through the jobs scheduled on the selected machine if more jobs than can be displayed in the machine schedule portion 1410 have been scheduled on the selected machine.

When the machine schedule screen 1400 is displayed in response to selecting the PRODUCTION button 730, the displayed machine schedule is for the selected machine. The machine schedule screen 1400 can also be displayed in response to selecting the MACHINE SCHEDULE button 590 of the manufacturing menu 500. In this case, the displayed machine schedule is for all machines. In this case, the FILTER button 1018 is used to select the particular machine or machines the machine schedule screen 1400 will display the schedule for. Additionally, the machine schedule screen could include the department and machine portions 1810 and 1820, described below with respect to FIG. 21, to allow the user to select the particular department and machine the machine schedule screen 1400 will display the schedule for.

The JOB SHEET button 1420 is used to view a description of the machining operations that are necessary to complete a job. Thus, if the worker at a particular machine is not sure what machining operation or operations that worker is to perform next on the part for the selected job, that worker can select the JOB SHEET button 1420 to review the description of the machining operations for the selected job.

FIG. 17 shows the machine log-maintenance record screen 1500, which is displayed in response to selecting the MAINTENANCE button 738 of the shop floor screen 700 or 800. In particular, when a maintenance crew begins performing maintenance on a particular machine, the maintenance crew first selects the MAINTENANCE button 738, then selects the particular machine icon corresponding to the machine that is about to be serviced. As a result, the machine log-maintenance record screen 1500 is displayed.

The machine log-maintenance record screen 1500 includes the menu bar 910, a maintenance type input box 1510, a notes input box 1520, and a flag input box 1530 and a flag check box 1540. The menu bar 910 contains the menu buttons 912–918 and has been described previously. Accordingly, no further description of these buttons is provided.

The maintenance type input box 1510 is used to identify the general type of maintenance being performed on the machine. In general, the various maintenance types will include electrical, mechanical, hydraulic, pneumatic, and the like. The particular maintenance types will of course depend on the particular types of machines present in the factory. The maintenance type input box 1510 includes a drop down menu to aid the maintenance crew in selecting the type of maintenance performed.

The notes input box 1520 is used to input a detailed description of the maintenance services provided by the maintenance crew on the selected machine. This data becomes part of the permanent machine log and is also provided to a preventative maintenance system, if the factory has such a system. The flag input box 1530 is used to provide a description of ongoing problems or warnings that should be provided to the next maintenance crew when that next maintenance crew next works on the selected machine. The flag check box 1540 is used to indicate whether the flag color encoding of the alpha-numeric code for the machine icon for this machine should be set or cleared.

Additionally, in an alternative embodiment, the machine log maintenance record screen 1500 can also be accessed through the WAIT/MAINT button 740. In this case, the machine log maintenance record screen 1500 would be used by an operator of the selected machine to notify the maintenance department of a particular maintenance problem that needs to be dealt with for the selected machine. That is, the machine log-maintenance record screen 1500 can also be used to provide details of a maintenance problem to the maintenance department and/or to input data into a maintenance queue. Accordingly, the machine log maintenance record screen 1500 can also be used to actively request maintenance on a particular machine, as well as to passively record the maintenance performed on a particular machine.

FIGS. 18 and 19 illustrates how the shop floor screen 700 or 800 of the graphical user interface shop floor control system of this invention can be used to provide data to the relational database 250 about the location and movement of storage containers about the shop floor. As described above, bar code labels are used to track containers as they move through the factory. In general, containers are usually moved as part of the process of creating a new container, as described above with respect to FIG. 15. To move a container outside of creating a new container, the operator either scans the bar code label attached to the container using the bar code scanner 286 or 386, or uses the keyboard 284 or 384 to enter the alphanumeric bar code in the input box 748 of the bar code portion 746 of the shop floor screen 700 or 800.

In either case, the graphical user interface shop floor control system of this invention then accesses the relational database 250 to determine the current location of the identified container from the data stored in the relational database 250. The current location of the container, as indicated by the data stored in the relational database 250, is displayed on the shop floor representation 750 or 850 as a red-colored square box or "dot" 1610, as shown in FIG. 17. This red-colored "dot" 1610 corresponds to the "you are here" dots displayed on maps of malls, theme parks and the like. The red-colored box or dot 1610 is displayed in the shop floor representation 750 or 850 overlying the icon representing the factory element where that container is located. Thus, as shown in FIG. 18, when a bar code, such as the bar code "C0107459" is entered into the bar code input box 748 of the bar code portion 746, all of the menu buttons 710–744 of the menu bar 710, except the PRINT button 726 and the TASK LIST button 742, are grayed out. At the same time, the current location of the container "C0107459" is displayed on the shop floor representation 750 as the red-colored box or dot 1610. It should also be appreciated that, as shown in FIG. 19, it is not necessary to gray out the menu buttons 712, 714 718–740 or 744 of the menu bar 710. As shown in FIG. 18, the container having the bar code label "C0107459" is associated with the machine W03, and thus is displayed as the box 1610 overlying the machine icon for the machine W03. Similarly, as shown in FIG. 19, the red block or dot 1620 for the container having the bar code label "C0107458" is displayed overlying the machine icon 852 for the machine UB3.

Then, the operator selects the factory element displayed in the shop floor representation 750 or 850 that corresponds to the location to which that container will be, or has been, moved. In response, as shown in FIG. 19, the graphical user interface shop floor control system of this invention displays a graphic animation 1620 of an employee. The animated employee 1620 "picks up" the red block or dot 1610 representing the container at its current location, "walks" the red block or dot 1610 over to the new location and "sets" the red block or dot 1610 down over the selected factory element representing the new location for the selected container. At the same time, the graphical user interface shop floor control system of this invention updates the record in the relational database 250 corresponding to that container to indicate its new location. This animation is designed to inform the operator in a graphical way, that the system has acknowledged the movement of the container from the current location to the next location.

In operation, the user will either inform the relational database 250 of the movement of the container using the graphical user interface shop floor control system of this invention either immediately before or immediately after the corresponding container is physically moved from its current location to its next location. However, in a first preferred embodiment of the graphical user interface shop floor control system of this invention, it is the responsibility of the operator to ensure the container is actually moved from its current location to its next location.

In an alternate embodiment of the graphical user interface shop floor control system of this invention, this process cannot only be used to inform the relational database of the new location for this container, but can also be used to generate a request to a materials handling department to have the particular container moved from its current location to the new location. Thus, in this embodiment, the operator does not actually move the container from its present location to its new location. Rather, the graphical user interface shop floor control system of this invention uses this movement procedure on the shop floor representation 850 to dispatch a forklift driver or the like to move the container from its present location to the new location.

In yet another embodiment of this movement procedure, it is possible that the factory has an automated materials transport and handling system. Such automated materials transport and handling systems are used in, for example, semiconductor chip manufacturing plants to transport the semiconductor wafers between processing operations. Accordingly, if the factory is equipped with such an automated materials handling and transport system, the graphical user interface shop floor control system of this invention can use this movement procedure to generate the routing information required by the automated materials handling and transport system to automatically move the container from its current location to the next location.

In a further alternate embodiment of this invention, additional animations can be provided. For example, rather than a single static machine icon for each different type of machine, the selectable icons associated with each machine can be formed as a series of slightly different icons that are displayed in rapid succession provide an animation of the machine. Thus, a press or forge would have a portion that moves up and down or otherwise reciprocates. Similarly, a thread cutter or lathe would have a rotating spindle.

Figure 20:
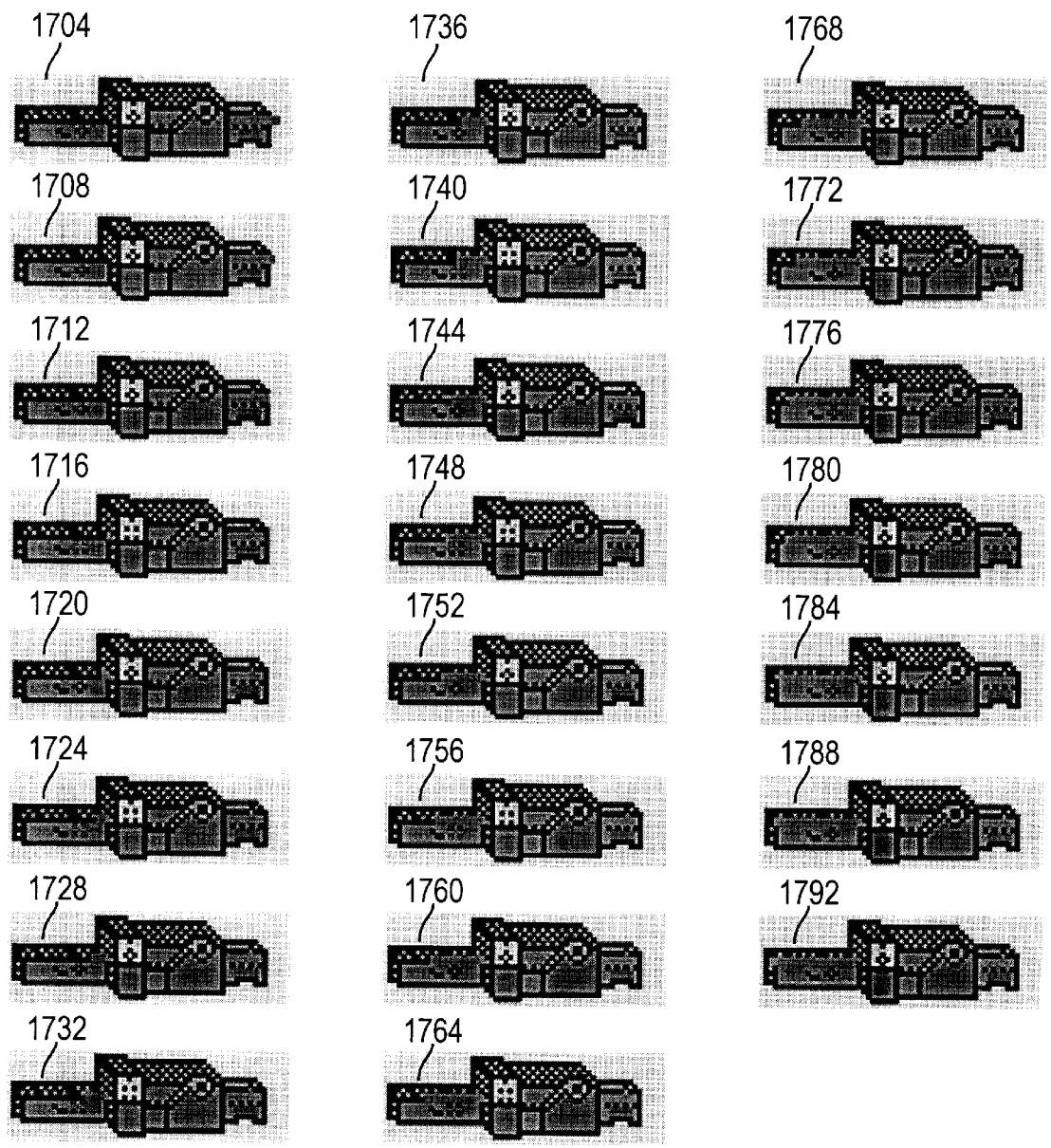
FIG. 20 is a compilation of a number of slightly different icon graphics for a particular machine for animating the production status for that machine.

FIG. 20 shows a series 1700 of icons 1704–1792 used to animate a threader machine, such as the threaders 762, labeled T01–T21, and shown in FIG. 7. Because this series of animations represents operation of the threader, the background for this animation is green to indicate the production status. In the icon 1704, the threader is shown having a part to be threaded extending out of the input side of the threader. As each of the icons 1708–1792 is displayed in sequence, the part to be threaded slowly disappears from the input side of the threader and begins appearing at the output side of the threader. Thus, by the time the icon 1792 is displayed, the part has completely passed through the threader and is ready for removal at the output side. Then, after the icon 1792 is displayed, in quick succession, the icon 1704 is redisplayed and the series begins again. Thus, the series 1700 of the icons 1704–1792 shows a part being input by the threader and subsequently output by the threader, thus animating the threading operation provided by the threader.

In yet another embodiment of this invention, the machines themselves can be directly connected to the graphical interface shop floor control system of this invention, to provide real time status information to the relational database 250. This allows more accurate information to be provided to the relational database 250 and also reduces the burden on the operators to quickly and accurately interact with the client systems to update the status information each time the status of a particular machine changes. However, the user can still enter this information through the shop floor screens of the graphical user interface shop floor control system of this invention. Thus, the relational database 250 can obtain data through either path.

FIG. 21 shows a machine log screen 1800. As described above, this machine log screen 1800 is accessible by selecting the MACHINE LOG button 530 of the manufacturing menu 500. The machine log screen 1800 includes the menu bar 1210 described above with respect to the machine login screen 1200 shown in FIG. 14. The machine log screen 1800 also includes a department portion 1810, a machine portion 1820, a machine log portion 1830, a containers produced portion 1840, a supplies portion 1850 and a labor portion 1860. In particular, the department portion 1810 lists each of the organizational departments that the manufacturing operation represented by the various shop screens accessible through the SHOP LAYOUT button 510 is divided into.

The departments displayed in the department portion 1810 can be modified by scrolling through the various listed departments using the scroll bar 1812. A particular department can be selected either directly or by using the scroll bar. Once a particular department has been selected, the machines organizationally associated with that department are displayed in the machine portion 1820. Again, the list of machines displayed in the machine portion 1820 can be changed by scrolling through various machines associated with the selected department using the scroll bar 1822.

Once a particular machine has been selected using the machine portion 1820, a log for that machine is displayed in the machine log portion 1830. The machine log portion includes a DATE title button and column 1831, a STATUS title button and column 1832, a DAY title button and column 1833, a PART NO title button and column 1834, a TIME title button and column 1835, a JOB title button and column 1836, a OPERATION title button and column 1837, a MAINT TYPE title button and column 1838, and an HOURS title button and column 1839. As set forth above with respect to the display portion 1240 of the machine login screen 1200, selecting any one of the title buttons 1831–1839 of the machine log portion 1830 sorts the records of the machine log for the selected machine in descending order based on the values for the selected title button. Selecting that title button again resorts the records in the machine log for the selected machine so they are displayed in the machine log portion 1830 in ascending order based on the values for the selecting column. Selecting a different one of the title buttons 1831–1839 causes the records displayed in the machine log portion 1830 to be resorted in descending order according to the values for that column.

As shown in FIG. 21, the machine log portion 1830 displays the eight-most recent records in the machine log file stored in the database 250 for the machine "T05" of the department "TR-THREADING". As shown in the machine log portion 1830 of FIG. 21, the machine T05 is currently in production as of Feb. 15, 1998 producing part "ATR 3/4X10" beginning at 10:13 p.m., for job "J007421". The previous two entries indicate that the machine T05 became idle beginning on Saturday, February 14 at 4:59 a.m. and remained idle for 41.3 hours. The fourth entry in the machine log 1830 indicates the machine T05 began producing part "ATR 3/4X10" on Friday, February 13, for job J007421, at 3:52 p.m. and produced parts for this job for 13.1 hours. The next two entries displayed in the machine log portion 1830 indicate that the machine T05 began producing part "ATR 3/4X3" on February 13, for job "J007426", at 11:27 a.m. and worked on this job for 4.4 hours. The seventh entry for the machine T05 indicates that this machine began producing part "ATR 3/4X6" on Thursday, February 12 for job "J007423", at 10:49 and worked on this job for 12.6 hours. Finally, the last displayed entry indicates that the machine T05 began producing part "ATR 3/4X10" on February 12, for job "J00742", at 3:52 p.m. and worked on this job for 7.0 hours.

If additional records stored in the machine log file of the data 250 for the machine T05 need to be displayed, the scroll bar 1829 of the machine log portion 1830 can be used to scroll through the records for this machine.

The containers produced portions 1840 includes a CONTAINER title button and column 1841, a TYPE title button and column 1842, a QUANTITY title button and column 1843, and a scroll bar 1844. The containers produced portions 1840 displays the list of containers produced by the selected machine. As set forth above with respect to the machine log portions 1830, selecting a title button once sorts the list of produced containers in descending order according to the values for the selected column, selecting that title button again resorts the list of produced containers in ascending order for that column, and selecting a different title button resorts the list of produced containers in descending order according to the values of the newly-selected column.

The supplies portion 1850 includes a scroll bar 1852 and displays a list of the supplies recently consumed by the selected machine as it was used to produce the containers indicated in the containers produced portion 1840. These supplies include replacement parts installed in the selected machine in response to either scheduled preventative maintenance or to a maintenance problem. These supplies also include tools used by the machine to produce the parts stored in the containers indicated in the containers produced portion 1840. These tools can include things like saw blades, cutting bits, dies, drill bits, taps, grinding or polishing wheels, sanding belts, welding tips, workpiece holding devices, and other tools that must either be discarded or resharpened based on the number of parts produced. These supplies also include consumables used to produce the parts, such as cutting oils and fluids, polishing pastes and the like, bluing fluids, paints, filters, binders, welding rods, solders, gases, and the like. These supplies are associated with the selected machine and are managed using a graphical user interface supplies control system accessible through the MATERIALS and SUPPLIES buttons 450 and 460 of the main menu 400. This graphical user interface supplies control system will not be further described herein.

The labor portion 1860 includes an EMPLOYEE title button and column 1861, a START title button and column 1862, a STOP title button and column 1863, an HOURS title button and column 1864 and a USAGE title button and column 1866 and a scroll bar 1866. The labor portion 1860 is used to attribute the labor hours, and thus the labor cost of the various employees logged onto the selected machines, to the various jobs produced by the selected machine while the selected employee was logged on that machine. Thus, the employee column 1861 lists the various employees, while the start column 1862 and the stop column 1863 indicates when that employee logged on and the subsequently logged off the selected machine. The hours column 1864 indicates the total number of hours, while the user was logged onto the selected machine, that machine was producing that particular part indicated in the usage column 1865.

It should be appreciated that there are two different modes for attributing an employee's labor hours to particular jobs. In a first mode that is less computationally complex but more intrusive on the employee as each employee arrives each morning, that employee is required to log on to the machine he will initially be working on. As that employee works on different machines throughout the day, he is required to log on and log off of the various machines so that his labor hours for that day are properly attributed. Furthermore, when the employee leaves for the day, he is required to log off of all machines which he is currently logged onto. Moreover, if the employee should work overtime, he is nevertheless required to log off and then re-log on to the various machines so that his differential labor costs can be properly attributed.

In a more sophisticated version of the graphical user interface shop floor control system with this invention, the employee does not have to log on a machine each morning and log off the machines each evening. Rather, the graphical interface shop floor control system of this invention recognizes which shift a particular employee is on and recognizes, when the status of the machine is changed from production to idle at the end of a shift, and then changed from idle to production at the beginning of a shift, the production time for that machine for the previous shift is attributed to the employee who works the previous shift and the production time for the current shift is attributable to the employee for this current shift. Furthermore, the graphical user interface shop floor control system of this invention can attribute the production hours when there is no idle time between shifts or after a final shift for a particular day, to the employee for the previous shift as overtime hours.

FIG. 22 shows an exemplary graph screen 1900 accessible through the REPORTS AND GRAPHS button 540 of the manufacturing menu 500. It should be appreciated that when the REPORTS AND GRAPHS button 540 is selected, an intermediate screen providing a list of available reports and graphs is displayed. FIG. 22 shows one of the available graphs, a graph displaying a machine status summary as a pie chart. Thus, while the following description is described relative to this machine status summary pie chart, it should be appreciated that the exemplary graph screen 1900 shown in FIG. 22 is not limited to either displaying the machine status summary or displaying a pie chart.

Thus, the exemplary graph screen 1900 includes a menu bar 1910, a department portion 1920, a machine portion 1930, a time portion 1940, a graphing type 1950, and a graph portion 1960. The menu bar 1910 includes an EXIT button 1912, a HELP button 1914 and a PRINT button 1960, which provide the standard functions attributable to these buttons, as described above. The menu bar 1910 also includes a GRAPH button 1918 that causes a graph to be generated and displayed in the graph portion 1960 based on the particular items set forth in the department portion 1920, the machine portion 1930, the time portion 1940 and the type portion 1950.

The department portion 1920 displays the particular department for which a graph will be created in the graph portion 1960. In particular, the graph portion 1920 includes a drop down menu 1922 that lists all of the possible departments that could be selected in the department portion 1920, including groupings of departments, such as all of the sub-departments in the threading department, and an "ALL" entry for selecting all departments, and/or any other desired supersets and subsets of these departments. The machine portion 1930 displays the selected machine for which the graph displayed in the graph portion 1960 will be created. The machine portion 1930 also includes a drop down menu 1932, that, like the drop down menu 1922, allows any single machine, all machines, or any desired set, subset or superset of machines to be selected.

The time portion 740 displays the time period over which the data for the selected department and the selected machine will be selected from the database 250 to generate the graph displayed in the graph portion 1960. The time portion 1940 includes an up button 1942 and a down button 1944 to allow the time period to be easily adjusted. It should be understood, depending on the particular graph to be generated in the graph portion 1960, that the department portion 1920, the machine portion 1930 and the time portion 1940 either be slightly different, or replaced by other portions. Thus, the particular portions 1920–1940 and their particular structure as shown in FIG. 22 is exemplary only and should not be considered limiting. Those of ordinary skill in the art who clearly understand how to modify the exemplary graph screen 1900 depending on the particular information to be displayed in the graph potion 1960.

The display type portion 1950 is used to control how the graph 1966 displayed in the graph portion 1960 is displayed. In particular, as shown in FIG. 22, the display type portion 1950 includes a solid option button 1952 and an exploded option button 1954. When the solid option button 1952 is selected, the graph 1966 shown in the graph portion 1960 is shown as a solid graph. When the exploded option button 1954 is selected, the graph 1966 is shown in exploded form, as in FIG. 22.

The graph portion 1960 includes a title portion 1962, a legend portion 1964 and a graph 1966. The title portion 1962 indicates the particular information displayed in the graph 1966. The legend portion 1964 provides a key indicating the color coding of the particular data values used to create the graph 1966. The graph 1966, which is shown as a pie chart in FIG. 22, provides a graphical representation of the information in the database 250 for the selected time period, the selected department and the selected machines, for example. It should be appreciated that the graph portion 1966 is not limited to a pie chart, and can include a bar chart, a histogram, a two or three axis scatter plot, or any other known or later developed graphing technique.

FIG. 23 shows an exemplary machines screen 2000 accessible by selecting the MACHINE LIST button 550 of the manufacturing menu 500. The machines screen 2000 is used to view more details about each of the machines than can be obtained by viewing the corresponding shop floor screen. That is, the corresponding shop floor screen indicates the statuses of the various machines, but does not directly indicate what parts the production-status machines are producing, or what maintenance is being performed on the maintenance-status machines, unless the machine icon for a particular machine is selected to view the machine status screen 900 for that machine. The machines screen 2000 allows this information to be viewed for all of the machines of a selected department.

The machines screen 2000 includes the menu bar 1210, described above with respect to the employees screen 1200 shown in FIG. 14. However, in the machines screen 2000, the menu bar 1210 also includes the SET-UP button 1038 described above with respect to the containers screen 1000 shown in FIG. 11. Furthermore, in the machines screen 2000, the REPORTS button 1032 is enabled and thus is not shown in grayed-out format.

The exemplary machines screen 2000 also includes a department portion 2010, a machines portion 2020 and an operations portion 2030. The department portion 2010 includes a scroll bar 2012 for scrolling through the list of departments for the particular factory and operates similarly to the department portion 1810, and thus will not be described further.

The machines portion 2020 includes a MACHINE title button and column 2021, a MODEL title button and column 2022, a FLAG title button and column 2023, a STATUS title button and column 2024, a PART NO title button and column 2025, a MAINTENANCE title button and column 2026 and a scroll bar 2027. The title buttons 2021–2026 operate as described above with respect to FIGS. 9–11. Thus, the particular operation of these title buttons 2021–2026 will not be further described. The machine column 2021 lists the machine numbers for the machines associated with the particular departments selected in the department portion 2010. The model column 2022 indicates the particular model for each machine of the selected department. The flag column 2023 displays any flags that may have been set for the machines of the selected department using the flag portion 924 of the machine status screens 900 shown in FIGS. 9 and 10.

The status column 2024 indicates the particular statuses for the various machines of the selected department currently stored in the database 250 and set using the status buttons 730–744 of the menu bar 710 shown in FIGS. 7 and 8. The part number column 2025 displays the current part number being produced by the machines of the selected department based on the part number displayed in the production portion 930 and selected using the machine schedule portion 970 of the machine status screens 900 shown in FIGS. 9 and 10. The maintenance column 2026 displays the type of maintenance requested or being performed on the machines of the selected department for those machines having either a MAINTENANCE or a WAITING-FOR-MAINTENANCE status and based on the type of maintenance indicated in the maintenance portion 930'. The scroll bar 2027 allows the user to scroll through the list of machines if the number of machines of the selected department cannot fit in the viewable area of the machines portion 2020.

The operations portion 2030 includes a scroll bar 2032 and displays the various operations available for a particular selected machine selected through the machines portion 2020. As shown in FIG. 23, the machine T01 is selected and is only capable of a threading operation.

FIG. 24 shows an exemplary preventative maintenance schedule screen 2100 accessible by selecting the PREVENTATIVE MAINTENANCE SCHEDULE button 560 of the manufacturing menu 500. It should also be appreciated that the preventative maintenance schedule screen 2100 could also be accessed by selecting a maintenance icon of a shop floor screen, such as the maintenance office icon 780 of the shop floor screen 700 shown in FIG. 7. In this case, the preventative maintenance schedule would automatically select the department of the department portion 2110 corresponding to the particular shop floor screen containing the selected maintenance icon.

The exemplary preventative maintenance schedule screen 2100 includes the menu bar 1210 except that the REPORTS button 1032 is also enabled.

The exemplary preventative maintenance schedule screen 2100 also includes a department portion 2110, a machine portion 2120 and a preventative maintenance schedule portion 2130. The department portion 2110 and the machine portion 2120 are identical to the department portion 1810 and the machine portion 1820 of the machine log screen 1800 shown in FIG. 21. Thus, the department portion 2110 and the machine portion 2120 would not be further described.

The exemplary preventative maintenance schedule portion 2130 includes a MAINTENANCE TYPE title button and column 2131, a FREQUENCY (DAYS) title button and column 2132, a RESPONSIBILITY title button and column 2133, a LAST PERFORMED title button and column 2134, a STATUS title button and column 2135, a DUE DATE title button and column 2136, a NOTE title button and column 2137, and a scroll bar 2138. The title buttons 2131–2137 and the scroll bar 2138 operate identically to the various title buttons and scroll bars described above, and thus the operation of these title buttons 2131–2137 and the scroll bar 2138 will not be further described.

The maintenance type column 2131 provides a general description of the particular preventative maintenance to be performed. The frequency (days) column 2132 indicates how often that particular type of preventative maintenance is to be performed. The responsibility column 2133 indicates the employee whose responsibility it is to perform that particular preventative maintenance. The last performed column 2134 indicates when that particular type of preventative maintenance was last performed. The status column 2135 indicates whether the particular preventative maintenance for the selected machine was completed or whether there was a problem. The due date column 2136 indicates when the particular type of preventative maintenance is to be next performed on the selected machine. The note column 2137 provides location where notes, regarding the preventative maintenance performed, entered through the note portion 1520 of the machine log-maintenance record screen 1500, can be displayed.

FIG. 25 shows an exemplary task list screen 2200 accessible by selecting the TASK LIST button 570 of the manufacturing menu 500. The exemplary task list screen 2200 includes the menu bar 1210, a department portion 2210 and a task portion 2220. The menu bar 1210 is identical to the menu bar 1210 of the machine login screen 1200 shown in FIG. 14, except that both the DELETE button 1029 and the REPORTS button 1032 are enabled. Moreover, the department portion 2210 is identical to the department portion 1810 of the machine log screen 1800 and thus will not be further described.

The task portion 2220 includes a TASK title button and column 1021, an ASSIGNED TO title button and column 2222, a PRIORITY title button and column 2223, a REQUIRED DATE title button and column 1024, an "incomplete" option button 2225, a "complete" option button 2226 and a scroll bar 1027. The exemplary task list screen 2200 also includes a PRINT TASK button 2230.

The title buttons 2221–2224, the option buttons 2225 and 2226, and the scroll bar 2227 operate identically to the various title buttons, option buttons and scroll bars described earlier and their operation will not be described further herein, except to the extent it departs from the previous descriptions. The task column 2221 provides a description of the various tasks, outside of the preventative maintenance schedule and the like, that need to be performed for the particular department selected in the department portion 2210. The assigned to column 2222 indicates the particular person to whom this particular task has been assigned.

The priority column 2223 indicates the priority of the various tasks, where a lower number indicates a higher priority. The required date column 2224 indicates the date by which the task is required to be completed. The incomplete option button 1025 and the complete option button 1026 are used to indicate, for a selected one of the tasks, whether that task is incomplete or complete. When a particular task is entered into the task list displayed in the task portion 1020, it is automatically assigned an incomplete status. When the task is completed, the particular task is displayed and then selected on the task portion 2220 and the complete option button 1026 is selected to change the status of that task from incomplete to complete.

The PRINT TASK button 2230 is used to print a particular task and a full description of what is involved in completing that task.

It should also be appreciated that the task list screen 2200 shown in FIG. 25 can also be accessible using the TASK LIST status button 742 of the menu bar 710 shown in FIGS. 7 and 8. In this case, the department portion 1020 will automatically be set to the particular department corresponding to the shop floor screen 700 displayed when the TASK LIST button 742 was selected.

Figure 26:
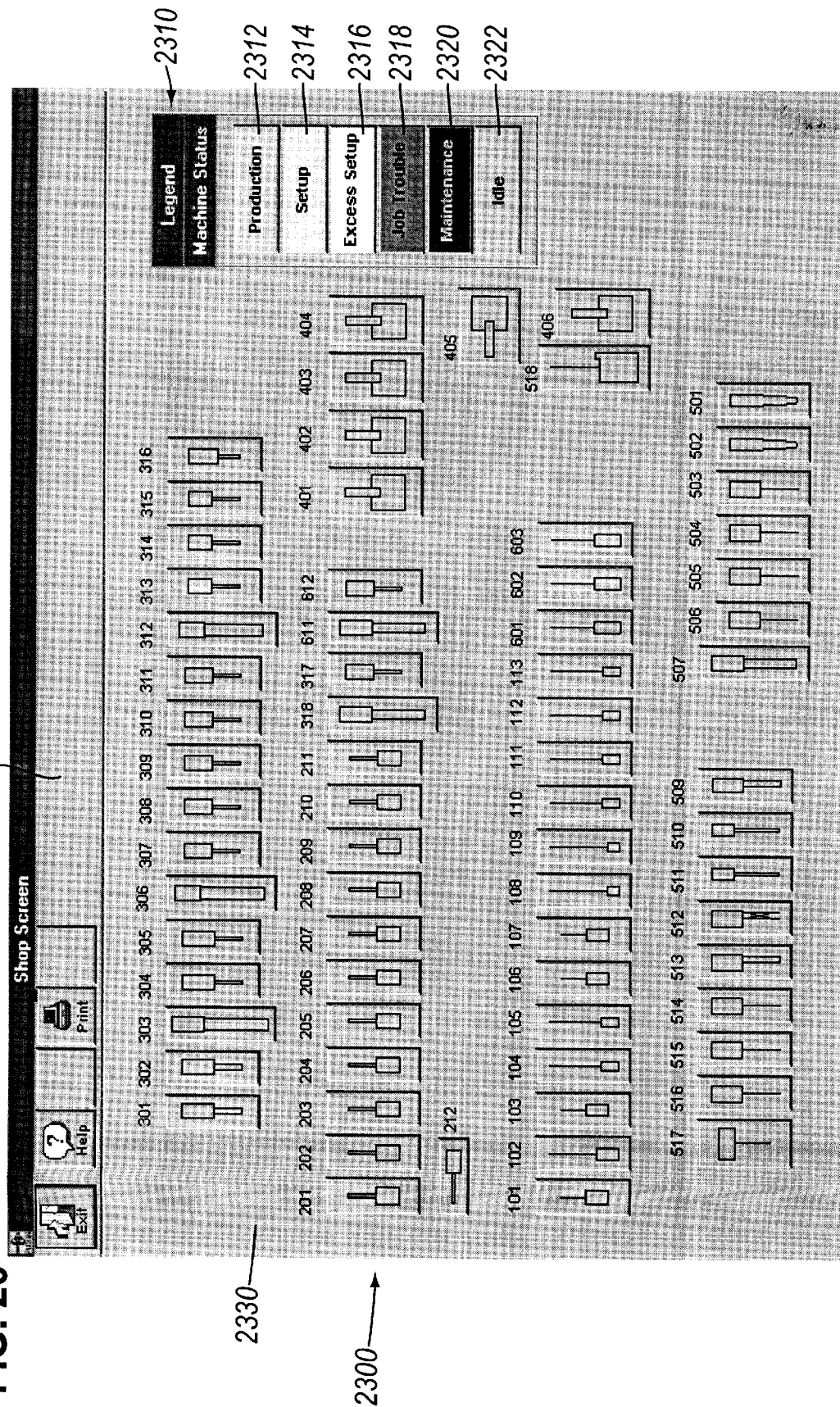
FIG. 26 is a third type of shop screen for a job or production shop according to the graphical user interface shop floor control system of this invention.

FIG. 26 shows another exemplary production shop floor screen 2300 according to this invention for a different production factory than the exemplary factory for which the exemplary factory and shop floor screens 600–800 shown in FIGS. 6–8 were created. The exemplary production shop floor screen 2300 includes the menu bar 410 of the main menu 400 shown in FIG. 4, a machine status legend portion 2310 and a shop floor representation 2330. The shop floor representation 2330 operates similarly to the shop floor representations 750 and 850 described above, using the various screens shown in FIGS. 9–25. Thus, the shop floor representation 2330 will not be further described. However, it should be appreciated that the shop floor representation 2330 does not use the same status buttons 730–744 as the shop floor representations 750 and 850 described above.

In particular, as shown in FIG. 26, the machine status legend portion 2310 includes a PRODUCTION button 2312, a SETUP button 2314, an EXCESS SETUP button 2316, a JOB TROUBLE button 2318, a MAINTENANCE button 2320 and an IDLE button 2322. The PRODUCTION and SETUP buttons 2312 and 2314 operate identically to the PRODUCTION and SETUP buttons 730 and 734 described above, and thus will not be described further.

The MAINTENANCE and IDLE buttons 2320 and 2322 also operate identically to the MAINTENANCE and IDLE buttons 738 and 744 described above, except that different color encoding is used for the MAINTENANCE and IDLE buttons 2320 and 2322 of the shop floor screen 2300 of FIG. 26. In particular, instead of the red color coding used for the MAINTENANCE button 738, the MAINTENANCE button 2320 uses a blue color coding. Similarly, instead of the yellow frame coloring coding used by the IDLE button 744, the IDLE button 2320 uses a gray coloring coding.

The EXCESS SETUP button 2316 is used to attribute the initial set-up time, labor and supplies to a particular job separately from the normal set-up time, labor and supplies. That is, set-up procedures are classified as "excess set-up" the first time a particular machine must be set up to produce a particular part. Once a particular machine has been set up to produce a particular part, setting up that machine, or other models of that machine, to produce that part is generally straightforward and easy to accomplish. This type of set-up procedures is thus classified as regular "setup". In contrast, the first time a particular machine must be set up to produce a particular part, the set-up of that machine must be "debugged" in order to obtain the desired part. This set-up debugging is often time and labor consuming and requires consuming a significant amount of source materials before the resulting parts are acceptable. The large number of unacceptable parts are thus wasted. The excess setup status helps account for the increased time, labor and materials consumed during an initial setup of a particular machine to produce a particular part.

The JOB TROUBLE button 2318 is not used to indicate a maintenance problem, but rather is used to indicate that, while a particular machine is producing parts, the produced parts are, for some reason, unacceptable. This allows the shop floor manager to quickly identify a machine that could be put back into production if the reason why that machine is producing unacceptable parts were determined and solved.

Figure 27:
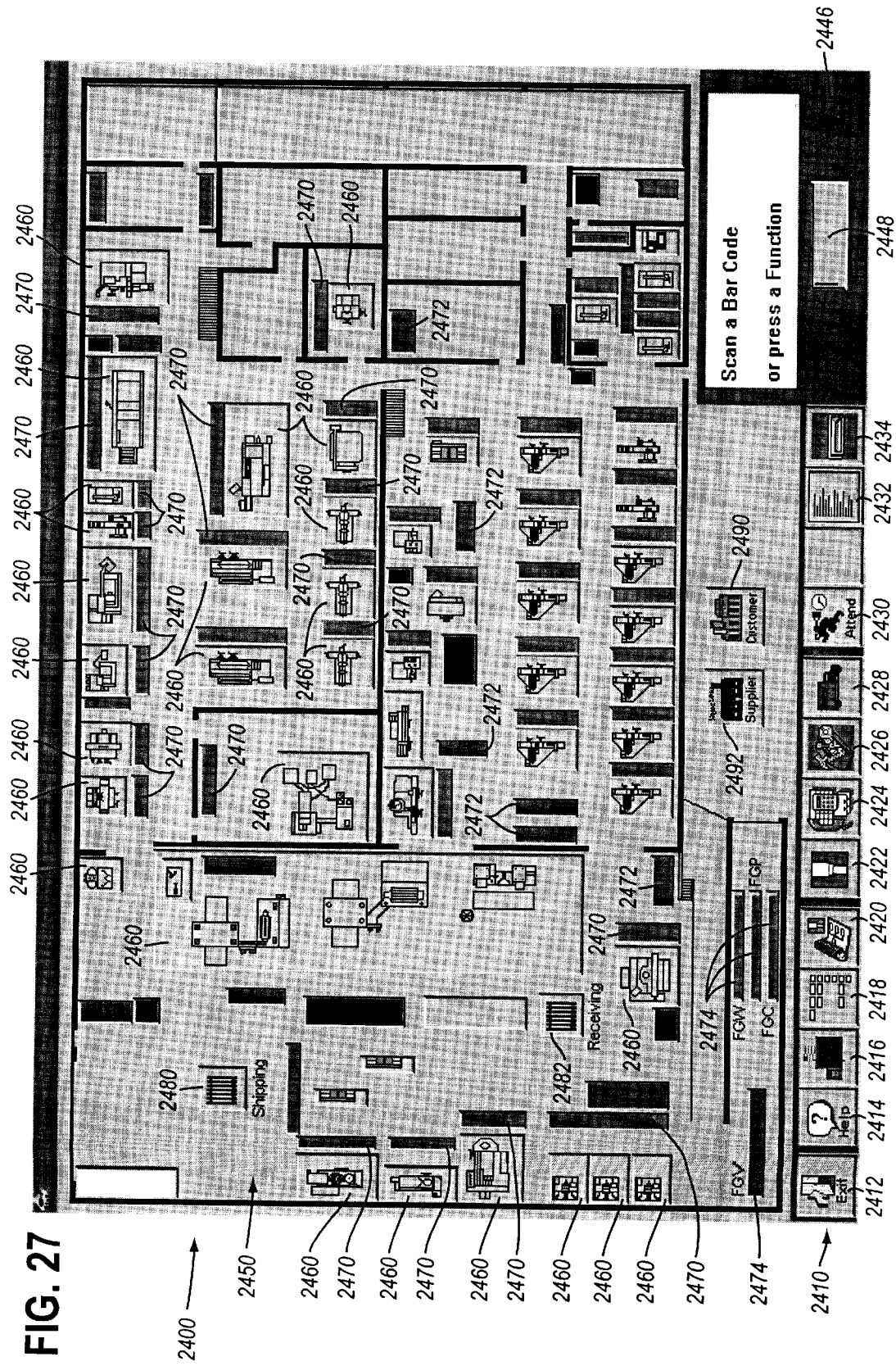
FIG. 27 is a layout screen for a job shop according to the graphical user interface shop floor control system of this invention.

It should be appreciated, from FIGS. 7, 8 and 27, that any set of appropriate machine statuses could be implemented in the shop floor screen according to this invention. In particular, the specific machine statuses that will be used for a particular implementation of the shop floor screens according to this invention will depend on the particular cost and/or labor accounting systems used by the represented factory, the types of machines used by, the types of products made by, and the size of the jobs produced by the represented factory. Thus, the particular status buttons and machine statuses described above are merely illustrative, and a shop floor screen according to this invention can use any combination of the statuses described above, and, more generally, any combination of any known or later developed machine statuses.

It should also be appreciated that, while FIGS. 9–11, 15, 18–19 and 21 are described above with respect to storage containers storing collections of parts or material, when the various screens shown in these figures are used with the job shop shown in FIG. 27, these screens will be altered to refer to individual parts or materials rather than storage containers of parts or material. Thus, it should be understood that the terms "storage container" and "containers" can equally apply to both individual parts or materials as well as storage containers storing collections of parts or material.

FIG. 27 shows yet another exemplary shop floor screen 2400 according to this invention. In contrast to the shop floor screens shown in FIGS. 7, 8 and 27, the shop floor represented by the shop floor screen 2400 is a job shop rather than a production shop. In general, a job shop differs from a production shop in that a production shop produces large quantities of relatively low value parts, while a job shop produces very small quantities of relatively high value parts. Accordingly, while the production shop floors described above stored, maintained and moved raw material and parts around the shop floor using containers of parts, a job shop stores raw material and parts on an individual basis. Thus, in the job shop described below, individual parts, rather than containers of parts, are bar-code labeled and their individual locations maintained using the graphical user interface shop floor control system of this invention.

As shown in FIG. 27, the exemplary job shop floor screen 2400 includes a menu bar 2410, a bar code portion 2446 and a job shop floor representation 2450. The menu bar 2410 includes a EXIT button 2412, a HELP button 2414, a SHOP LOCATION LIST button 2416, a BILL OF MATERIALS button 2418, a JOB/ORDERS button 2420, an INVENTORY button 2422, a MATERIAL ORDERS button 2424, a LABOR button 2426, a SHIPPING/INVOICING button 2428, an ATTEND button 2430, a NOTES button 2432 and an E-MAIL SYSTEM button 2434. Because the shop floor screen 2400 represents a job shop, the shop floor screen actually represents the entire factory for this job shop. Accordingly, when this example of the graphical user interface shop floor control system of this invention is initially opened, it opens directly on the shop floor screen 2400.

The EXIT button 2412 allows the graphical user interface shop floor control system of this invention to be closed. The HELP button 2414 provides help to the user of the graphical user interface shop floor control system of this invention. The SHOP LOCATION LIST button 2416 provides a list of suppliers to and customers of the job shop represented by the shop floor screen 2400. The BILL OF MATERIALS button 2418 provides, for a particular part, a list of raw materials and supplies that were consumed or used to create that part. The JOB/ORDERS button 2420 provides a list of jobs or orders and the current status of the jobs or orders received by this job shop. The INVENTORY button 2422 provides a list of work-in-progress. The MATERIAL ORDERS button 2424 allows a user to order raw materials and provides a list of suppliers and the materials each supplies, and possibly a list of available raw materials at this job shop.

The LABOR button 2426 allows a worker to attribute his labor time to a particular job or to a particular individual workpiece. The SHIPPING/INVOICING button 2428 allows a user to access a shipping and invoicing subsystem of the graphical user interface shop floor control system of this invention for finished parts that have been or are to be shipped to the customer. The ATTEND button 2430 provides access to an attendance and personnel subsystem of the graphical user interface shop floor control system of this invention. The NOTES button 2432 allows a worker to enter notes into the graphical user interface shop floor control system of this invention on anything about the job shop, including notes for a part whose bar code number appears in the bar code display portion 2448. The E-MAIL SYSTEM button 2434 provides access to the E-Mail system of the represented job shop.

The bar code portion 2446 includes a display portion 2448 for displaying a bar code typed in through the keyboard 284 or 384 or scanned using the bar code scanner 286 or 386. The bar code portion 2446 operates similarly to the bar code portion 746 described above and thus will not be further described.

The shop floor representation 2450 includes a number of machine icons 2460 representing the different machines of this job shop, a number of bench icons 2470–2474 representing different places raw materials, work-in-progress and finished inventory can be stored, a shipping icon 2480, a receiving icon 2482, a customer icon 2490 and a supplier icon 2492.

Because the job shop works on a part-by-part basis, rather than on a container basis, the shop floor representation 2400 does not include container storage locations in the same way storage locations were used by the shop floor representations 700, 800 and 2300. Rather, the shop floor representation 2450 includes the "bench" icons 2470–2474, which represent the benches on which the individual parts are placed and stored as work-in-progress or as finished inventory. In the job shop represented by the shop floor representation 2450, there are a number of different types of benches.

A first bench icon 2470 is located adjacent to a machine icon 2460, and represents the location of parts to next be worked on by the machine represented by that machine icon. Thus, the parts stored on a bench next to a machine also represent the schedule of jobs for that machine. A second type of bench stores work-in-progress that has not yet been assigned to a particular machine. Thus, this second type of bench is not associated with any particular machine. These second type benches are represented by the second bench icons 2472 A third type of bench stores raw materials. These third type benches are represented by the third bench icons 2474.

The shipping icon 2480 represents a location where finished inventory ready for shipping to the appropriate customer can be placed for invoicing and shipping to that customer. In contrast, the receiving icon 2482 represents a location where newly received raw materials and other items from suppliers can be placed so they can be entered into the graphical user interface shop floor control system of this invention and have bar code labels assigned to, printed and affixed to each different item and/or each separate piece of raw material.

The customer icon 2490 and the supplier icon 2492 are used to display lists of customers and their orders for which parts are to be produced and suppliers from which raw material is bought.

In operation, to produce a new part, a worker selects the customer icon 2490 to view the uncompleted jobs, so that worker can select a job or part for production. Once a job or part to be produced is selected, the worker removes the appropriate raw materials from a bench storing the piece or pieces of raw material for that job or part. The worker scans the bar code or codes for the selected raw materials, and an icon, corresponding to the container icon 1610 shown in FIGS. 18 and 19, is displayed at the bench icon 2474 corresponding to the location at which the selected raw material is stored. The worker moves this icon to the bench icon 2470 adjacent to the machine icon 2460 corresponding to the machine the worker will use to being making the selected part.

As the worker uses that machine to make the selected part or complete the selected job, the worker will select the LABOR button 2426 to attribute his labor to the selected job or part and the BILL OF MATERIALS button 2418 to attribute to the selected job or part any other materials or supplies used to complete the selected job or make the selected part. Once the worker has finished using that machine, the worker will move the work-in-progress from that bench icon 2470 either to a bench icon 2470 adjacent to a machine icon 2460 corresponding to the next machine to be used to complete the selected job or make the selected part, or to a bench icon 2472 corresponding to a bench used to store work-in-progress until the work-in-progress is moved to the next machine to be used to complete that job or make that part.

When the worker has completed the selected job or finished making the selected part, he will move that part, or the part or parts for the selected job, to the shipping area, and will move the icon for that part, or the icons for each such part of the selected job, to the shipping icon 2490. The part or parts can then be shipped to the customer, and the shipping and invoicing will be done by selecting the SHIPPING/INVOICING button 2428 to access the shipping and invoicing subsystem.

It should be appreciated that, in FIGS. 7–25, the various icons use graphics that show the represented machines and other factory elements in a perspective view from a front of the machine or other factory element. In contrast, in FIGS. 26 and 27, the various icons use graphics that show the represented machines and other factory elements in a plan view from above the machine or other factory element. It should be appreciated that any desired view could be used to generate the graphics for the machines and other factory elements for the graphical user interface shop floor control system of this invention. It should also be appreciated that any combination of the various sets of status buttons and the various screens of the graphical user interface shop floor control system of this invention described above with respect to FIGS. 4–27 could be used to implement the graphical user interface shop floor control system of this invention for a particular factory or shop. Thus, the various screens described above with respect to FIGS. 4–27 are exemplary only, and a particular implementation of the graphical user interface shop floor control system of this invention may use any one, any combination of, or all of the various screens described above with respect to FIGS. 4–27.

It should be appreciated that the various menu bars 410, 710, 910, 1010, 1210, 1910 and 2310 that can be used in more than one screen of the graphical user interface shop floor control system of this invention can be implemented by one or more software objects that can be reused and instantiated with different sets of displayed buttons and different sets enabled ones of the displayed buttons. Thus, the various screens of the graphical user interface shop floor control system of this invention can easily be provided with an appropriate menu bar with little programming overhead.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and the scope of the invention.

What is claimed is:

1. A graphical user interface for inputting, displaying and managing information about a manufacturing operation stored in a database, the manufacturing operation comprising at least one shop floor, each shop floor including at least one factory element, the graphical user interface comprising:

at least one shop floor screen, each shop floor screen corresponding to one of the at least one shop floor of the manufacturing operation and graphically depicting the corresponding shop floor and the at least one factory element of the corresponding shop floor, wherein:

each at least one shop floor screen comprises at least one selectable icon, each selectable icon graphically depicting one of the at least one factory element of the corresponding shop floor;

for at least one of the at least one shop floor screen, at least one of the at least one selectable icon represents a machine located on the corresponding shop floor;

for each selectable icon that represents a machine, that selectable icon includes at least one graphic depicting the machine represented by that selectable icon; and for each of at least one of the selectable icons, the at least one graphic comprises a plurality of graphics that are sequentially displayable within that selectable icon.

2. The graphical user interface of claim 1, wherein, for each shop floor screen, each selectable icon is positioned at a location within that shop floor screen corresponding to a location of the corresponding shop floor occupied by the factory element represented by that selectable icon.

3. The graphical user interface of claim 1, wherein each factory element is one of a machine, a storage location, a work center, an office, a material transport system, and a loading dock.

4. The graphical user interface of claim 1, wherein, when the plurality of graphics are sequentially displayed, an animation of the machine represented by that selectable icon is displayed.

5. The graphical user interface of claim 1, wherein, for each selectable icon that represents a machine, that selectable icon includes an alphanumeric code that identifies the particular machine represented by that selectable icon.

6. The graphical user interface of claim 5, wherein the alphanumeric code further identifies a type of the machine represented by that selectable icon.

7. The graphical user interface of claim 1, wherein, for at least one of the at least one shop floor screen, at least one of the at least one selectable icon represents a work center of the corresponding shop floor.

8. The graphical user interface of claim 7, wherein, for each selectable icon that represents a work center, that selectable icon includes an alphanumeric code that identifies the particular work center represented by that selectable icon.

9. A graphical user interface for inputting, displaying and managing information about a manufacturing operation stored in a database, the manufacturing operation comprising at least one shop floor, each shop floor including at least one factory element, the graphical user interface comprising:
  at least one shop floor screen, each shop floor screen corresponding to one of the at least one shop floor of the manufacturing operation and graphically depicting the corresponding shop floor and the at least one factory element of the corresponding shop floor, wherein:
    each at least one shop floor screen comprises at least one selectable icon, each selectable icon graphically depicting one of the at least one factory element of the corresponding shop floor;
    for at least one of the at least one shop floor screen, at least one of the at least one selectable icon represents a machine located on the corresponding shop floor; and
    for each shop floor screen that includes at least one selectable icon representing a machine, that shop floor screen further comprises a plurality of selectable status icons, each selectable status icon defining a status assignable to the at least one machine of the corresponding shop floor.

10. The graphical user interface of claim 9, wherein the plurality of selectable status icons comprise at least two of a production icon, a waiting-for-materials icon, a setup icon, a waiting-for-setup icon, a maintenance icon, a waiting-for-maintenance icon, an idle icon, a shut-down icon, a task list icon, a job trouble icon, and an excess setup icon.

11. The graphical user interface of claim 9, wherein, when a shop floor screen representing a shop floor of the manufacturing operation is displayed:
  a status is assigned to a machine located on the shop floor represented by the displayed shop floor screen by selecting a selectable status icon and then selecting the selectable icon of the displayed shop floor screen representing that machine; and
  the assigned status is communicated to the database and the information about the manufacturing operation stored in the database is updated to reflect the status assigned to that machine.

12. The graphical user interface of claim 9, wherein, for each selectable icon that represents a machine, an appearance of that selectable icon is based on the status assigned to the machine represented by that selectable icon and stored in the database.

13. The graphical user interface of claim 12, wherein the appearance is a color encoding of the selectable icon.

14. The graphical user interface of claim 9, wherein, for each shop floor screen, each selectable icon is positioned at a location within that shop floor screen corresponding to a location of the corresponding shop floor occupied by the factory element represented by that selectable icon.

15. A graphical user interface for inputting, displaying and managing information about a manufacturing operation stored in a database, the manufacturing operation comprising at least one shop floor, each shop floor including at least one factory element, the graphical user interface comprising:
  at least one shop floor screen, each shop floor screen corresponding to one of the at least one shop floor of the manufacturing operation and graphically depicting the corresponding shop floor and the at least one factory element of the corresponding shop floor, wherein:
    each at least one shop floor screen comprises at least one selectable icon, each selectable icon graphically depicting one of the at least one factory element of the corresponding shop floor;
    for at least one of the at least one shop floor screen, at least one of the at least one selectable icon represents a machine located on the corresponding shop floor; and
    the graphical user interface further comprises a machine status screen, status information stored in the database about a selected machine displayable on the machine status screen.

16. The graphical user interface of claim 15, wherein the machine status screen includes at least one of:
  a status portion that displays status information stored in the database about the selected machine;
  an employee portion that displays information stored in the database about employees associated with the selected machine;
  a produced portion that displays information stored in the database about parts or material produced by the selected machine;
  a material portion that displays information stored in the database about source material associated with the selected machine; and
  a schedule portion that displays information stored in the database about jobs associated with the selected machine.

17. The graphical user interface of claim 16, wherein the status portion includes at least one of:
  an assigned status portion that displays at least a status assigned to the selected machine; and
  a status information portion that displays status information stored in the database about status assigned to the selected machine.

18. The graphical user interface of claim 15, wherein, when a shop floor screen that includes at least one selectable icon that represents a machine is displayed, selecting one of the at least one selectable icon representing a machine causes the machine status screen to be displayed, the machine status screen displaying information stored in the database about the machine represented by the selected icon.

19. The graphical user interface of claim 15, wherein the machine status screen includes:
  a flag setting portion for setting and removing a flag associated with the selected machine; and
  a flag information input portion for inputting information about the selected machine, the input information to be associated with the flag when the flag is set.

20. The graphical user interface of claim 19, wherein, when the flag associated with the selected machine is set, an appearance of a machine icon representing the selected machine is altered.

21. The graphical user interface of claim 20, wherein the appearance of the machine icon is altered by altering a color of an alphanumeric code portion of the machine icon.

22. The graphical user interface of claim 19, wherein, when the flag setting portion indicates the flag associated with the selected machine is set, closing the machine status screen causes the information about the flag and the input information about the selected machine to be transmitted to the database.

23. The graphical user interface of claim 15, wherein, for each shop floor screen, each selectable icon is positioned at a location within that shop floor screen corresponding to a location of the corresponding shop floor occupied by the factory element represented by that selectable icon.

24. A graphical user interface for inputting, displaying and managing information about a manufacturing operation stored in a database, the manufacturing operation comprising at least one shop floor, each shop floor including at least one factory element, the graphical user interface comprising:

at least one shop floor screen, each shop floor screen corresponding to one of the at least one shop floor of the manufacturing operation and graphically depicting the corresponding shop floor and the at least one factory element of the corresponding shop floor, wherein:

each at least one shop floor screen comprises at least one selectable icon, each selectable icon graphically depicting one of the at least one factory element of the corresponding shop floor;

for at least one of the at least one shop floor screen, at least one of the at least one selectable icon represents a machine located on the corresponding shop floor; and the graphical user interface further comprises a new production screen, production information stored in the database about a selected machine displayable on the new production screen.

25. The graphical user interface of claim 24, wherein the new production screen includes at least one of:

a material portion that displays information stored in the database about source material associated with the selected machine; and a new production portion that displays information stored in the database about new parts or material produced by the selected machine.

26. The graphical user interface of claim 25, wherein the material portion includes at least one of:

information about a part or material forming the source material, information identifying the part or material;

information about a job number associated with the part or material;

information about an operation associated with the part or material;

information about a lot number of the source material;

information about a quantity of a remaining portion of the source material; and information about a type of the source material.

27. The graphical user interface of claim 25, wherein the new production portion includes at least one of:

information about a part number of the new part or material produced;

information identifying the new part or material;

information about a job number associated with the new part or material;

information about an operation associated with the new part or material;

information about a lot number of the source material used to form the new part or material;

an input portion for inputting information about a quantity of the new part or material;

an input portion for inputting information about a type of the new part or material; and an input portion for inputting note information about the new part or material.

28. The graphical user interface of claim 27, wherein, after the information about a quantity of the new part or material and the information about a type of the new part or material is input through the appropriate input portion, closing the new production screen causes this information to be transmitted to the database.

29. The graphical user interface of claim 27, wherein closing the new production screen and selecting another selectable icon corresponding to a new location for the new part or material causes the shop floor screen to display an animation representing movement of the new part or material from the machine represented by the selected icon to the factory element represented by the other selectable icon.

30. The graphical user interface of claim 27, wherein the new production screen includes a print icon, selecting the print icon causing a label to be printed for the new part or material, the label containing the information identifying the new part or material.

31. The graphical user interface of claim 24, wherein, when a shop floor screen that includes at least one selectable icon that represents a machine and a new production icon is displayed, selecting the new production icon and then one of the at least one selectable icon representing a machine causes the new production screen to be displayed, the new production screen displaying the production information stored in the database about the machine represented by the selected icon.

32. The graphical user interface of claim 24, wherein, for each shop floor screen, each selectable icon is positioned at a location within that shop floor screen corresponding to a location of the corresponding shop floor occupied by the factory element represented by that selectable icon.

33. A Graphical user interface for inputting, displaying and managing information about a manufacturing operation stored in a database, the manufacturing operation comprising at least one shop floor, each shop floor including at least one factory element, the graphical user interface comprising:

at least one shop floor screen, each shop floor screen corresponding to one of the at least one shop floor of the manufacturing operation and graphically depicting the corresponding shop floor and the at least one factory element of the corresponding shop floor, wherein:

each at least one shop floor screen comprises at least one selectable icon, each selectable icon graphically depicting one of the at least one factory element of the corresponding shop floor;

for at least one of the at least one shop floor screen, at least one of the at least one selectable icon represents a machine located on the corresponding shop floor; and the graphical user interface further comprises a maintenance input screen, maintenance information about a selected machine capable of being input into the database using the maintenance input screen.

34. The graphical user interface of claim 33, wherein the maintenance input screen includes at least one of:

a maintenance type input portion that allows maintenance type information about the selected machine to be input;

a maintenance notes input portion that allows maintenance notes information about the selected machine to be input; and a maintenance warning input portion that allows maintenance warning information about the selected machine to be input.

35. The graphical user interface of claim 33, wherein:

when a shop floor screen that includes at least one selectable icon that represents a machine and a maintenance input icon is displayed on one of the plurality of computing devices, selecting the maintenance input icon and then one of the at least one selectable icon representing a machine causes the maintenance input screen to be displayed; and after the maintenance information about the selected machine is input, closing the maintenance input screen causes the input maintenance information to be transmitted to the database.

36. The graphical user interface of claim 33, wherein, for each shop floor screen, each selectable icon is positioned at a location within that shop floor screen corresponding to a location of the corresponding shop floor occupied by the factory element represented by that selectable icon.

37. A graphical user interface for inputting, displaying and managing information about a manufacturing operation stored in a database, the manufacturing operation comprising at least one shop floor, each shop floor including at least one factory element, the graphical user interface comprising:

at least one shop floor screen, each shop floor screen corresponding to one of the at least one shop floor of the manufacturing operation and graphically depicting the corresponding shop floor and the at least one factory element of the corresponding shop floor, wherein:

each at least one shop floor screen comprises at least one selectable icon, each selectable icon graphically depicting one of the at least one factory element of the corresponding shop floor;

for at least one of the at least one shop floor screen, at least one of the at least one selectable icon represents a storage location of the corresponding shop floor; and for each selectable icon that represents a storage location, that selectable icon includes a graphic depicting a parts or material stored in the storage location represented by that selectable icon.

38. The graphical user interface of claim 37, wherein, for each shop floor screen, each selectable icon is positioned at a location within that shop floor screen corresponding to a location of the corresponding shop floor occupied by the factory element represented by that selectable icon.

39. The graphical user interface of claim 37, wherein, for each selectable icon that represents a storage location, that selectable icon includes an alphanumeric code that identifies the particular storage location represented by that selectable icon.

40. The graphical user interface of claim 39, wherein the alphanumeric code further identifies a type of parts or material generally stored in the storage location represented by that selectable icon.

41. A graphical user interface for inputting, displaying and managing information about a manufacturing operation stored in a database, the manufacturing operation comprising at least one shop floor, each shop floor including at least one factory element, the graphical user interface comprising:

at least one shop floor screen, each shop floor screen corresponding to one of the at least one shop floor of the manufacturing operation and graphically depicting the corresponding shop floor and the at least one factory element of the corresponding shop floor, wherein:

each at least one shop floor screen comprises at least one selectable icon, each selectable icon graphically depicting one of the at least one factory element of the corresponding shop floor;

for at least one of the at least one shop floor screen, at least one of the at least one selectable icon represents a storage location of the corresponding shop floor; and the graphical user interface further comprises a storage location screen, status information stored in the database about at least one selected storage location displayable on the storage location screen.

42. The graphical user interface of claim 41, wherein the storage location screen includes at least one of:

a identification portion that displays identification information stored in the database about each of at least one subset of parts or material associated with the at least one selected storage location;

a material portion that displays information stored in the database about each of the at least one subset of parts or material associated with the at least one selected storage location;

a quantity portion that displays quantity information stored in the database about each of the at least one subset of parts or material associated with the at least one selected storage location;

a location portion that displays location information stored in the database about each of the at least one subset of parts or material associated with the at least one selected storage location;

a operation portion that displays operation information stored in the database about each of the at least one subset of parts or material associated with the at least one selected storage location;

a status portion that displays status information stored in the database about each of the at least one subset of parts or material associated with the at least one selected storage location;

a type portion that displays type information stored in the database about each of the at least one subset of parts or material associated with the at least one selected storage location; and a note portion that displays note information stored in the database about each of the at least one subset of parts or material associated with the at least one selected storage location.

43. The graphical user interface of claim 42, wherein, when a subset of parts or material is stored in or associated with a container, the identification information for that subset of parts or material is a container number assigned to the container associated with or storing that subset of parts or material.

44. The graphical user interface of claim 42, wherein:

the storage location screen further includes a first option icon and a second option icon;

selection of the first option icon causes information only about current subsets of parts or material associated with the selected storage location to be displayed; and selection of the second option icon causes information only about retired subsets of parts or material associated with the selected storage location to be displayed.

45. The graphical user interface of claim 42, wherein the storage location screen further includes an inventory icon and an inventory display portion, selecting the inventory icon causing an inventory of the displayed subsets of parts or material to be determined and displayed in the inventory display portion.

46. The graphical user interface of claim 42, wherein the storage location screen further includes a filter icon, selecting the filter icon allowing input of selection criteria, the subsets of parts or material displayed in the storage location screen being limited to those subsets of parts or material that meet the selection criteria.

47. The graphical user interface of claim 41, wherein, when a shop floor screen that includes at least one selectable icon that represents a storage location is displayed on one of the plurality of computing devices, selecting one of the at least one selectable icon representing a storage location causes the storage location screen to be displayed, the storage location screen displaying information stored in the database about the storage location represented by the selected icon.

48. The graphical user interface of claim 41, wherein, for each shop floor screen, each selectable icon is positioned at a location within that shop floor screen corresponding to a location of the corresponding shop floor occupied by the factory element represented by that selectable icon.

49. The graphical user interface of claim 41, wherein:
the graphical user interface is usable on the shop floor by an operator of one of the at least one factory element of the manufacturing operation to supply information related to that at least one factory element to the database and to store the information into the database, and
each storage location screen is usable by the operator, when interacting with a represented storage location, to supply information related to that storage location to the database.

50. A graphical user interface for inputting, displaying and managing information about a manufacturing operation stored in a database, the manufacturing operation comprising at least one shop floor, each shop floor including at least one factory element, the graphical user interface comprising:
at least one shop floor screen, each shop floor screen corresponding to one of the at least one shop floor of the manufacturing operation and graphically depicting the corresponding shop floor and the at least one factory element of the corresponding shop floor, wherein:
each at least one shop floor screen comprises at least one selectable icon, each selectable icon graphically depicting one of the at least one factory element of the corresponding shop floor;
for at least one of the at least one shop floor screen, at least one of the at least one selectable icon represents a storage location of the corresponding shop floor; and
when a shop floor screen that includes at least one selectable icon that represents a large storage location is displayed on one of the plurality of computing devices, selecting one of the at least one selectable icon representing a large storage location causes a sublocation screen to be displayed, the sublocation screen displaying a plurality of selectable storage sublocation icons, each selectable storage sublocation icon representing a portion of the large storage location.

51. The graphical user interface of claim 50, wherein, when the sublocation screen is displayed on one of the plurality of computing devices, selecting one of the plurality of selectable storage sublocation icons causes the storage location screen for the selected portion of the large storage location to be displayed, the storage location screen displaying information stored in the database about the portion of the storage location represented by the selected sublocation icon.

52. A graphical user interface for inputting, displaying and managing information about a manufacturing, operation stored in a database, the manufacturing operation comprising at least one shop floor, each shop floor including at least one factory element, the graphical user interface comprising:
at least one shop floor screen, each shop floor screen corresponding to one of the at least one shop floor of the manufacturing operation and graphically depicting the corresponding shop floor and the at least one factory element of the corresponding shop floor, wherein:
each at least one shop floor screen comprises at least one selectable icon, each selectable icon graphically depicting one of the at least one factory element of the corresponding shop floor; and
each shop floor screen includes a login icon.

53. The graphical user interface of claim 52, wherein:
selecting the login icon causes an employee identification portion to be displayed in the shop floor screen; and
an employee is identified by inputting a corresponding employee identification number into the employee identification portion.

54. The graphical user interface of claim 53, wherein, after the employee is identified, selecting a selectable icon causes a login signal and the employee identification number to be transmitted to the database, a logged-in/logged-out status of the identified employee for the machine represented by the selected icon being toggled in the database in response to the transmitted login signal and employee identification number.

55. The graphical user interface of claim 54, wherein selecting the login icon causes an appearance of at least one of the at least one machine icon of that shop floor screen to be altered based on the logged-in/logged-out status of the identified employed for the at least one machine icon of that shop floor screen.

56. The graphical user interface of claim 52, wherein, for each shop floor screen, each selectable icon is positioned at a location within that shop floor screen corresponding to a location of the corresponding shop floor occupied by the factory element represented by that selectable icon.

57. A graphical user interface for inputting, displaying and managing information about a manufacturing operation stored in a database, the manufacturing operation comprising at least one shop floor, each shop floor including at least one factory element, the graphical user interface comprising:
at least one shop floor screen, each shop floor screen corresponding to one of the at least one shop floor of the manufacturing operation and graphically depicting the corresponding shop floor and the at least one factory element of the corresponding shop floor, wherein:
each at least one shop floor screen comprises at least one selectable icon, each selectable icon graphically depicting one of the at least one factory element of the corresponding shop floor; and
when one of the at least one shop floor screens is displayed and information is transmitted to the database about movement of parts or material from a first factory element to a second factory element of the displayed shop floor screen, an animation is displayed on the displayed shop floor screen representing the movement of the parts or material from the first factory element to the second factory element.

58. The graphical user interface of claim 57, wherein the animation comprises an icon of a human carrying a box moving from a first selectable icon representing the first factory element to a second selectable icon representing the second factory element.

59. The graphical user interface of claim 57, wherein, for each shop floor screen, each selectable icon is positioned at a location within that shop floor screen corresponding to a location of the corresponding shop floor occupied by the factory element represented by that selectable icon.

60. A graphical user interface for inputting, displaying and managing information about a manufacturing, operation stored in a database, the manufacturing operation comprising at least one shop floor, each shop floor including at least one factory element, the graphical user interface comprising:

- at least one shop floor screen, each shop floor screen corresponding to one of the at least one shop floor of the manufacturing operation and graphically depicting the corresponding shop floor and the at least one factory element of the corresponding shop floor, wherein:
  - each at least one shop floor screen comprises at least one selectable icon, each selectable icon graphically depicting one of the at least one factory element of the corresponding shop floor; and
  - the graphical user interface is usable on the shop floor by an operator of one of the at least one factory element of the manufacturing operation to supply information related to that at least one factory element to the database and to store the information into the database.

61. The graphical user interface of claim 60, wherein, for each shop floor screen, each selectable icon is positioned at a location within that shop floor screen corresponding to a location of the corresponding shop floor occupied by the factory element represented by that selectable icon.

62. The graphical user interface of claim 50, wherein, for each shop floor screen, each selectable icon is positioned at a location within that shop floor screen corresponding to a location of the corresponding shop floor occupied by the factory element represented by that selectable icon.

* * * * *